(12) United States Patent
Buhager et al.

(10) Patent No.: US 10,865,820 B2
(45) Date of Patent: Dec. 15, 2020

(54) APPARATUSES FOR AND METHODS OF INSTALLING PRE-MOLDED SEAL CAPS

(71) Applicant: The Boeing Company, Chicago, IL (US)

(72) Inventors: John M. Buhager, Marlton, NJ (US); Stephen J. Chant, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 50 days.

(21) Appl. No.: 16/031,472

(22) Filed: Jul. 10, 2018

(65) Prior Publication Data

US 2020/0018336 A1 Jan. 16, 2020

(51) Int. Cl.

| | |
|---|---|
| *B65G 23/24* | (2006.01) |
| *B65G 23/04* | (2006.01) |
| *F16B 33/00* | (2006.01) |
| *F16B 37/14* | (2006.01) |
| *F16B 11/00* | (2006.01) |
| *B65G 23/22* | (2006.01) |
| *B65G 47/08* | (2006.01) |

(Continued)

(52) U.S. Cl.
CPC ............ *F16B 11/002* (2013.01); *B65G 23/04* (2013.01); *B65G 23/22* (2013.01); *B65G 23/24* (2013.01); *B65G 47/08* (2013.01); *F16B 33/004* (2013.01); *F16B 37/145* (2013.01); *B64D 37/32* (2013.01); *B64D 45/02* (2013.01)

(58) Field of Classification Search
CPC .... F16B 11/002; F16B 37/145; F16B 33/004; B65G 23/22; B65G 23/24; B65G 23/04; B65G 47/08; B64D 37/32; B64D 45/02
See application file for complete search history.

(56) References Cited

U.S. PATENT DOCUMENTS

| | | | |
|---|---|---|---|
| 6,779,700 B2 * | 8/2004 | Bruins | B25C 1/006 227/120 |
| 7,628,305 B2 * | 12/2009 | Vanden Berg | B25C 5/11 227/120 |

(Continued)

FOREIGN PATENT DOCUMENTS

| | | |
|---|---|---|
| CN | 105370056 A | 3/2016 |
| JP | 2013036566 A | 2/2013 |

OTHER PUBLICATIONS

European Patent Office; Extended European Search Report for EP Application No. 19185110.4; dated Nov. 18, 2019.

*Primary Examiner* — Lawrence Averick
(74) *Attorney, Agent, or Firm* — Parsons Behle & Latimer

(57) ABSTRACT

An apparatus for installing pre-molded seal caps onto fasteners that extend from a surface is disclosed. Apparatus comprises a plunger mechanism, configured to individually install the pre-molded seal caps onto selected ones of the fasteners. Apparatus also comprises a feed system, configured to sequentially deliver the pre-molded seal caps, arranged on a carrier strip, to the plunger mechanism. Apparatus additionally comprises a take-up mechanism, configured to collect the carrier strip as the pre-molded seal caps are sequentially removed from the carrier strip. The plunger mechanism is also configured to operate in concert with the feed system to sequentially remove the pre-molded seal caps from the carrier strip.

34 Claims, 31 Drawing Sheets

(51) Int. Cl.
 *B64D 37/32* (2006.01)
 *B64D 45/02* (2006.01)

(56) References Cited

U.S. PATENT DOCUMENTS

| | | |
|---|---|---|
| 2003/0015565 A1* | 1/2003 | Lee .................... B25C 5/1693 |
| | | 227/18 |
| 2007/0290022 A1 | 12/2007 | Bruins et al. |
| 2015/0271960 A1 | 9/2015 | Yoon et al. |
| 2016/0207182 A1 | 7/2016 | Sprik et al. |

\* cited by examiner

APPARATUSES FOR AND METHODS OF INSTALLING PRE-MOLDED SEAL CAPS

TECHNICAL FIELD

The present disclosure relates to apparatuses and methods for installing seal caps onto fasteners that extend from a surface.

BACKGROUND

Assembly of structures, such as aircraft, generally requires numerous fasteners. Conventionally, sealant is manually applied to exposed fasteners to protect them from corrosion, provide a fuel barrier, and/or deliver electromagnetic-effect protection. Alternatively, pre-molded seal caps, containing sealant, may be utilized. Before pre-molded seal caps are manually installed onto fasteners, the operator must remove the seal caps from their individual packaging by hand. During installation, the operator must consistently rotate the pre-molded seal caps, while pushing them over the fasteners, until a proper uniform amount of sealant squeeze-out is produced. The operator must also install the pre-molded seal caps in a direction, normal to the surface, bearing the fasteners, to ensure that the pre-molded seal caps are properly and evenly spaced from that surface. Since these procedures and steps are cumbersome and time-consuming, manual installation of pre-molded seal caps negatively affects manufacturing cycle time and cost.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter, according to the invention, relates to an apparatus for installing pre-molded seal caps onto fasteners that extend from a surface. The apparatus comprises a plunger mechanism, configured to individually install the pre-molded seal caps onto selected ones of the fasteners. The apparatus also comprises a feed system, configured to sequentially deliver the pre-molded seal caps, arranged on a carrier strip, to the plunger mechanism. The apparatus additionally comprises a take-up mechanism, configured to collect the carrier strip as the pre-molded seal caps are sequentially removed from the carrier strip. The plunger mechanism is also configured to operate in concert with the feed system to sequentially remove the pre-molded seal caps from the carrier strip.

The apparatus provides for installing pre-molded seal caps that are arranged on a carrier strip on fasteners that extend from a surface. The apparatus is configured to individually remove pre-molded seal caps one at a time from the carrier strip and individually install the pre-molded seal caps, removed from the carrier strip, onto the fasteners that extend from the surface. The feed system transports the carrier strip within the apparatus and operates in concert with the plunger mechanism to sequentially remove the pre-molded seal caps from the carrier strip. The plunger mechanism installs the removed pre-molded seal caps onto the fasteners. The apparatus enables the automated sequential removal of the pre-molded seal caps from the carrier strip and installation of the removed pre-molded seal caps onto the fasteners that extend from the surface. The take-up mechanism prevents the carrier strip from becoming entangled by collecting the carrier strip as the pre-molded seal caps are sequentially removed from the carrier strip.

Another example of the subject matter, according to the invention, relates to a system for sealing fasteners that extend from a surface. The system comprises pre-molded seal caps, spaced along a carrier strip at regular intervals and removably attached to the carrier strip. The system also comprises a plunger mechanism, configured to individually install the pre-molded seal caps onto selected ones of the fasteners. The system additionally comprises a feed system, configured to sequentially deliver the pre-molded seal caps, arranged on the carrier strip, to the plunger mechanism. The system further comprises a take-up mechanism, configured to collect the carrier strip as the pre-molded seal caps are sequentially removed from the carrier strip. The plunger mechanism is also configured to operate in concert with the feed system to sequentially remove the pre-molded seal caps from the carrier strip.

The pre-molded seal caps are spaced along the carrier strip at regular intervals and are removably attached to the carrier strip. The plunger mechanism is configured to sequentially install the pre-molded seal caps onto selected ones of the fasteners. The feed system is configured to sequentially deliver the pre-molded seal caps that are arranged on the carrier strip to the plunger mechanism. The feed system moves the carrier strip to position an individual one of the pre-molded seal caps to be removed from the carrier strip and installed on a selected one of the fasteners. The plunger mechanism is configured to operate in concert with the feed system to sequentially remove each of the pre-molded seal caps from the carrier strip. The feed system moves the carrier strip while an individual one of the pre-molded seal caps is retained by the plunger mechanism to remove the individual one of the pre-molded seal caps from the carrier strip. The take-up mechanism is configured to collect the carrier strip as the pre-molded seal caps are sequentially removed from the carrier strip by the plunger mechanism acting in concert with the feed system.

Another example of the subject matter, according to the invention, relates to a method of installing pre-molded seal caps onto fasteners that extend from a surface. The method comprises sequentially delivering the pre-molded seal caps, arranged on a carrier strip, to a plunger mechanism via a feed system. The method also comprises sequentially removing the pre-molded seal caps from the carrier strip using the plunger mechanism, operating in concert with the feed system. The method further comprises individually installing the pre-molded seal caps onto selected ones of the fasteners using the plunger mechanism.

The method facilitates removing pre-molded seal caps from the carrier strip and individually installing the removed pre-molded seal caps onto selected ones of the fasteners that extend from the surface. The feed system enables sequential delivery of the pre-molded seal caps to the plunger mechanism. The plunger mechanism, which operates in concert with the feed system, enables sequential removal of the pre-molded seal caps from the carrier strip. After the pre-molded seal caps are sequentially removed from the carrier strip, the plunger mechanism facilitates installing the pre-molded seal caps onto selected ones of the fasteners. The method eliminates the manual removal of the pre-molded seal caps from the carrier strip and the manual installation of the pre-molded seal caps onto selected ones of the fasteners.

BRIEF DESCRIPTION OF THE DRAWINGS

Figure 1:
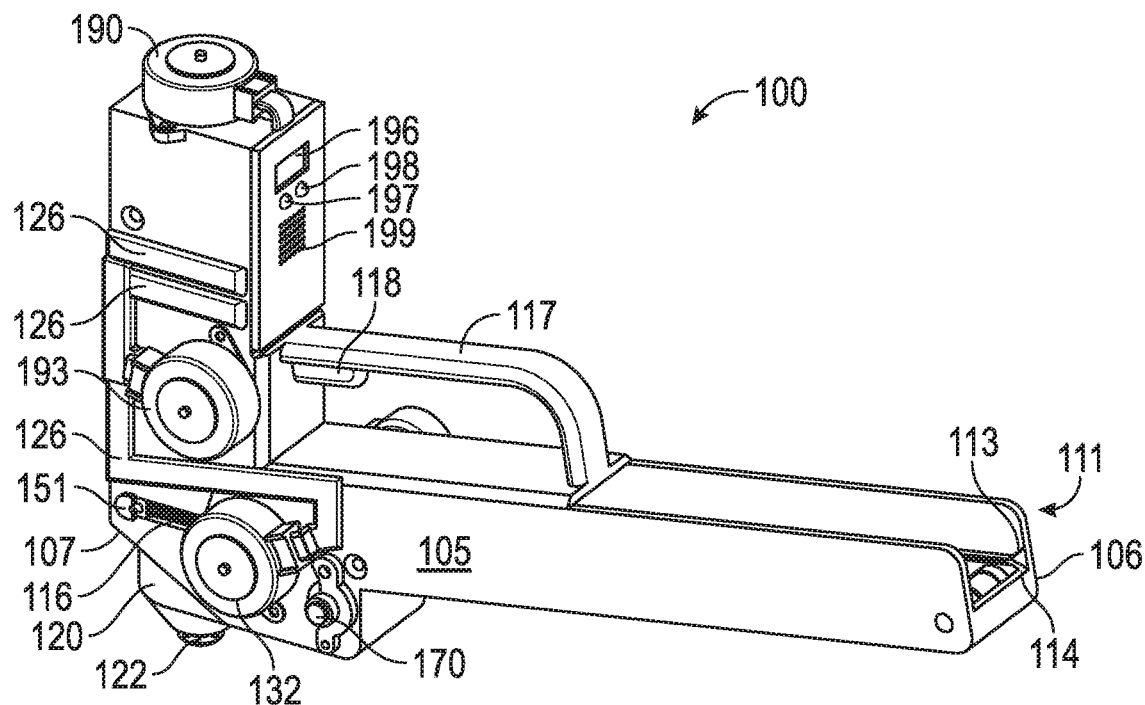
Figure 2:
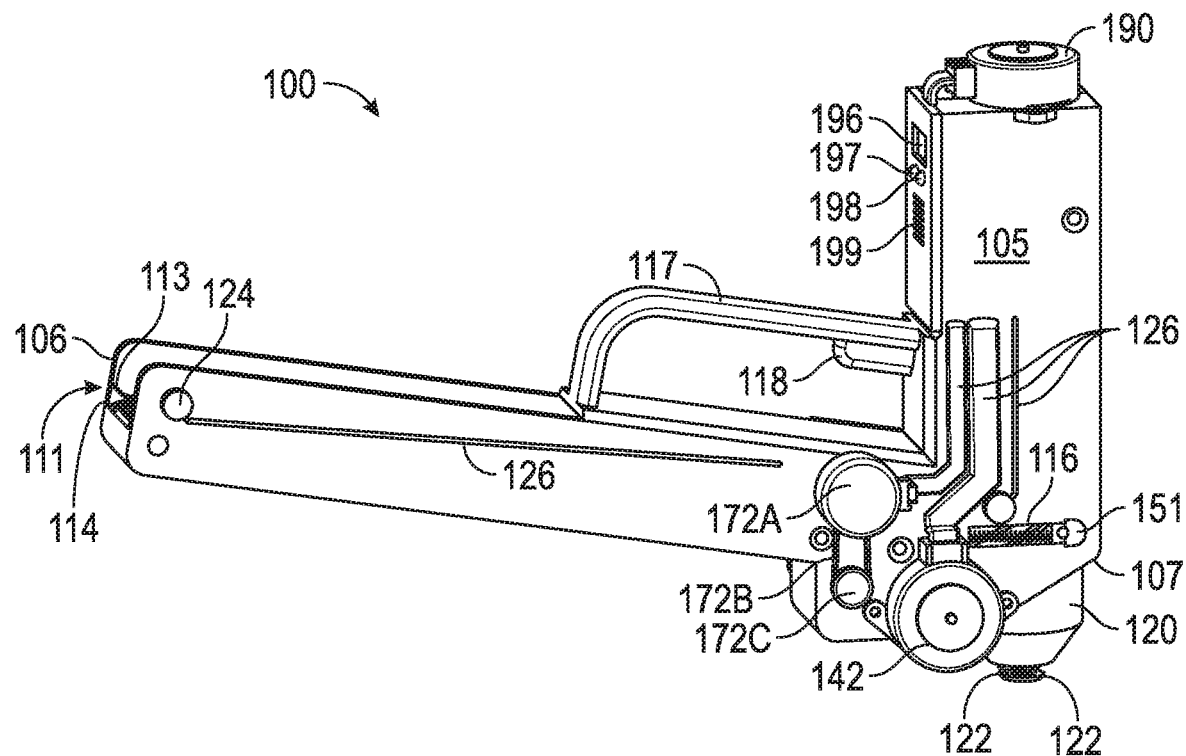
Figure 3:
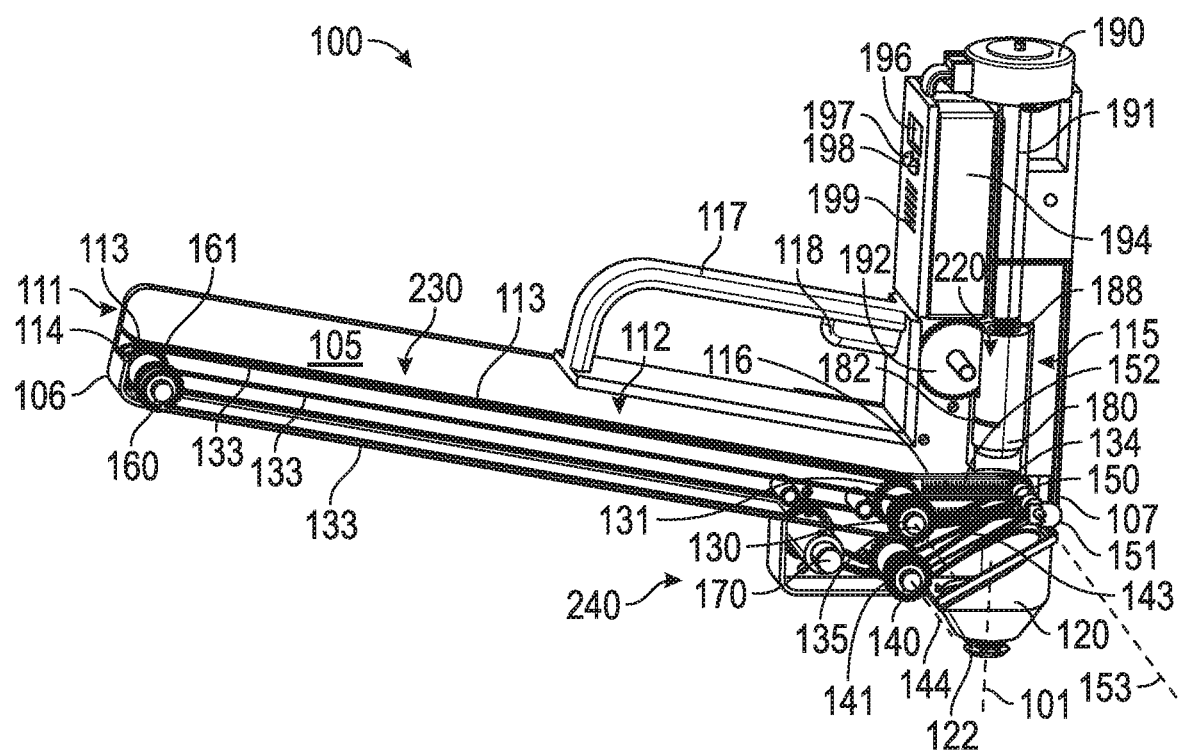
Figure 4:
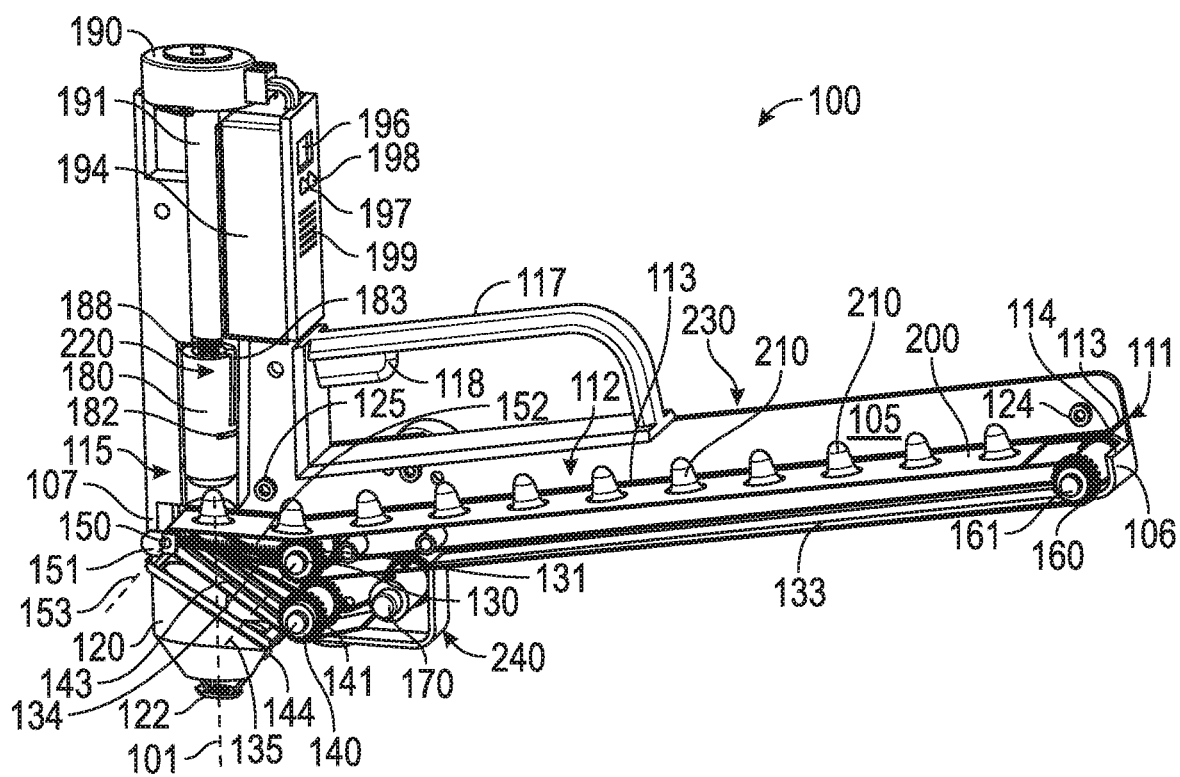
Figure 5:
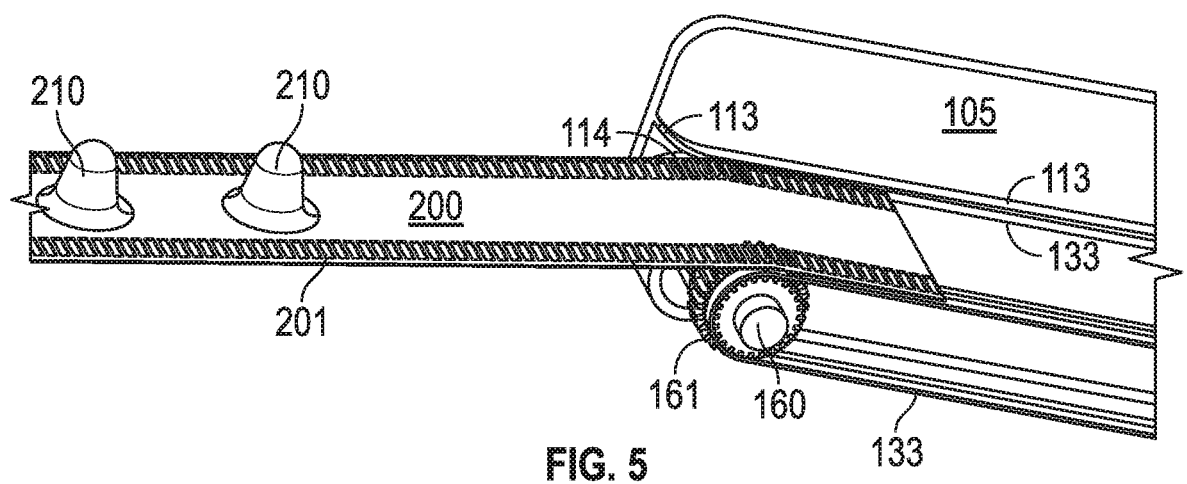
Figure 6:
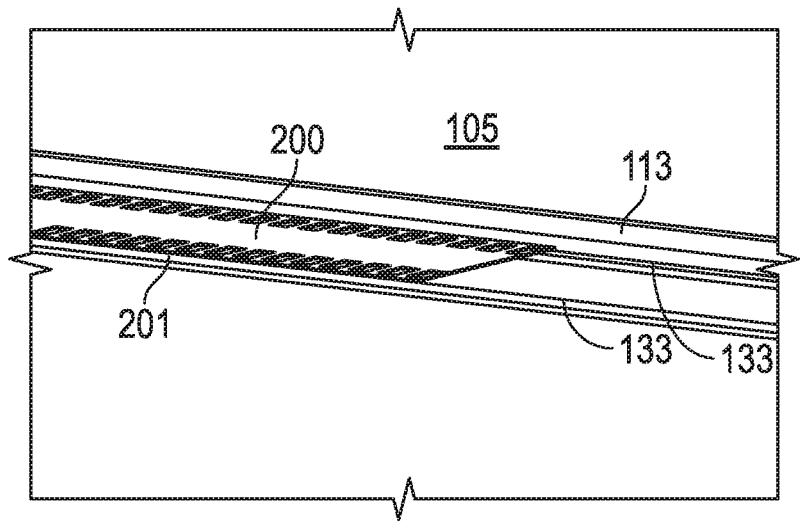
Figure 7:
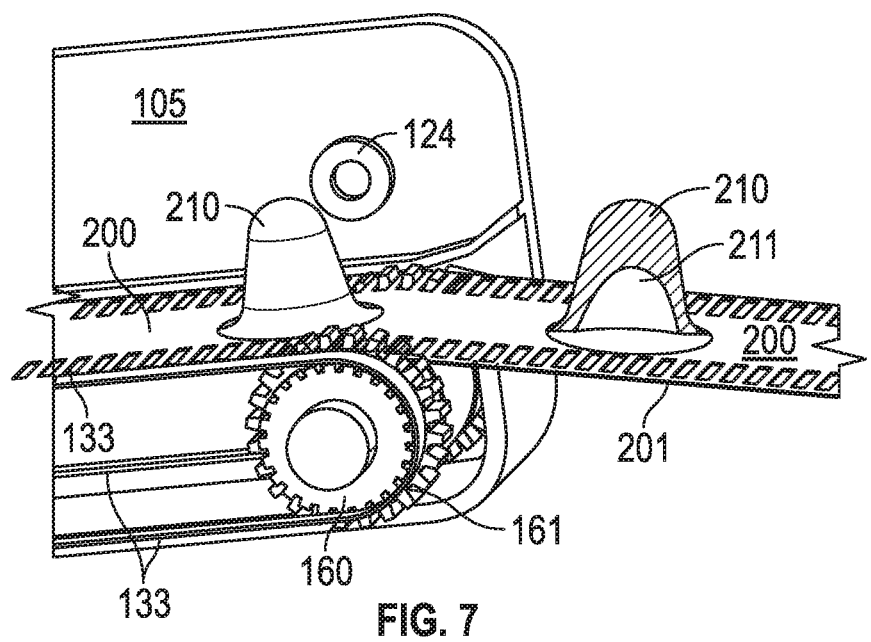
Figure 8:
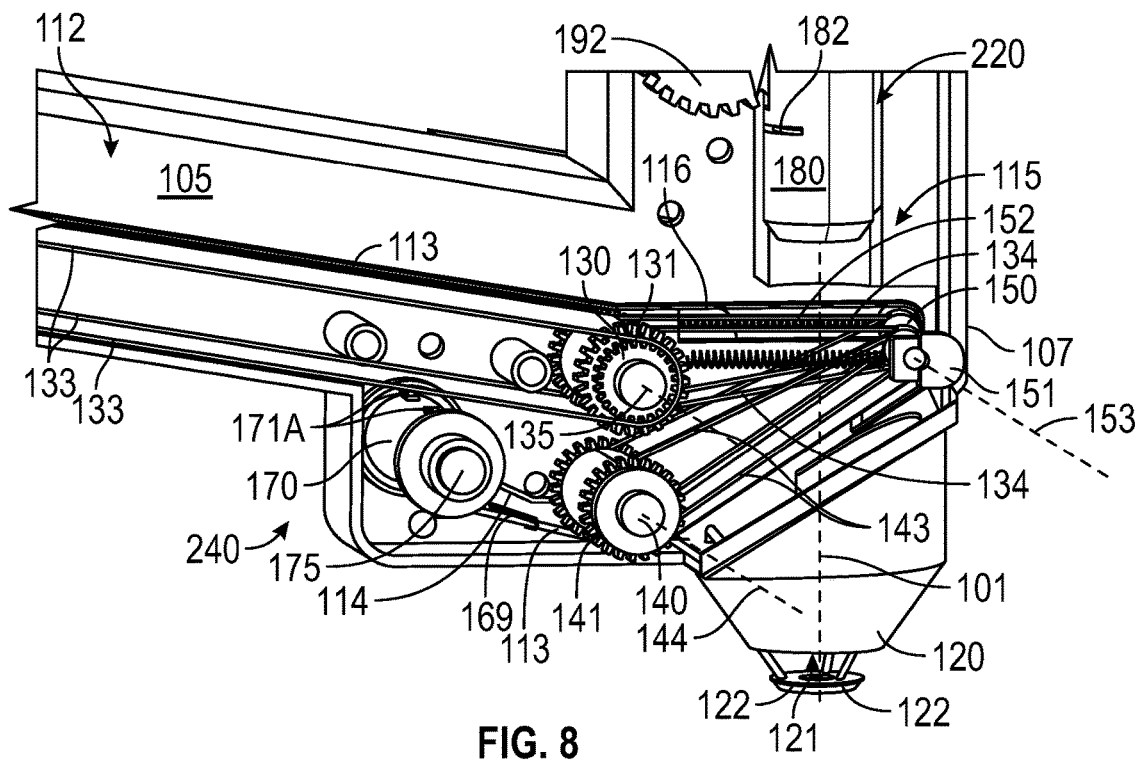
Figure 9:
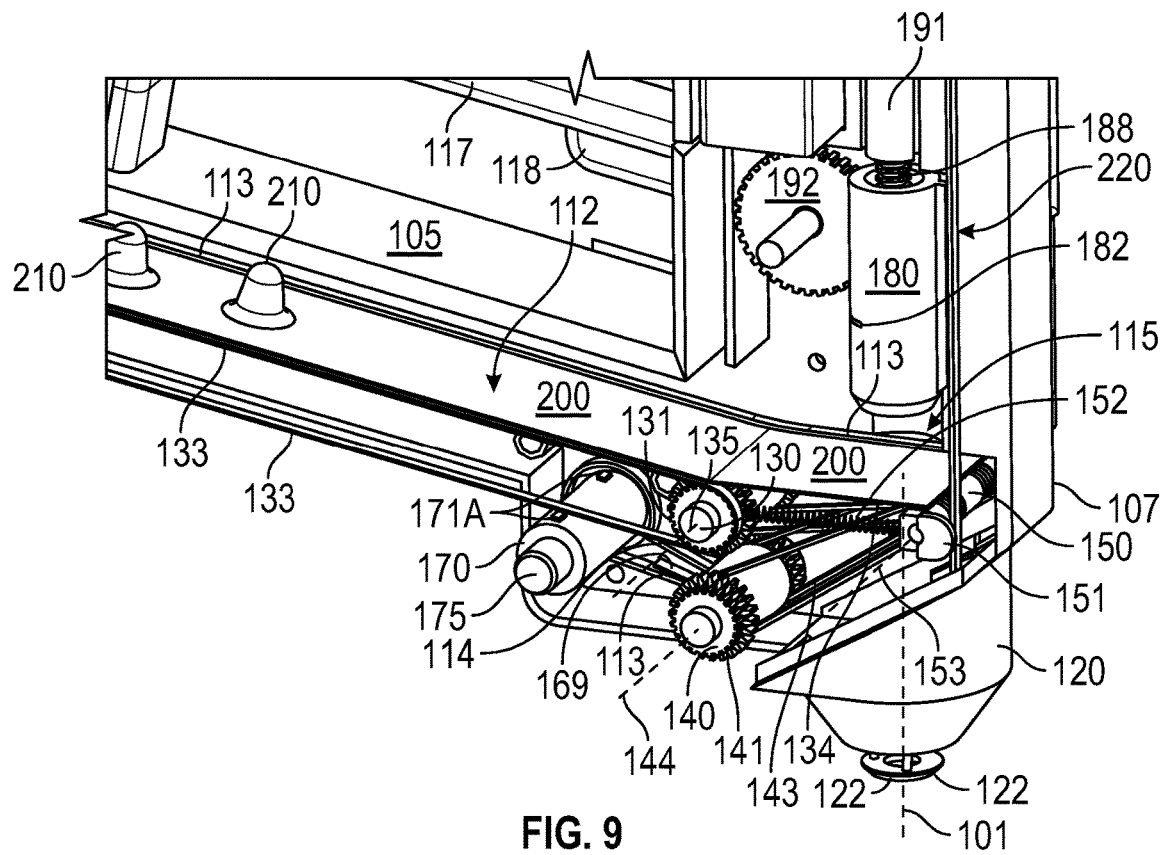
Figure 10:
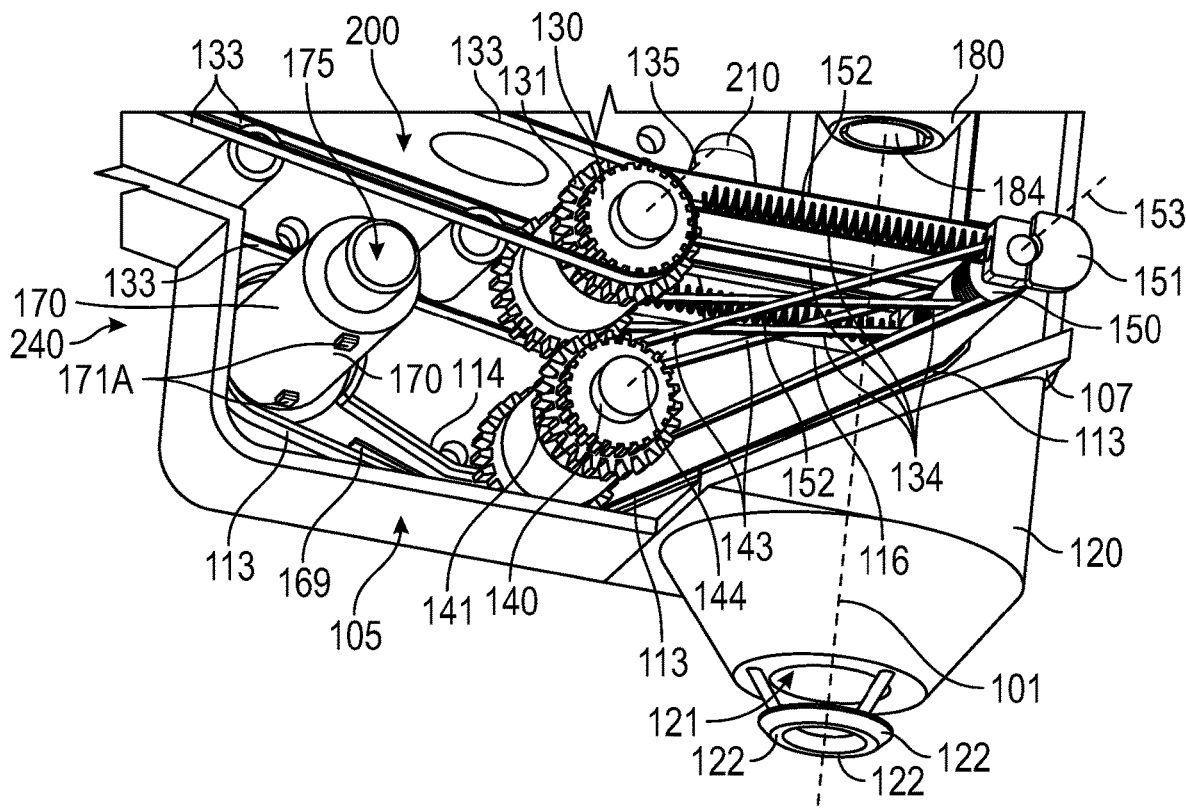
Figure 11:
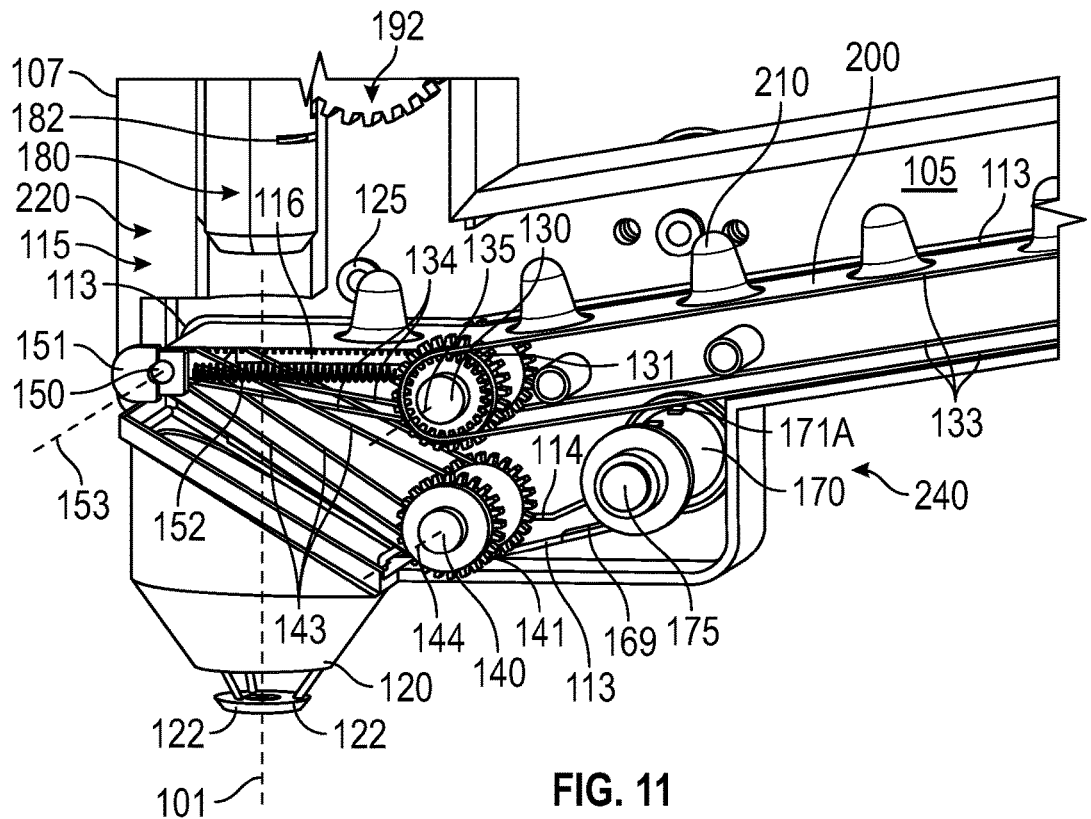
Figure 12:
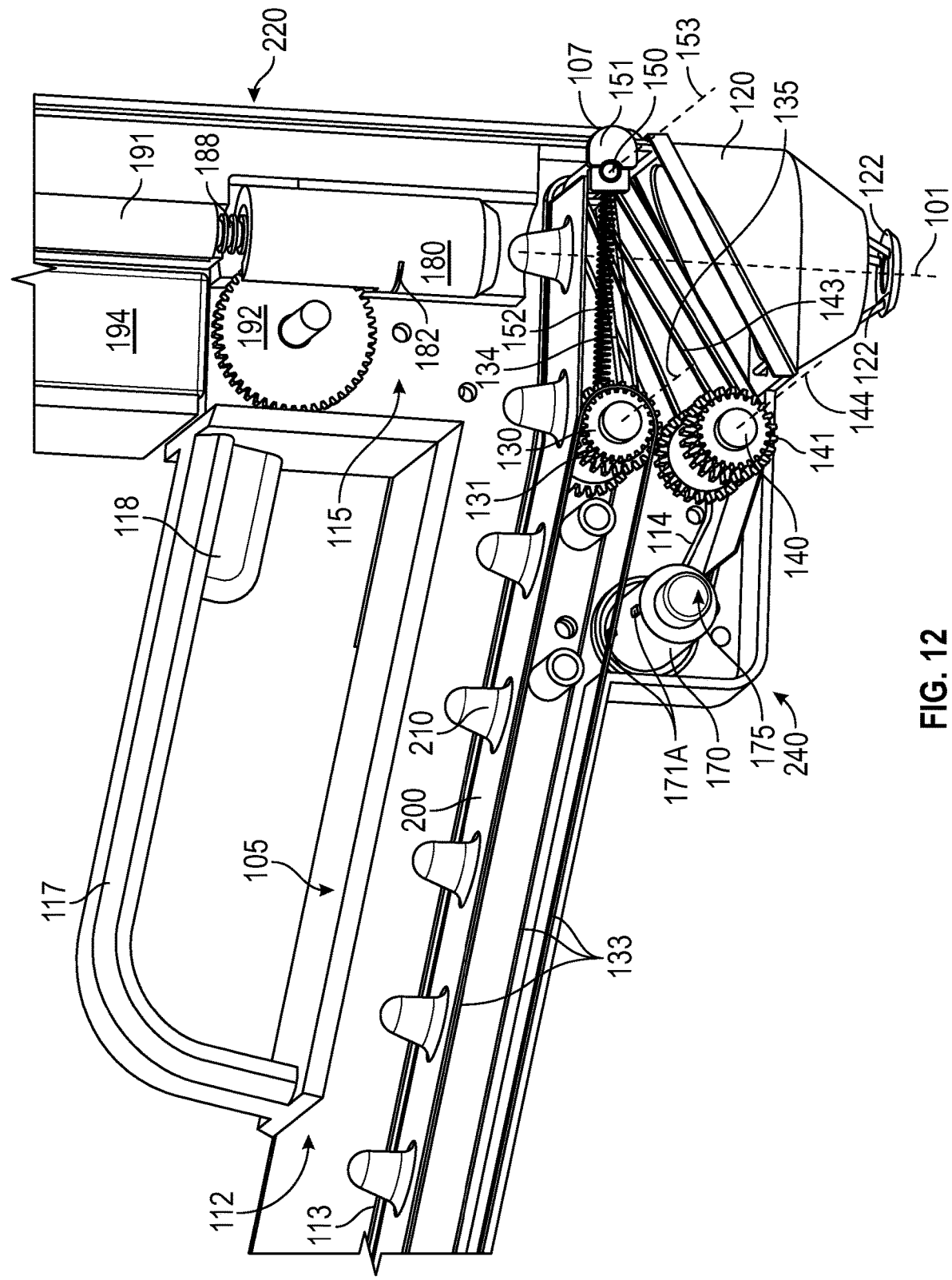
Figure 13:
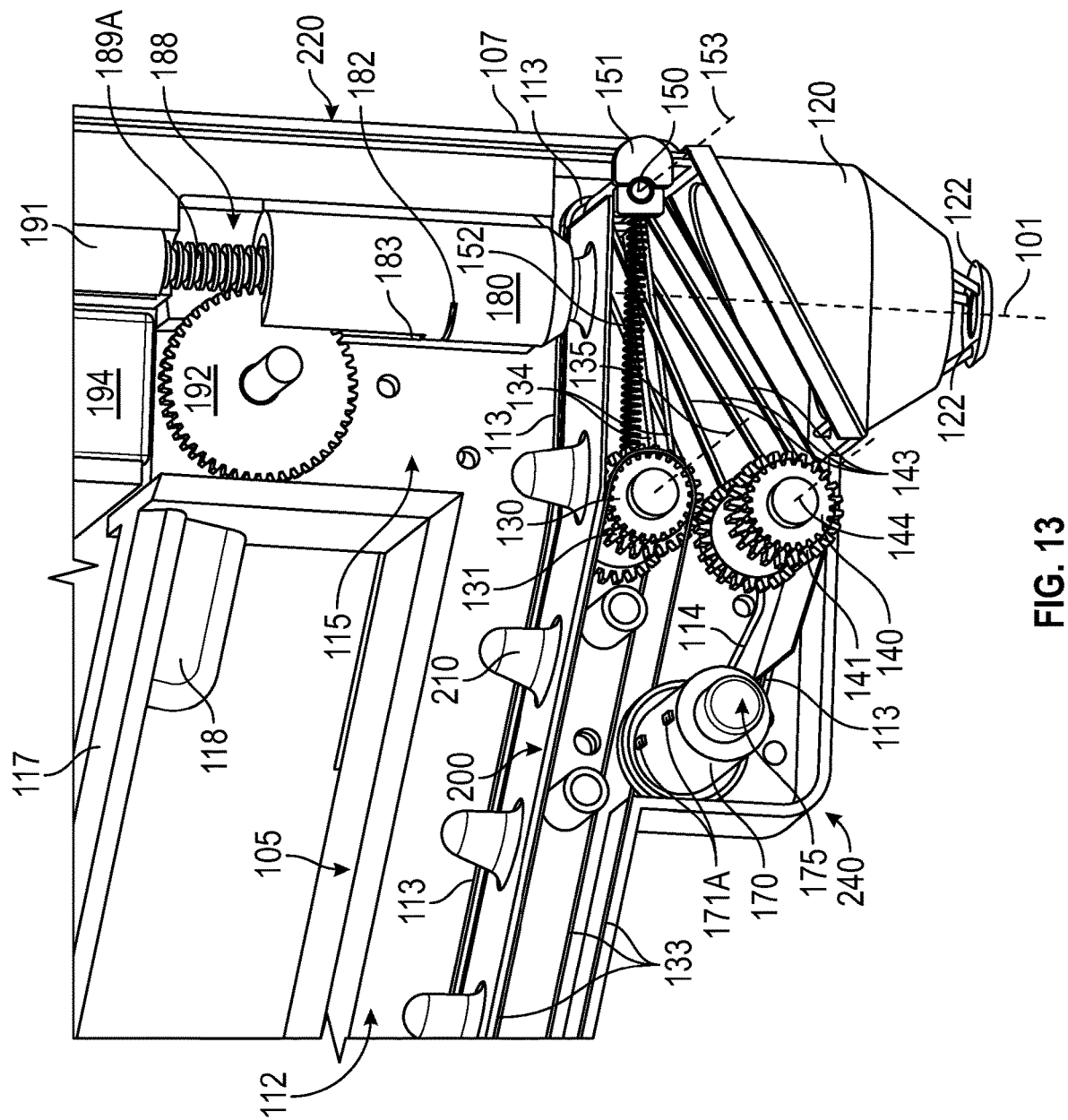
Figure 14:
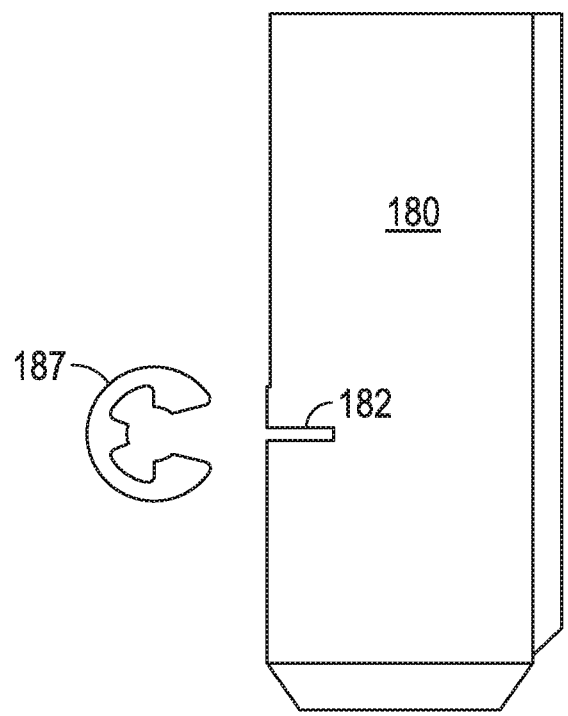
Figure 15:
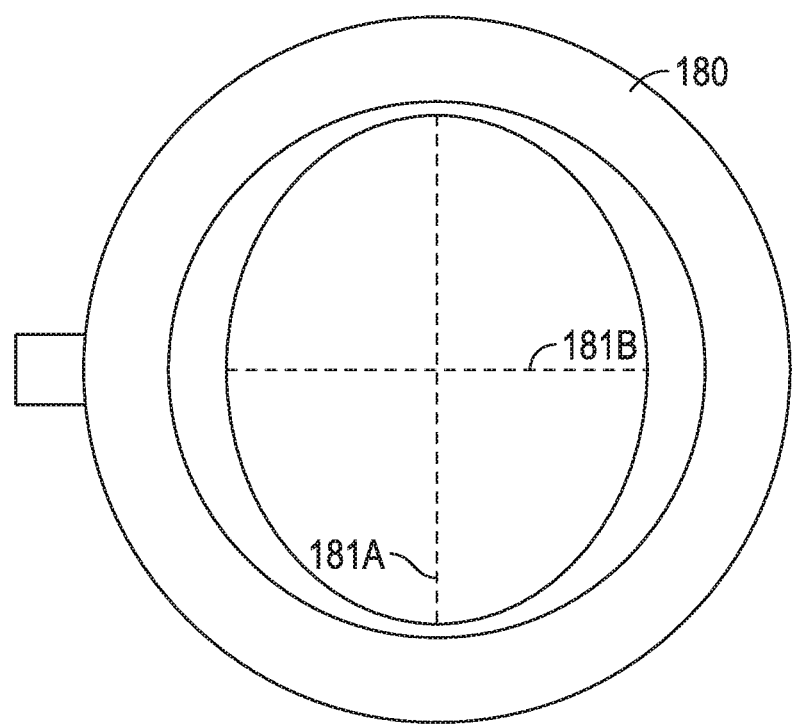
Figure 16:
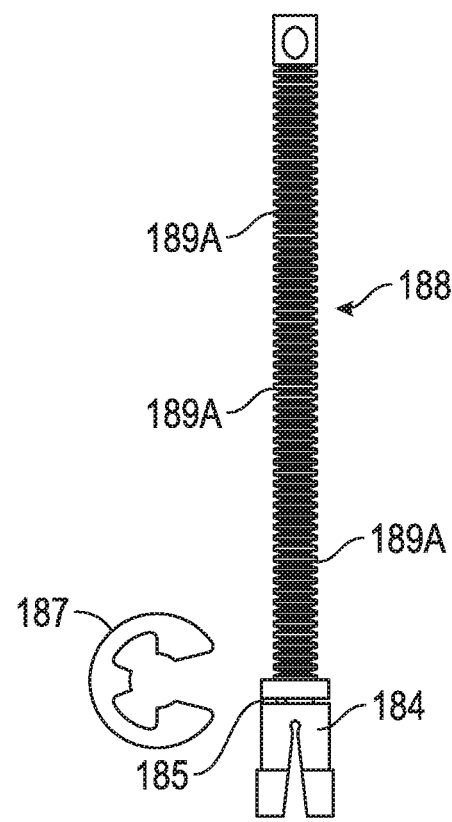
Figure 17:
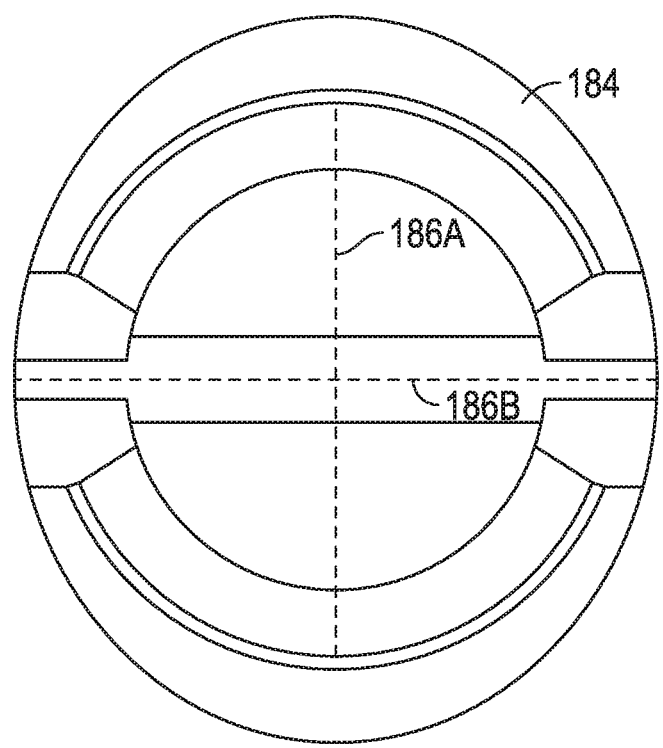
Figure 18:
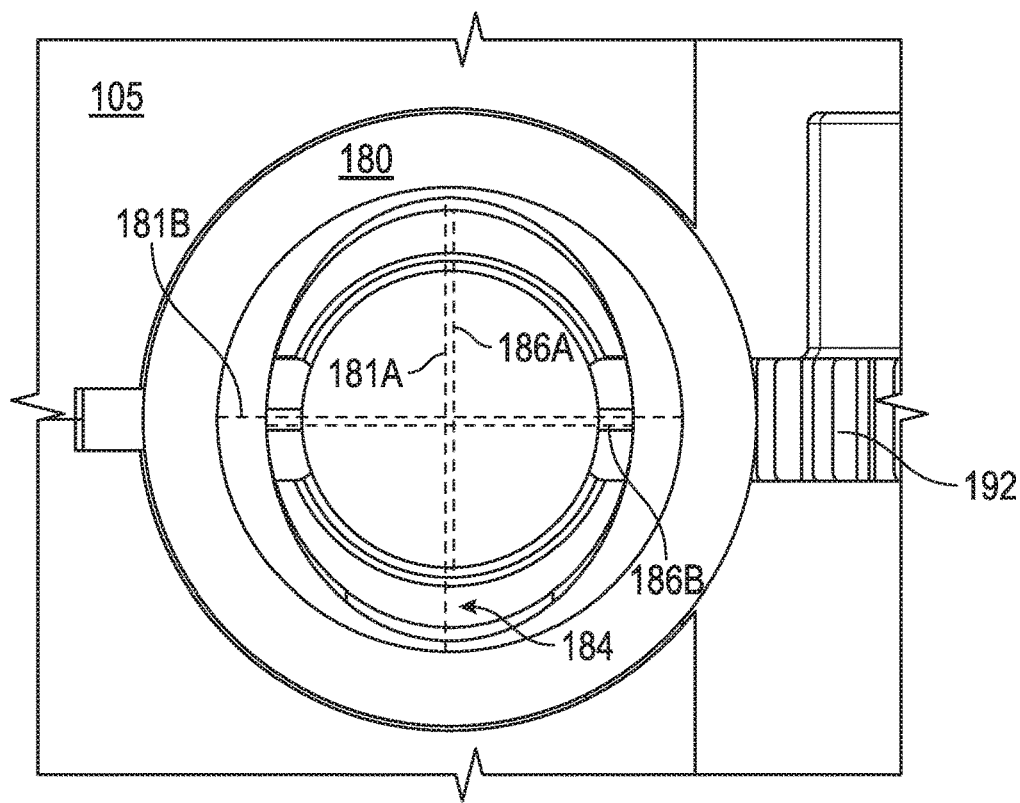
Figure 19:
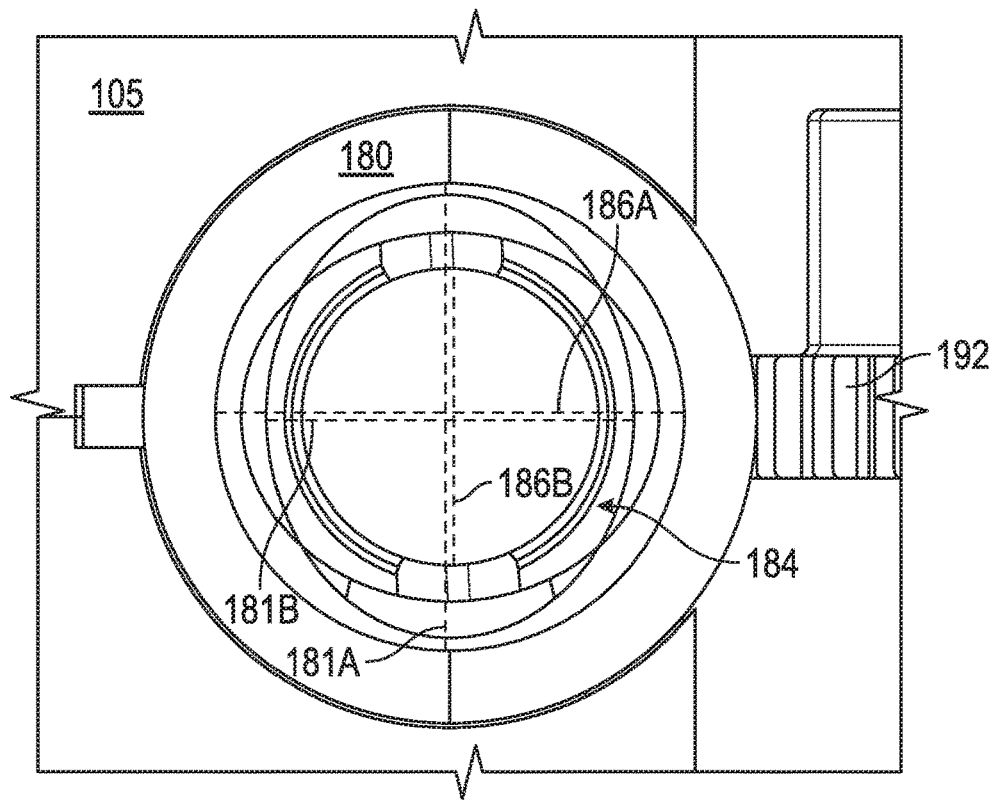
Figure 20:
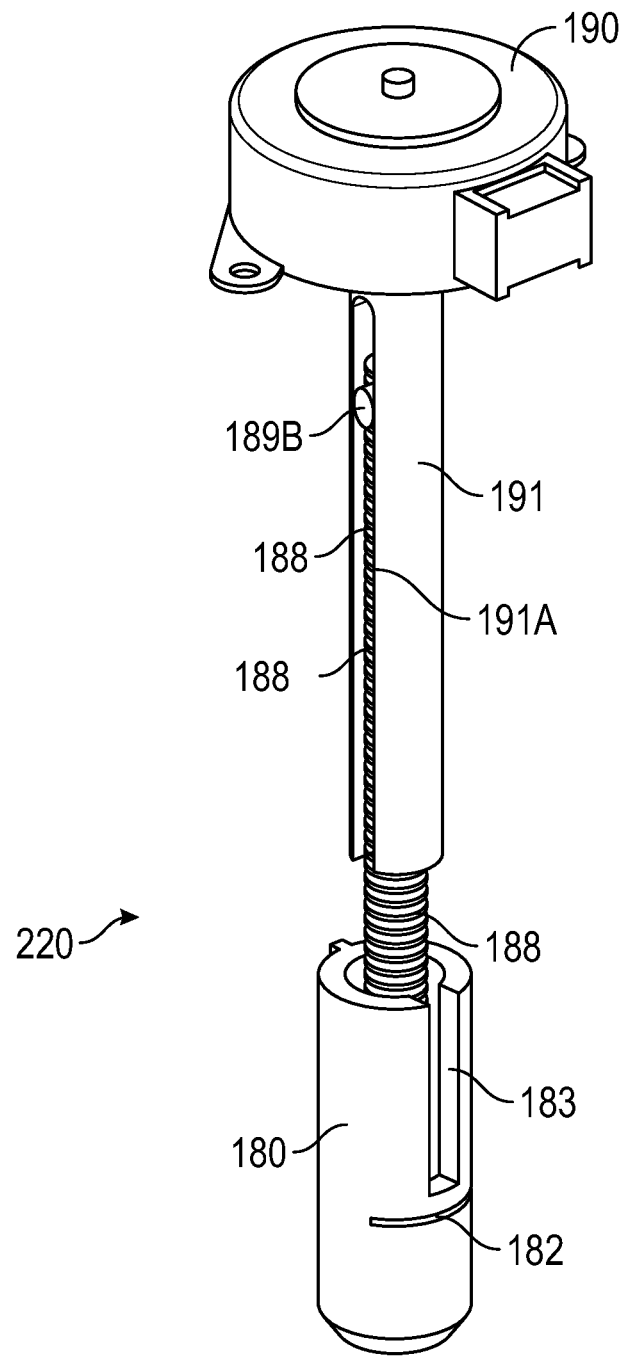
Figure 21:
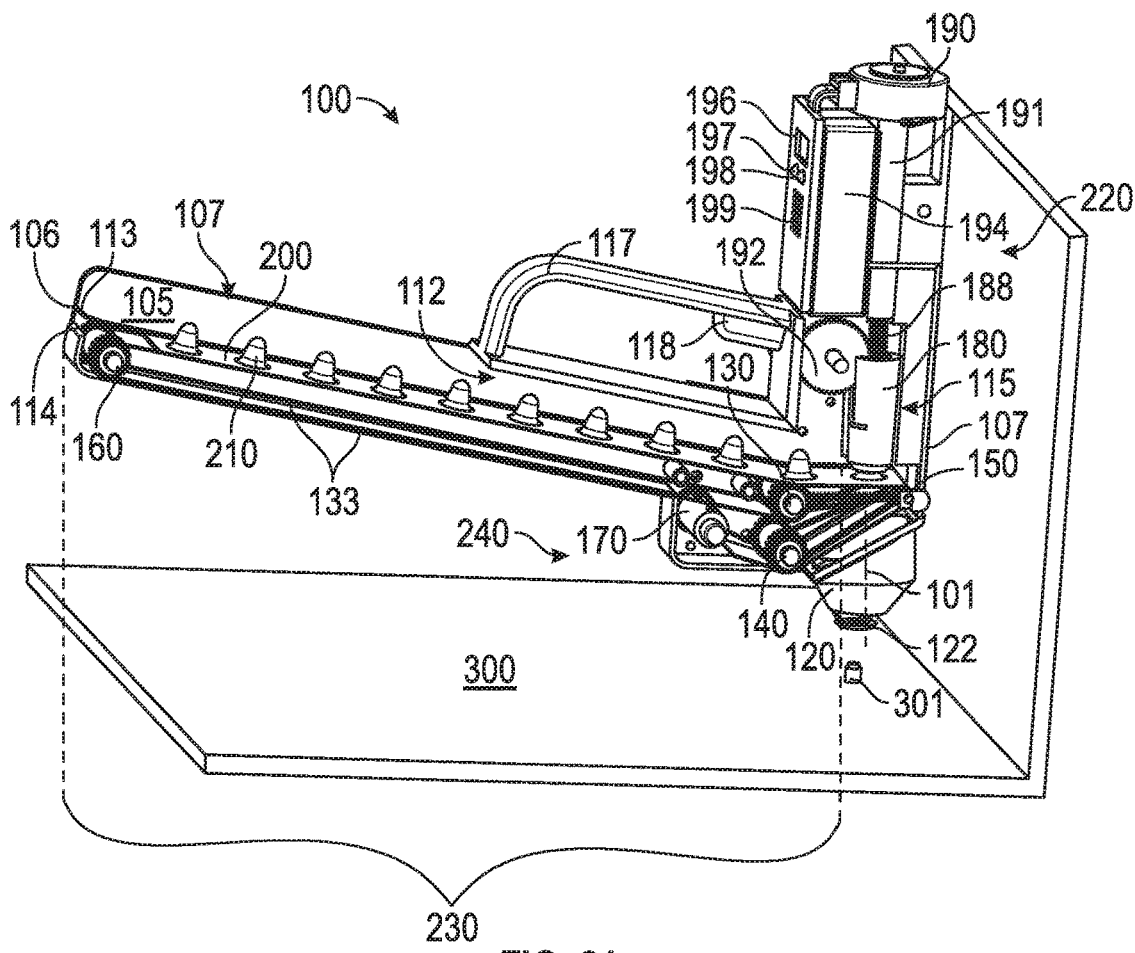
Figure 22:
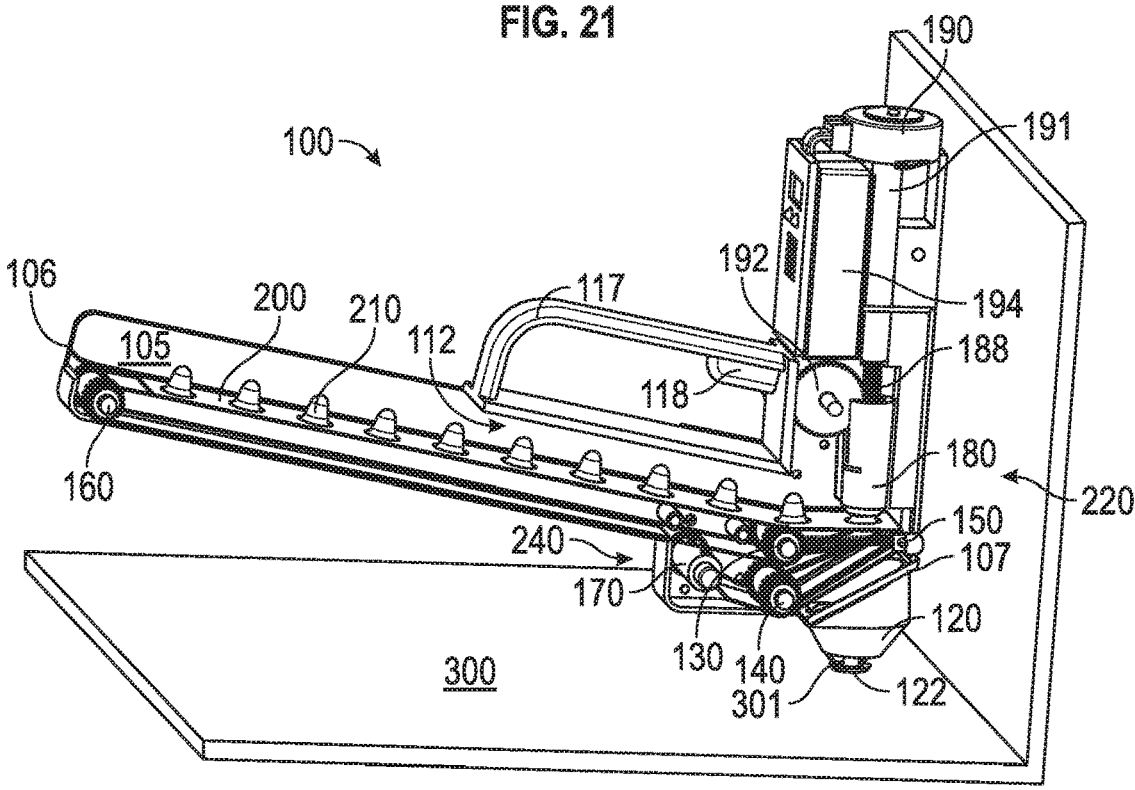
Figure 23:
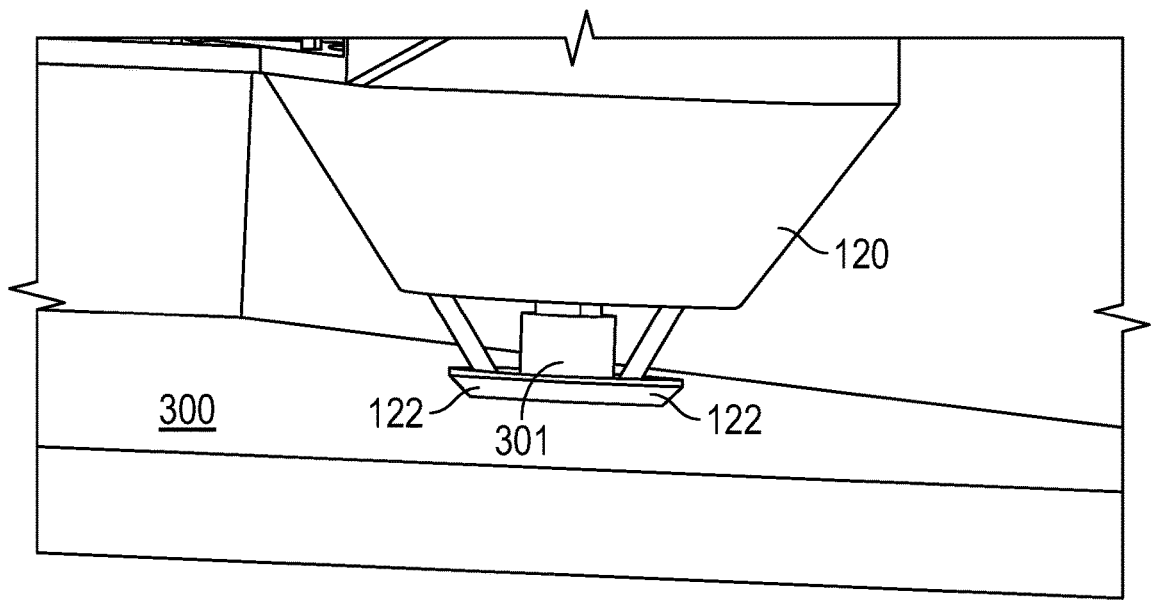
Figure 24:
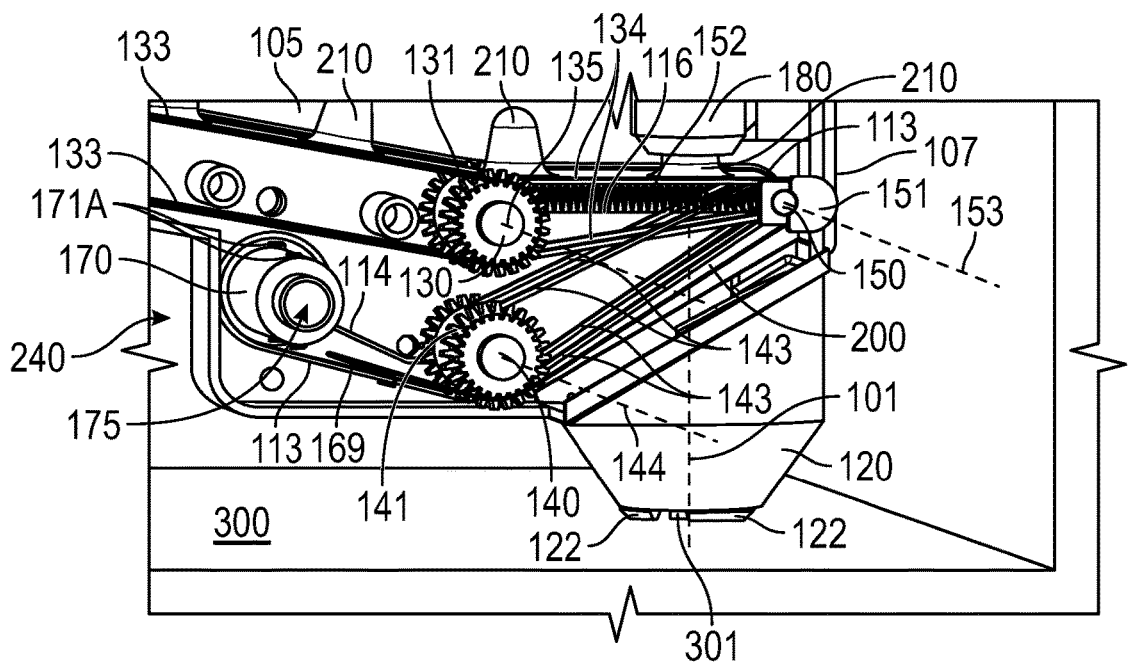
Figure 25:
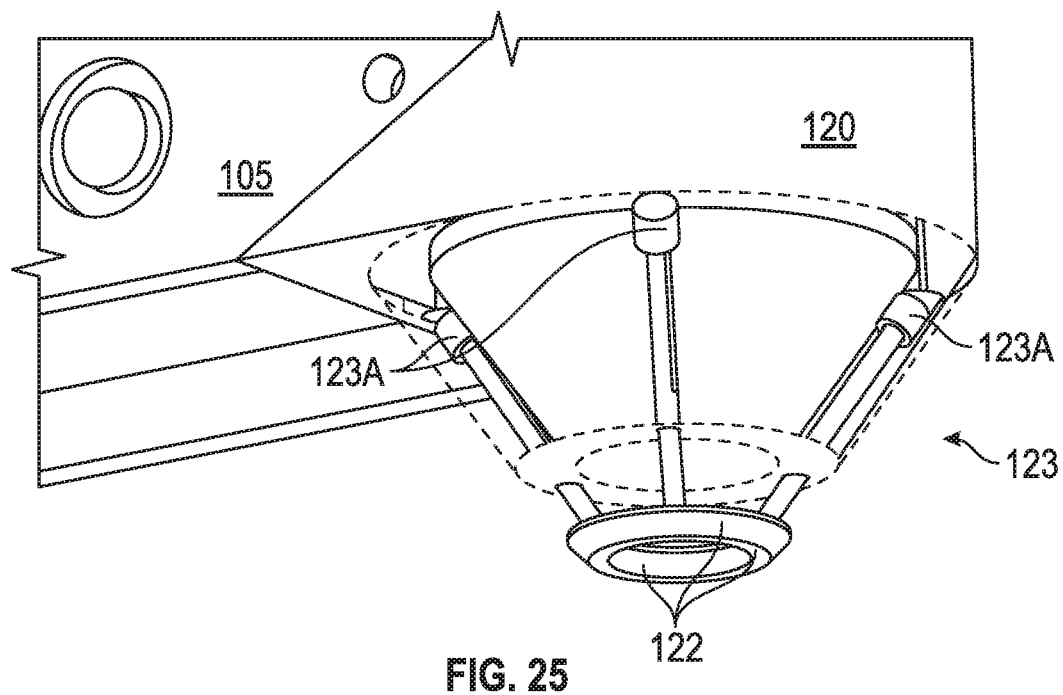
Figure 26:
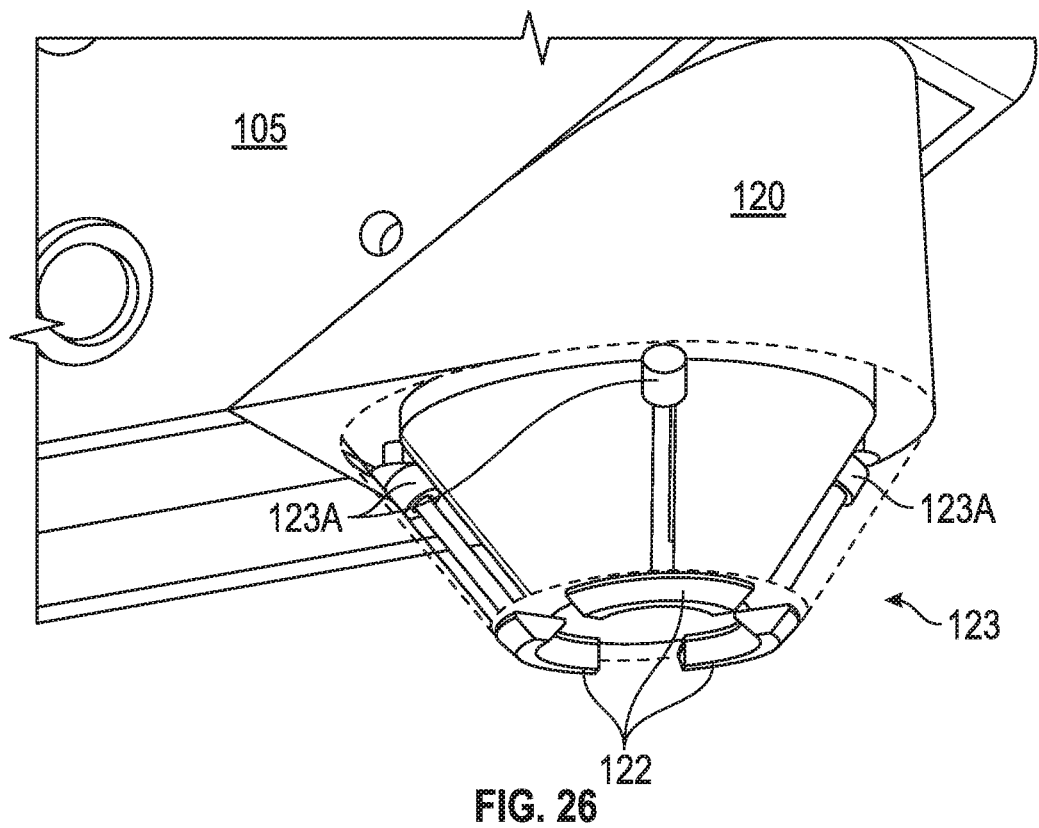
Figure 27:
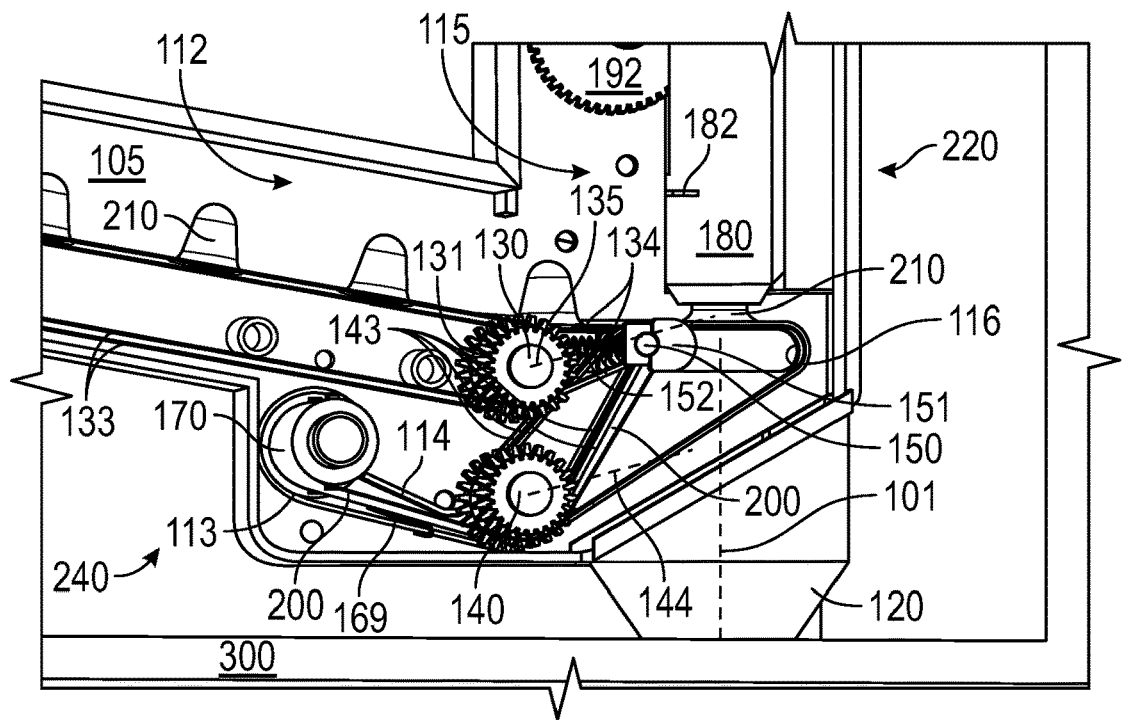
Figure 28:
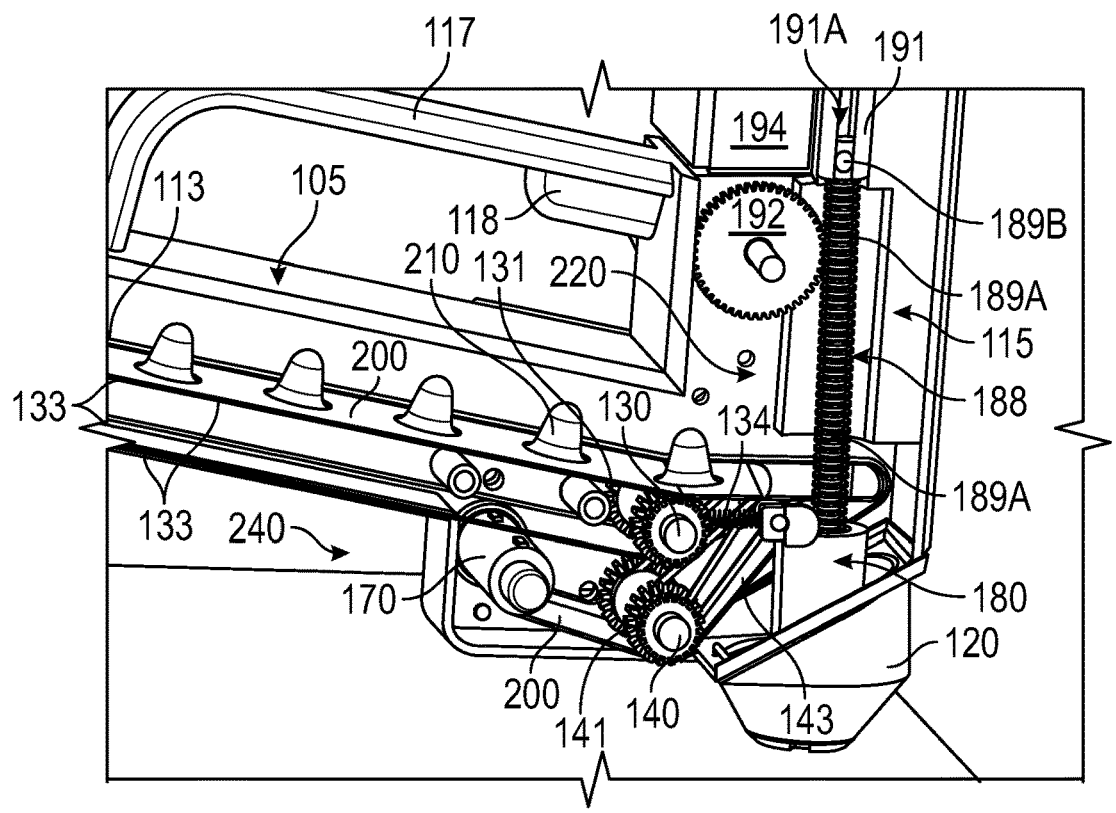
Figure 29:
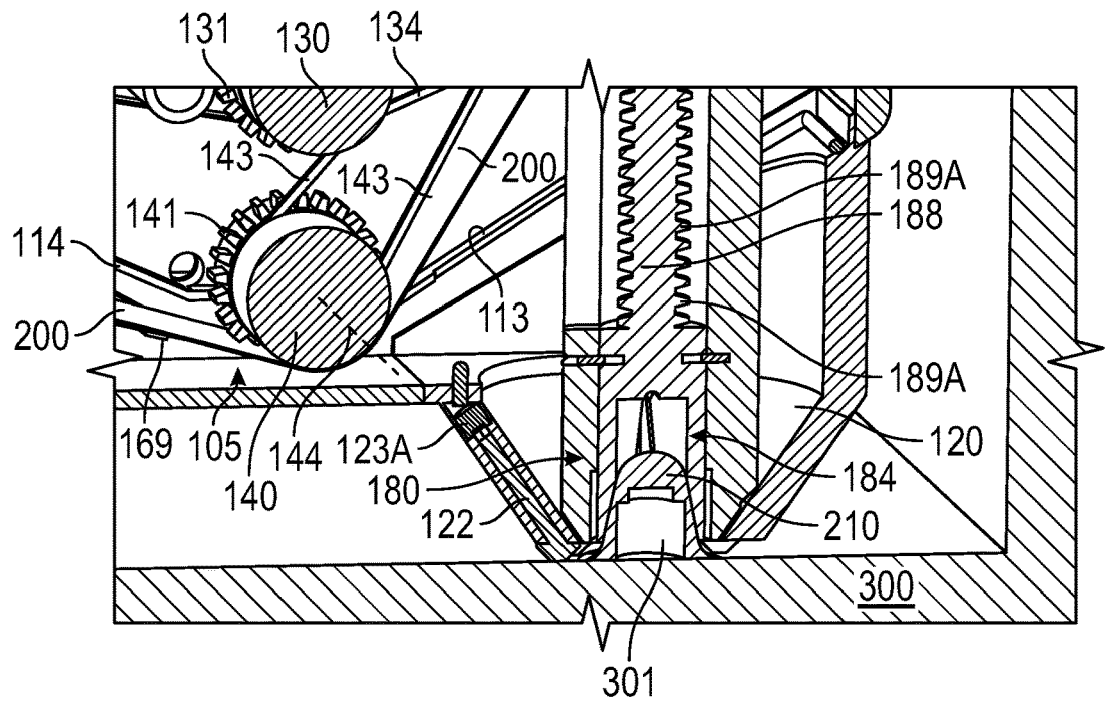
Figure 30:
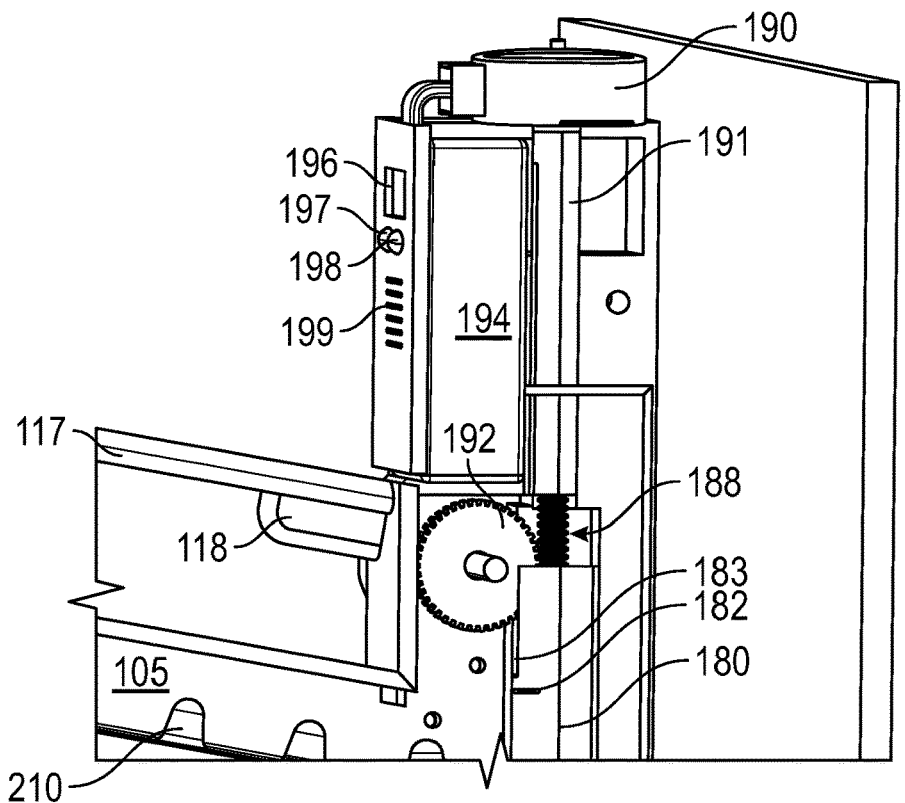
Figure 31:
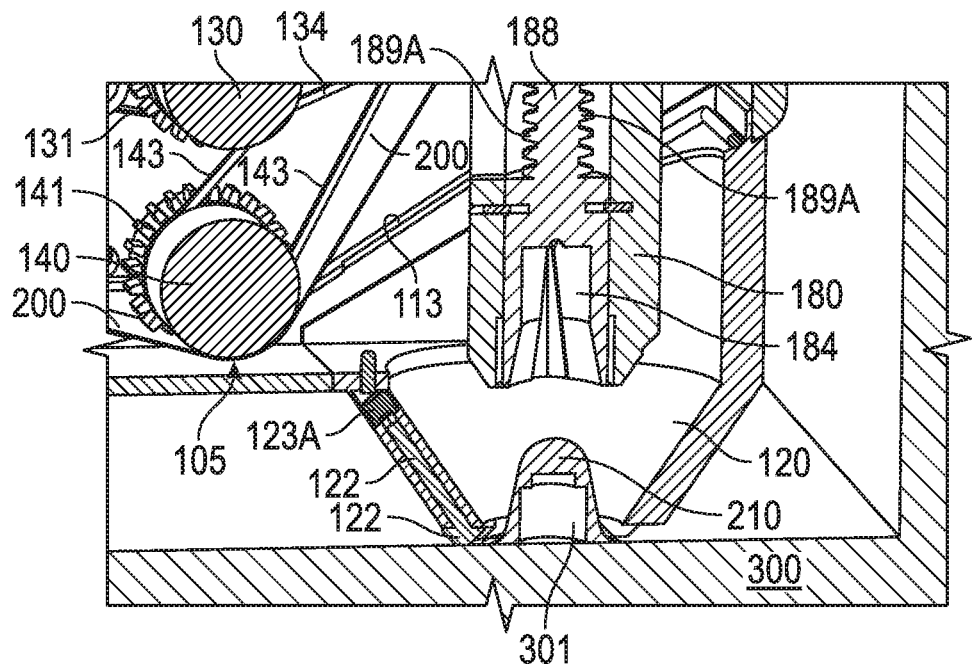
Figure 32:
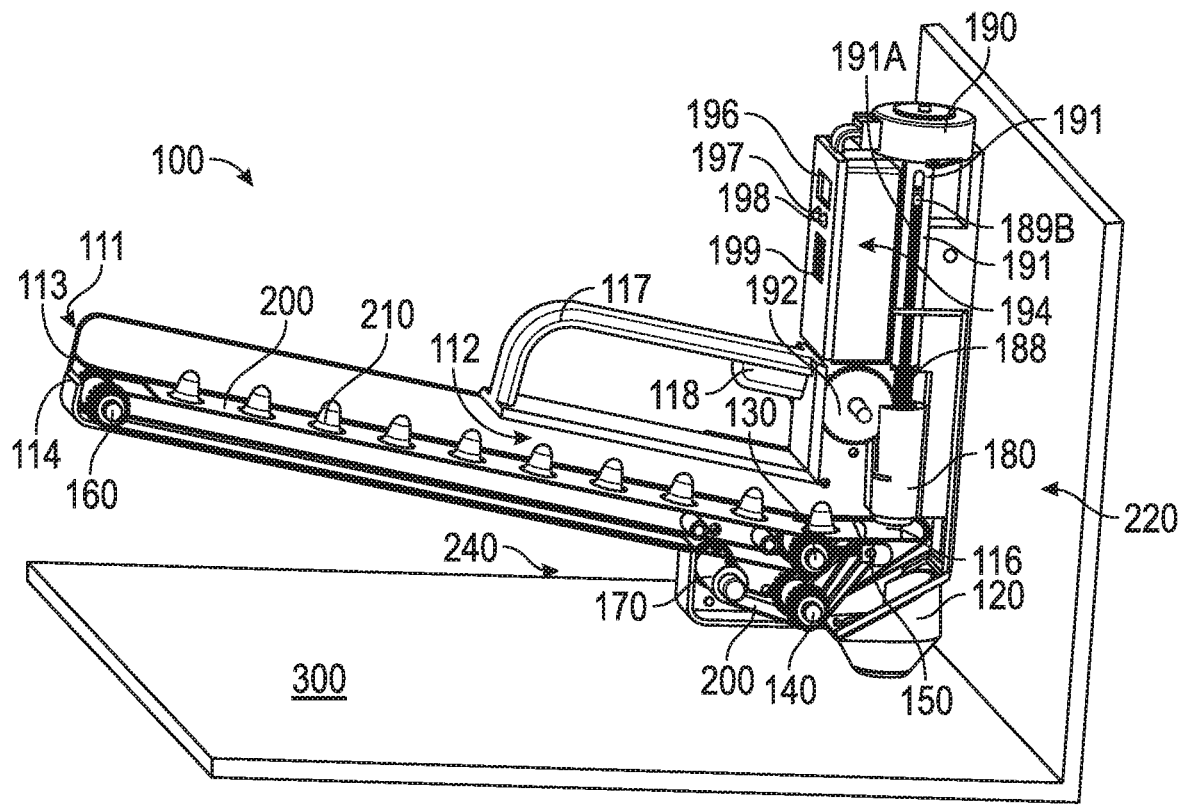
Figure 33:
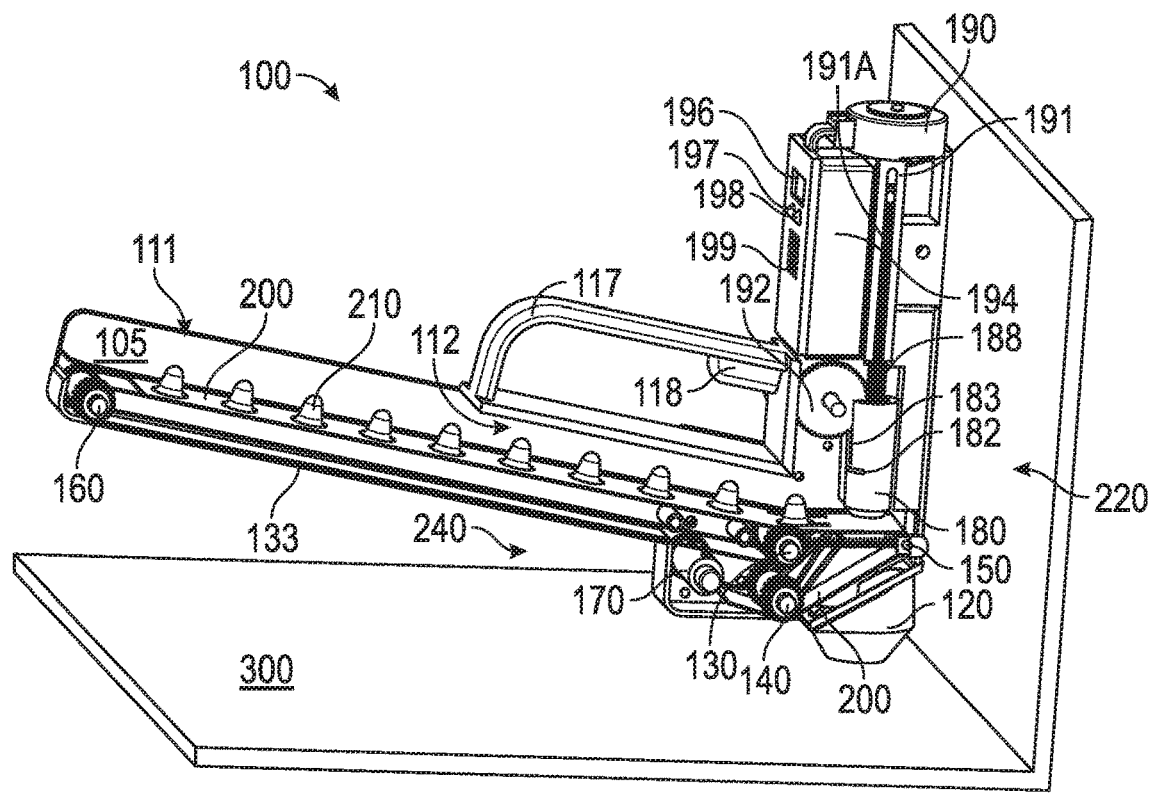
Figure 34:
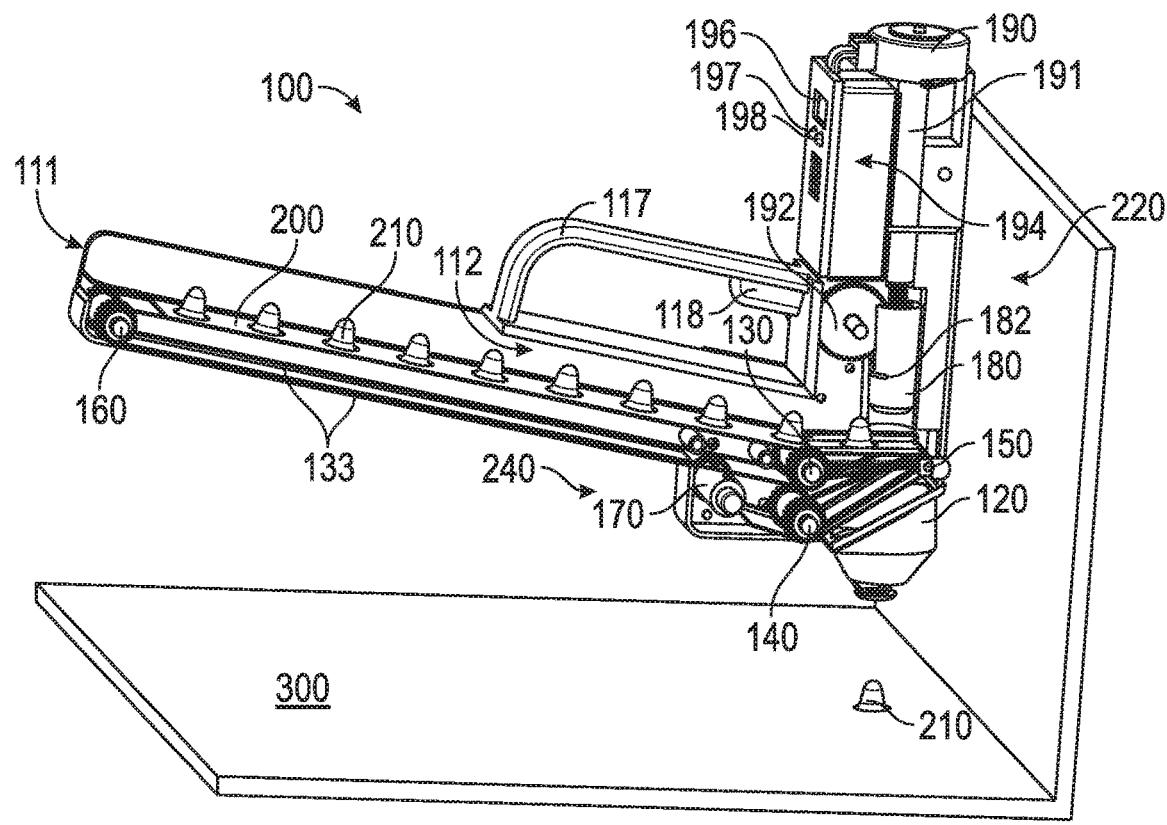
Figure 35:
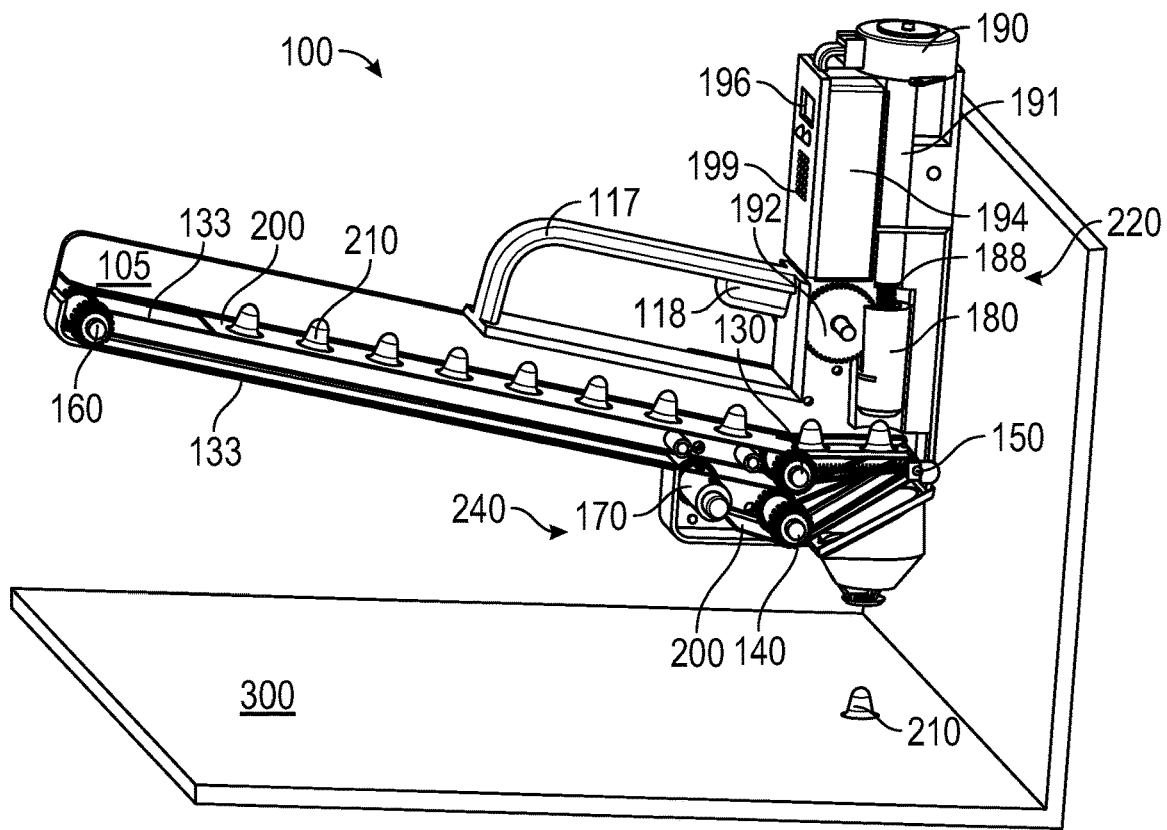
Figure 36:
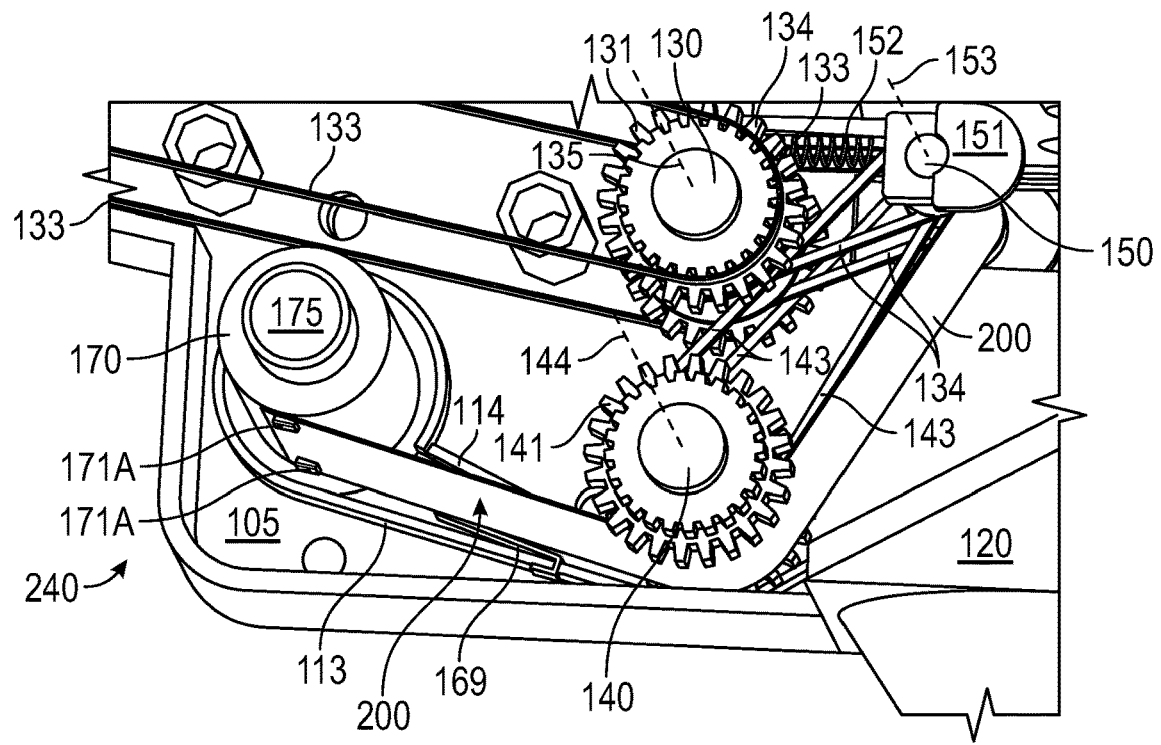
Figure 37:
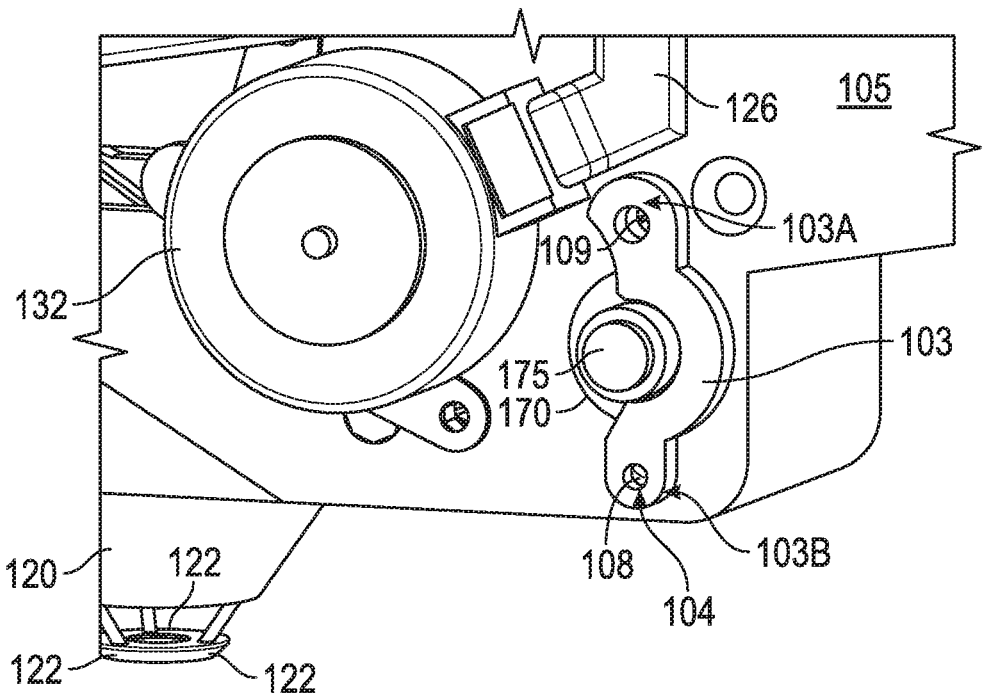
Figure 38:
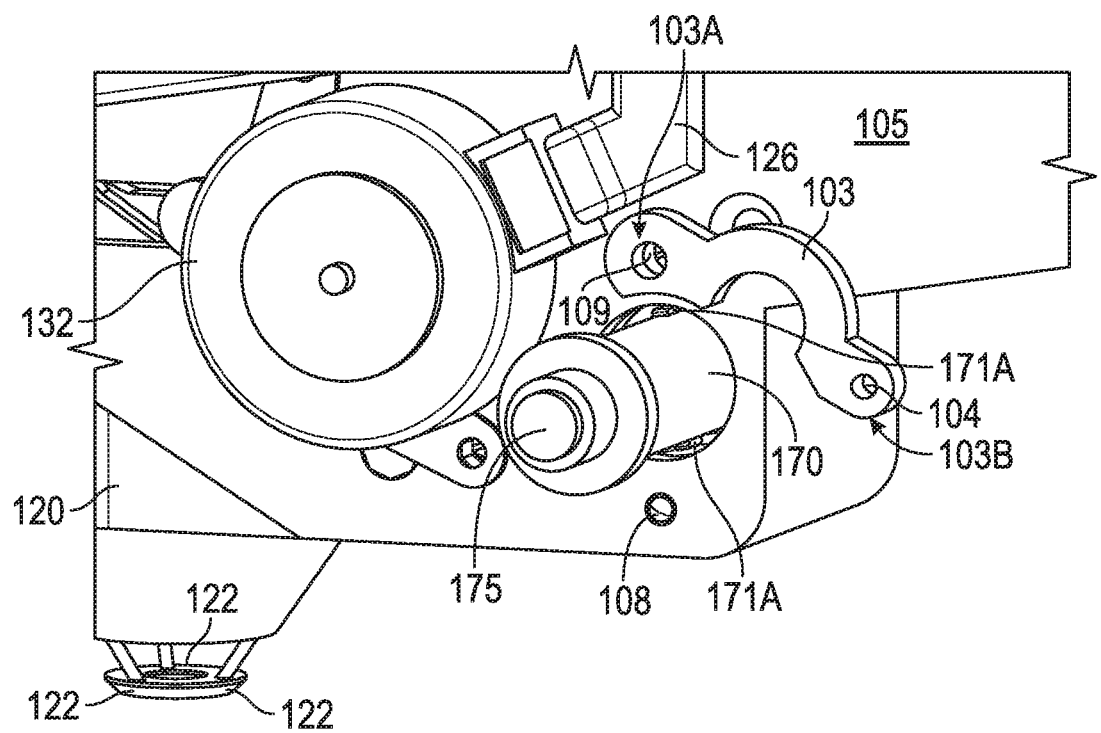
Figure 39:
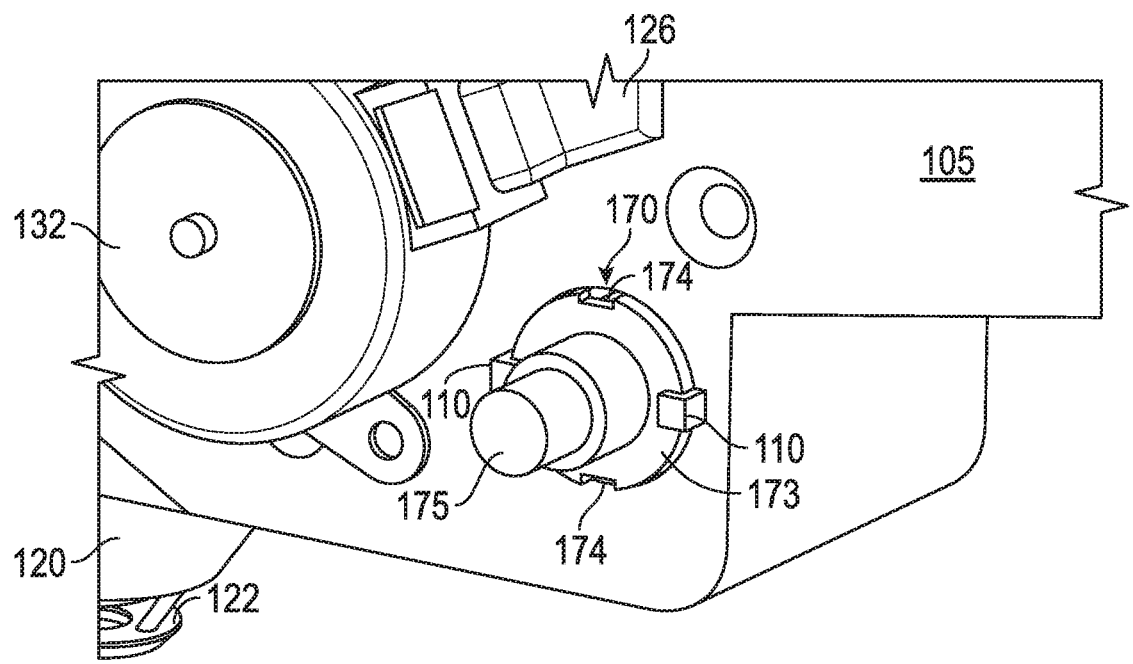
Figure 40:
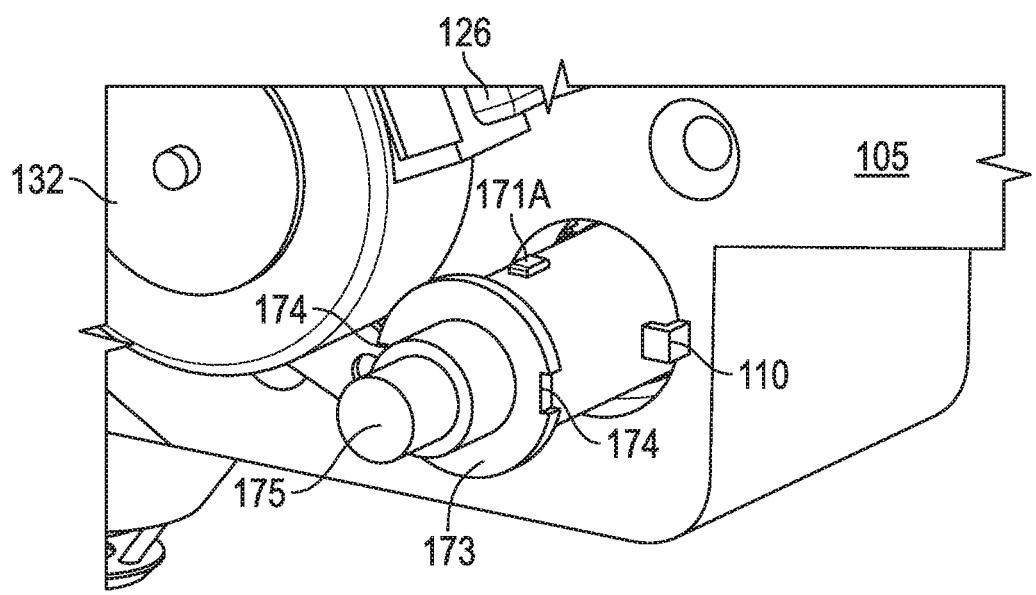
Figure 41:
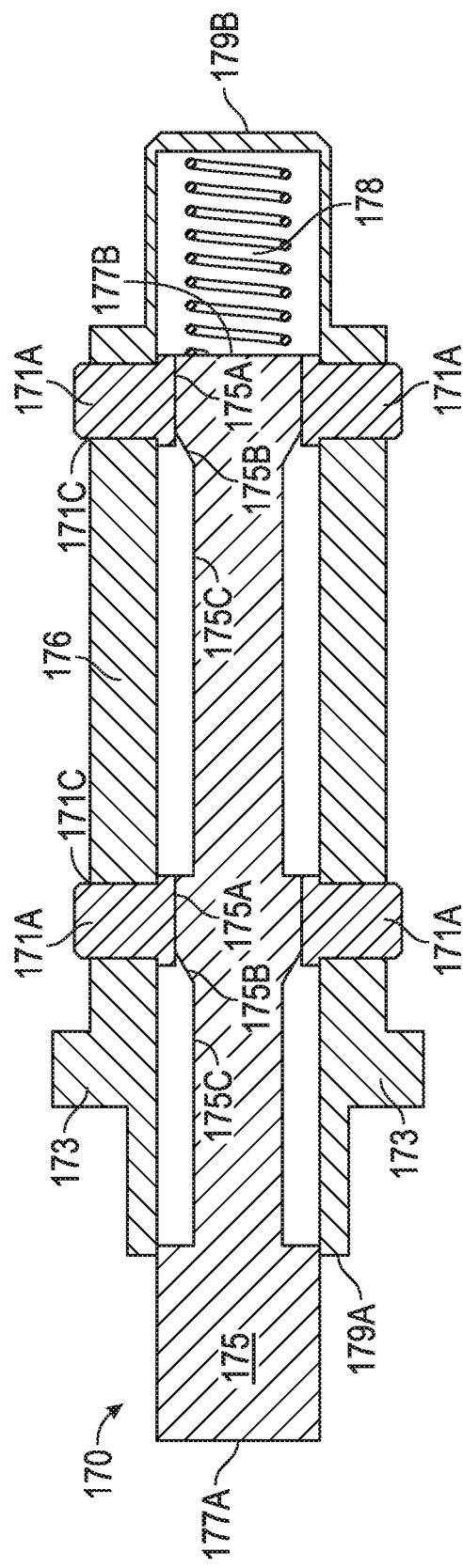
Figure 42:
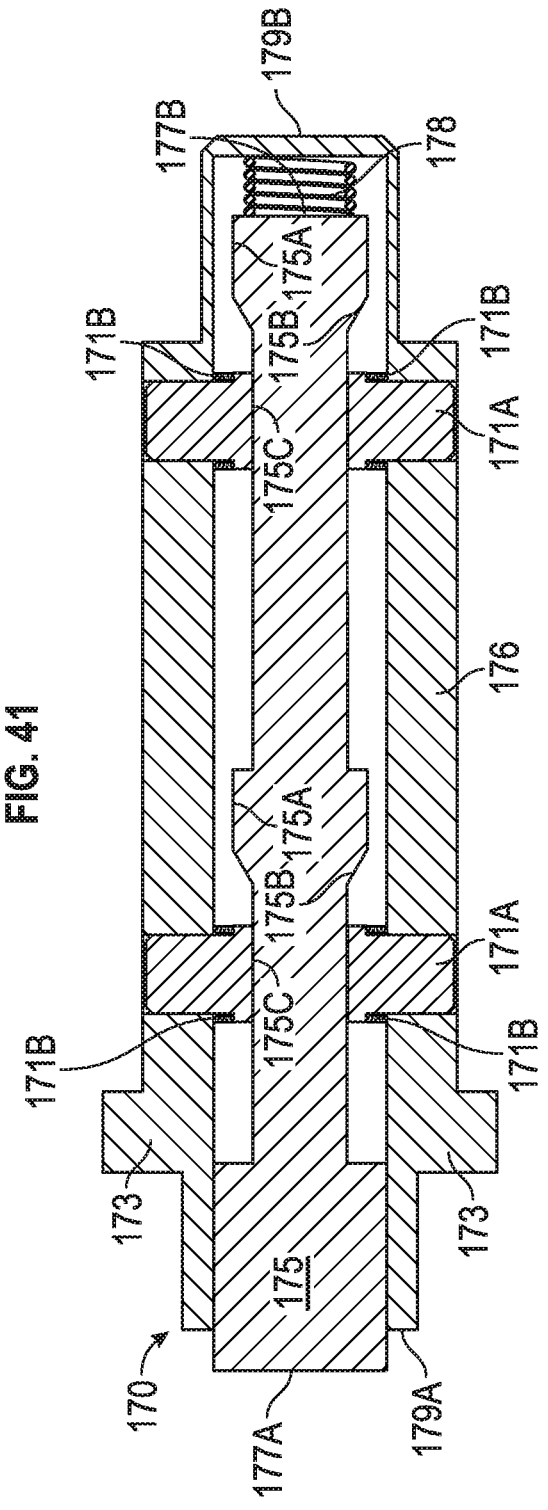

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a schematic, perspective view of the apparatus of FIGS. 43A, 43B, 43C, and 43D, according to one or more examples of the present disclosure;

FIG. 2 is a schematic, perspective view of the apparatus of FIGS. 43A, 43B, 43C, and 43D, according to one or more examples of the present disclosure;

FIG. 3 is a schematic, perspective, partial cut-away view of the apparatus of FIGS. 43A, 43B, 43C, and 43D, according to one or more examples of the present disclosure;

FIG. 4 is a schematic, perspective, partial cut-away view of the apparatus of FIGS. 43A, 43B, 43C, and 43D, according to one or more examples of the present disclosure;

FIG. 5 is a schematic, perspective, partial cut-away view of a portion of the apparatus of FIGS. 43A, 43B, 43C, and 43D, according to one or more examples of the present disclosure;

FIG. 6 is a schematic, perspective, partial cut-away view of a portion of the apparatus of FIGS. 43A, 43B, 43C, and 43D, according to one or more examples of the present disclosure;

FIG. 7 is a schematic, perspective, partial cut-away view of a portion of the apparatus of FIGS. 43A, 43B, 43C, and 43D, according to one or more examples of the present disclosure;

FIG. 8 is a schematic, perspective, partial cut-away view of a portion of the apparatus of FIGS. 43A, 43B, 43C, and 43D, according to one or more examples of the present disclosure;

FIG. 9 is a schematic, perspective, partial cut-away view of a portion of the apparatus of FIGS. 43A, 43B, 43C, and 43D, according to one or more examples of the present disclosure;

FIG. 10 is a schematic, perspective, partial cut-away view of a portion of the apparatus of FIGS. 43A, 43B, 43C, and 43D, according to one or more examples of the present disclosure;

FIG. 11 is a schematic, perspective, partial cut-away view of a portion of the apparatus of FIGS. 43A, 43B, 43C, and 43D, according to one or more examples of the present disclosure;

FIG. 12 is a schematic, perspective, partial cut-away view of a portion of the apparatus of FIGS. 43A, 43B, 43C, and 43D, according to one or more examples of the present disclosure;

FIG. 13 is a schematic, perspective, partial cut-away view of a portion of the apparatus of FIGS. 43A, 43B, 43C, and 43D, according to one or more examples of the present disclosure;

FIG. 14 is a schematic, side view of the plunger of the apparatus of FIGS. 43A, 43B, 43C, and 43D, according to one or more examples of the present disclosure;

FIG. 15 is a schematic, end view of the plunger of the apparatus of FIGS. 43A, 43B, 43C, and 43D, according to one or more examples of the present disclosure;

FIG. 16 is a schematic, side view of the stem and inner plunger of the apparatus of FIGS. 43A, 43B, 43C, and 43D, according to one or more examples of the present disclosure;

FIG. 17 is a schematic, end view of the inner plunger of the apparatus of FIGS. 43A, 43B, 43C, and 43D, according to one or more examples of the present disclosure;

FIG. 18 is a schematic, partial cut-away view of a portion of the apparatus of FIGS. 43A, 43B, 43C, and 43D, according to one or more examples of the present disclosure;

FIG. 19 is a schematic, partial cut-away view of a portion of the apparatus of FIGS. 43A, 43B, 43C, and 43D, according to one or more examples of the present disclosure;

FIG. 20 is a schematic, perspective view of a plunger mechanism of the apparatus of FIGS. 43A, 43B, 43C, and 43D, according to one or more examples of the present disclosure;

FIG. 21 is a schematic, perspective, partial cut-away view of the apparatus of FIGS. 43A, 43B, 43C, and 43D, according to one or more examples of the present disclosure;

FIG. 22 is a schematic, perspective cut-away view of the apparatus of FIGS. 43A, 43B, 43C, and 43D, according to one or more examples of the present disclosure;

FIG. 23 is a schematic, perspective view of a portion of the apparatus of FIGS. 43A, 43B, 43C, and 43D, according to one or more examples of the present disclosure;

FIG. 24 is a schematic, perspective, partial cut-away view of a portion of the apparatus of FIGS. 43A, 43B, 43C, and 43D, according to one or more examples of the present disclosure;

FIG. 25 is a schematic, perspective view of a portion of the apparatus of FIGS. 43A, 43B, 43C, and 43D, according to one or more examples of the present disclosure;

FIG. 26 is a schematic, perspective view of a portion of the apparatus of FIGS. 43A, 43B, 43C, and 43D, according to one or more examples of the present disclosure;

FIG. 27 is a schematic, perspective, partial cut-away view of a portion of the apparatus of FIGS. 43A, 43B, 43C, and 43D, according to one or more examples of the present disclosure;

FIG. 28 is a schematic, perspective, partial cut-away view of a portion of the apparatus of FIGS. 43A, 43B, 43C, and 43D, according to one or more examples of the present disclosure;

FIG. 29 is a schematic, perspective, partial cut-away view of a portion of the apparatus of FIGS. 43A, 43B, 43C, and 43D, according to one or more examples of the present disclosure;

FIG. 30 is a schematic, perspective, partial cut-away view of a portion of the apparatus of FIGS. 43A, 43B, 43C, and 43D, according to one or more examples of the present disclosure;

FIG. 31 is a schematic, perspective, partial cut-away view of a portion of the apparatus of FIGS. 43A, 43B, 43C, and 43D, according to one or more examples of the present disclosure;

FIG. 32 is a schematic, perspective, partial cut-away view of the apparatus of FIGS. 43A, 43B, 43C, and 43D, according to one or more examples of the present disclosure;

FIG. 33 is a schematic, perspective, partial cut-away view of the apparatus of FIGS. 43A, 43B, 43C, and 43D, according to one or more examples of the present disclosure;

FIG. 34 is a schematic, perspective, partial cut-away view of the apparatus of FIGS. 43A, 43B, 43C, and 43D, according to one or more examples of the present disclosure;

FIG. 35 is a schematic, perspective, partial cut-away view of the apparatus of FIGS. 43A, 43B, 43C, and 43D, according to one or more examples of the present disclosure;

FIG. 36 is a schematic, perspective, partial cut-away view of a portion of the apparatus of FIGS. 43A, 43B, 43C, and 43D, according to one or more examples of the present disclosure;

FIG. 37 is a schematic, perspective view of a portion of the apparatus of FIGS. 43A, 43B, 43C, and 43D, according to one or more examples of the present disclosure;

FIG. 38 is a schematic, perspective view of a portion of the apparatus of FIGS. 43A, 43B, 43C, and 43D, according to one or more examples of the present disclosure;

FIG. 39 is a schematic, perspective view of a portion of the apparatus of FIGS. 43A, 43B, 43C, and 43D, according to one or more examples of the present disclosure;

FIG. 40 is a schematic, perspective view of a portion of the apparatus of FIGS. 43A, 43B, 43C, and 43D, according to one or more examples of the present disclosure;

FIG. 41 is a schematic, cross-section view of the take-up mechanism of the apparatus of FIGS. 43A, 43B, 43C, and 43D, according to one or more examples of the present disclosure;

FIG. 42 is a schematic, cross-section view of the take-up mechanism of the apparatus of FIGS. 43A, 43B, 43C, and 43D, according to one or more examples of the present disclosure;

FIGS. 43A-43D, collectively, are a block diagram of an apparatus for installing pre-molded seal caps onto fasteners that extend from a surface, according to one or more examples of the present disclosure.

Figure 43A:
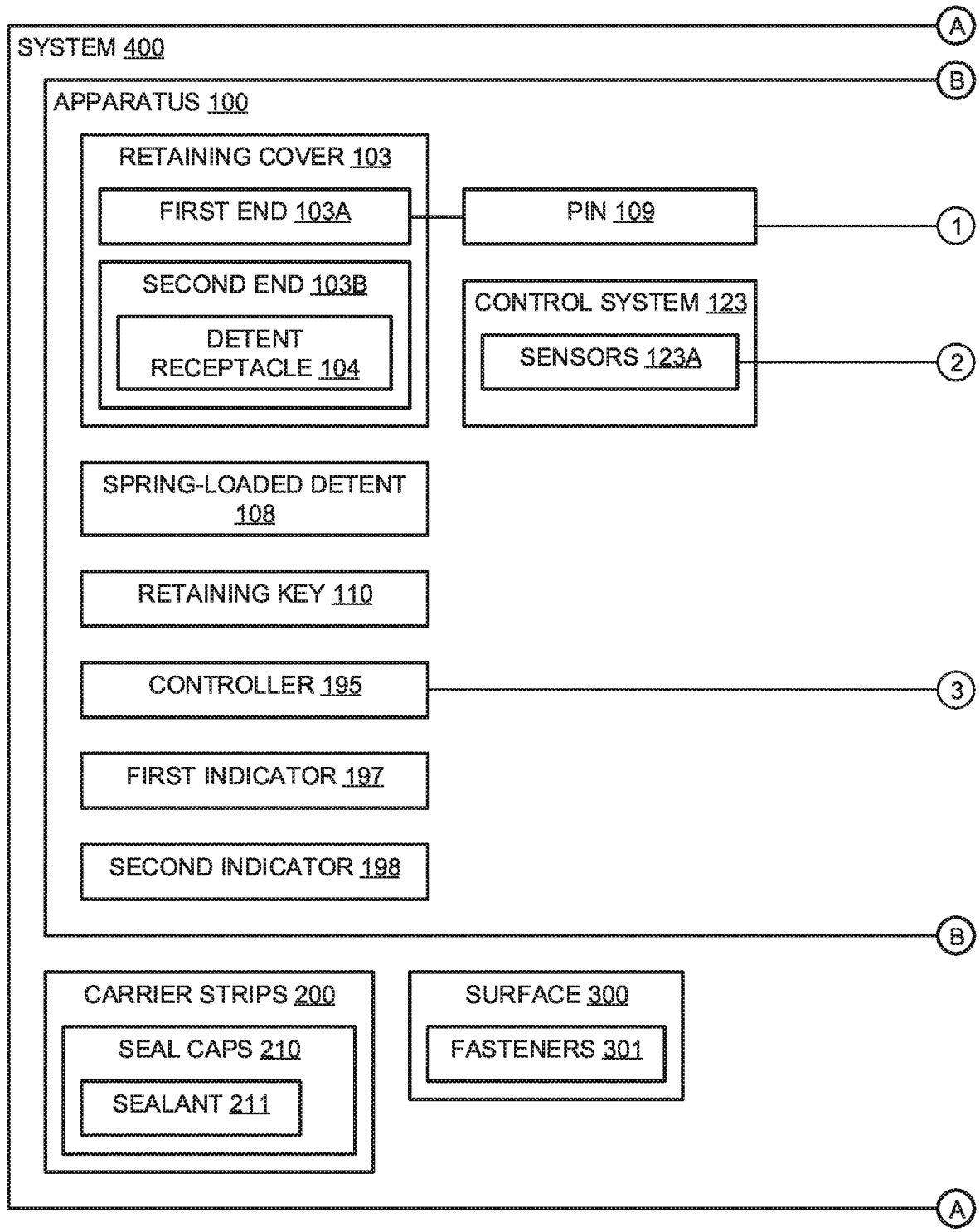
Figure 43B:
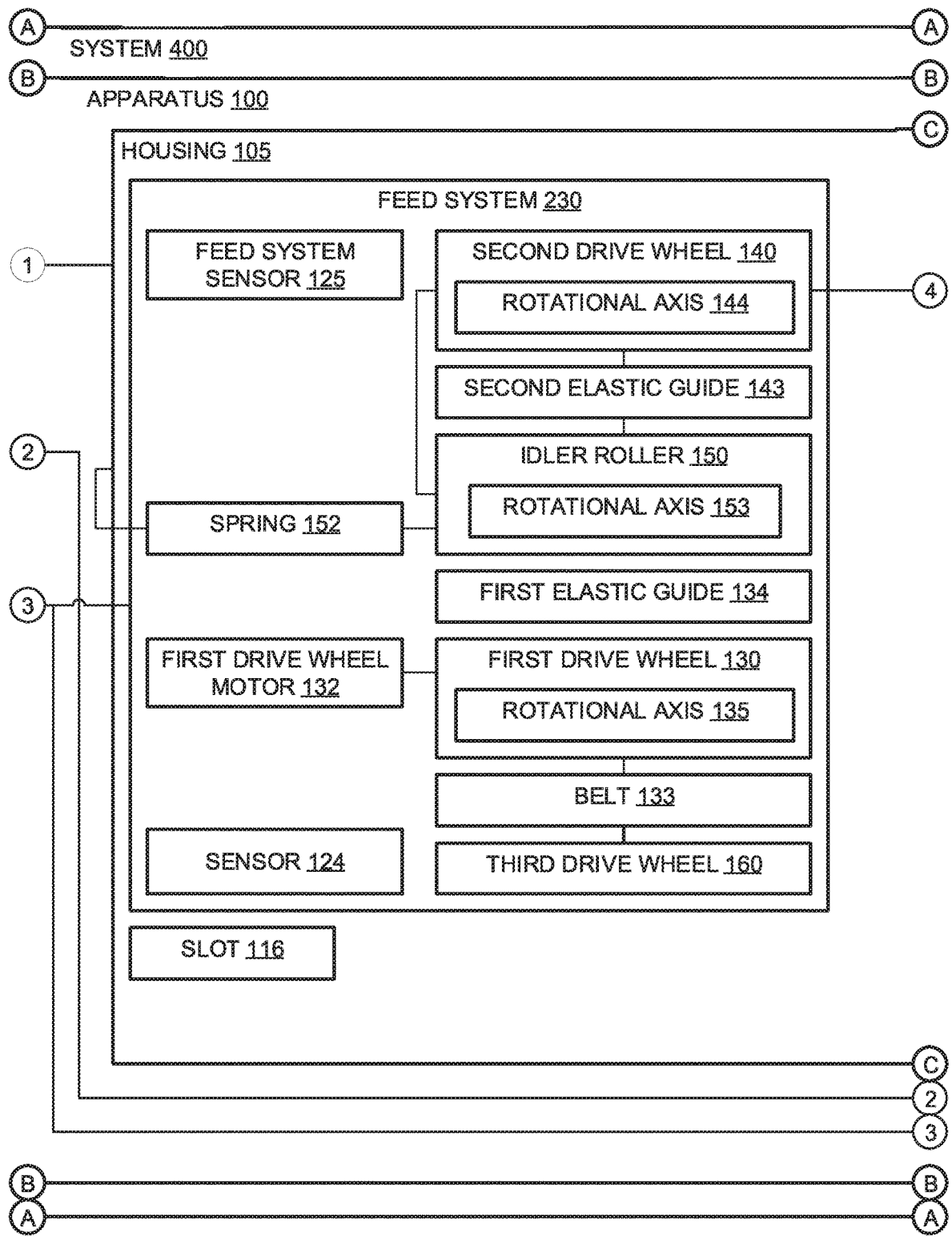
Figure 43C:
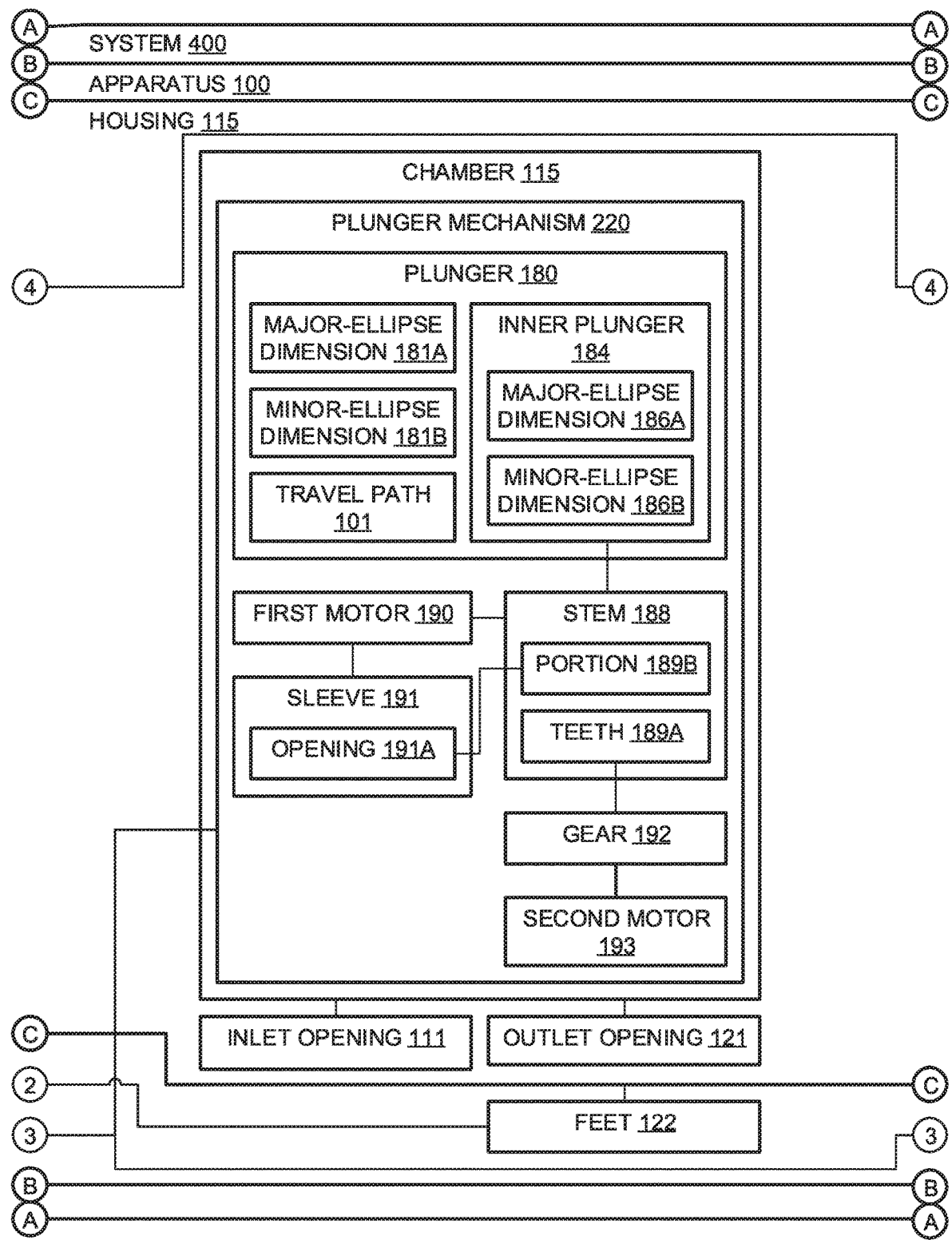
Figure 43D:
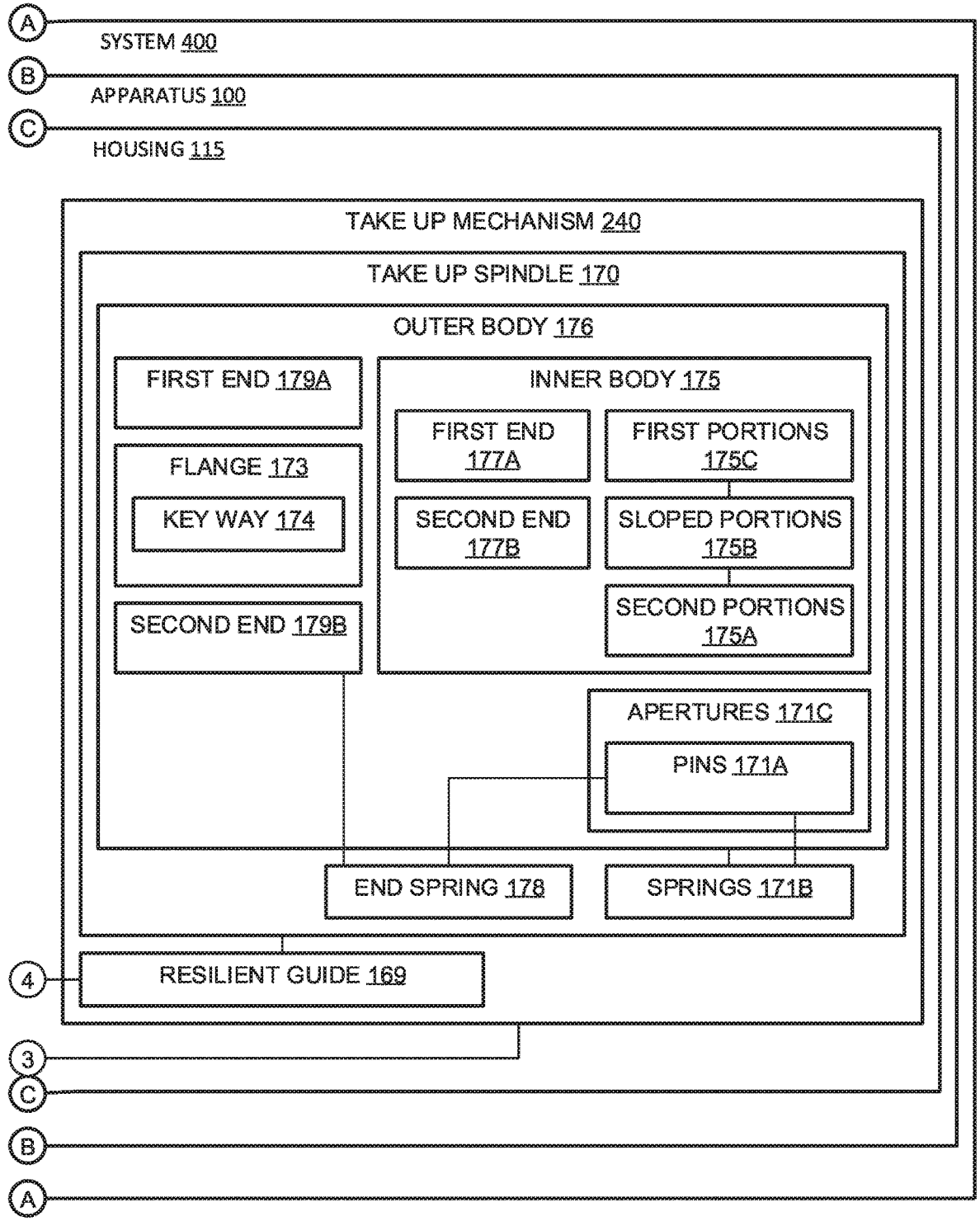
Figure 44A:
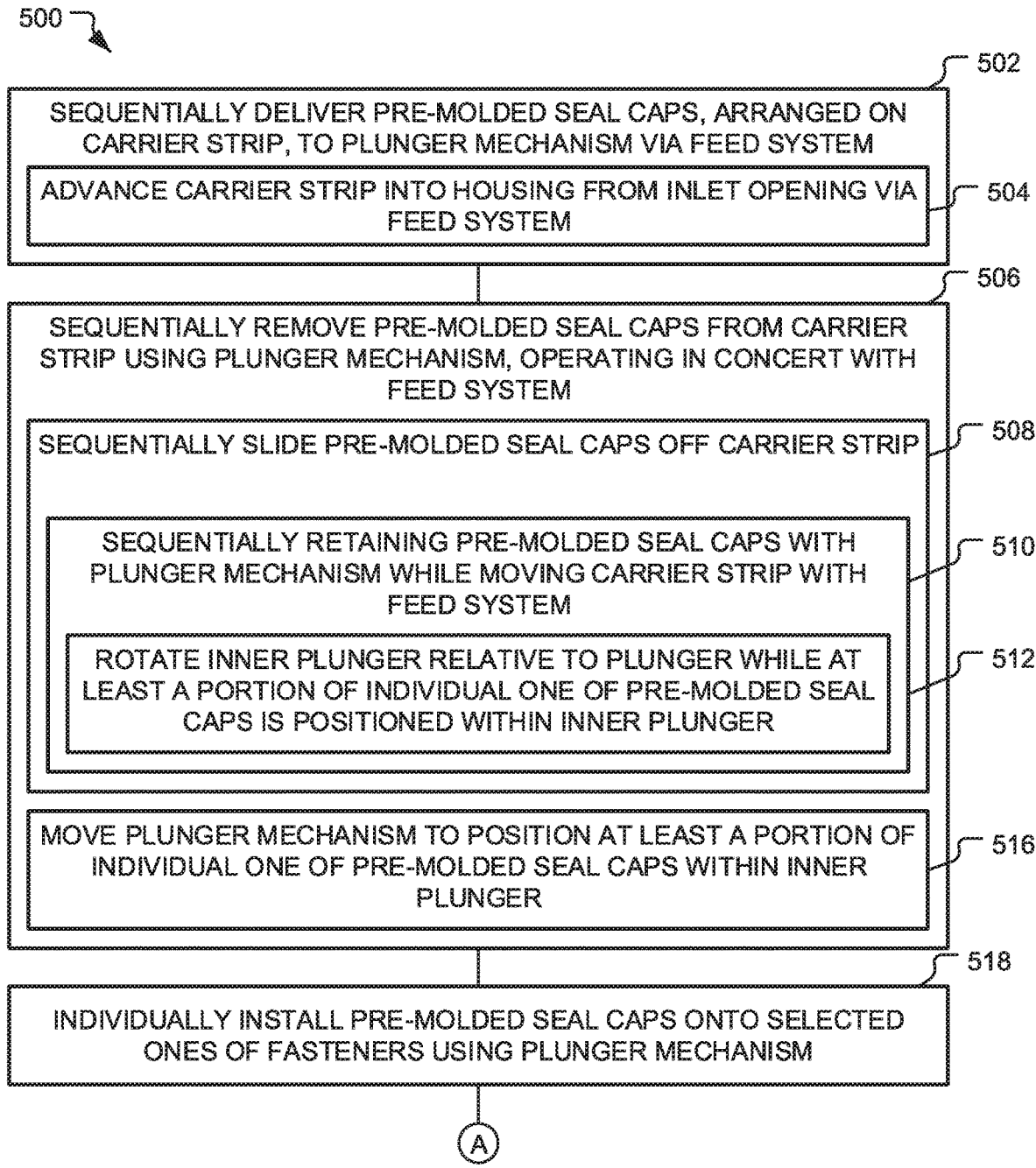
Figure 44B:
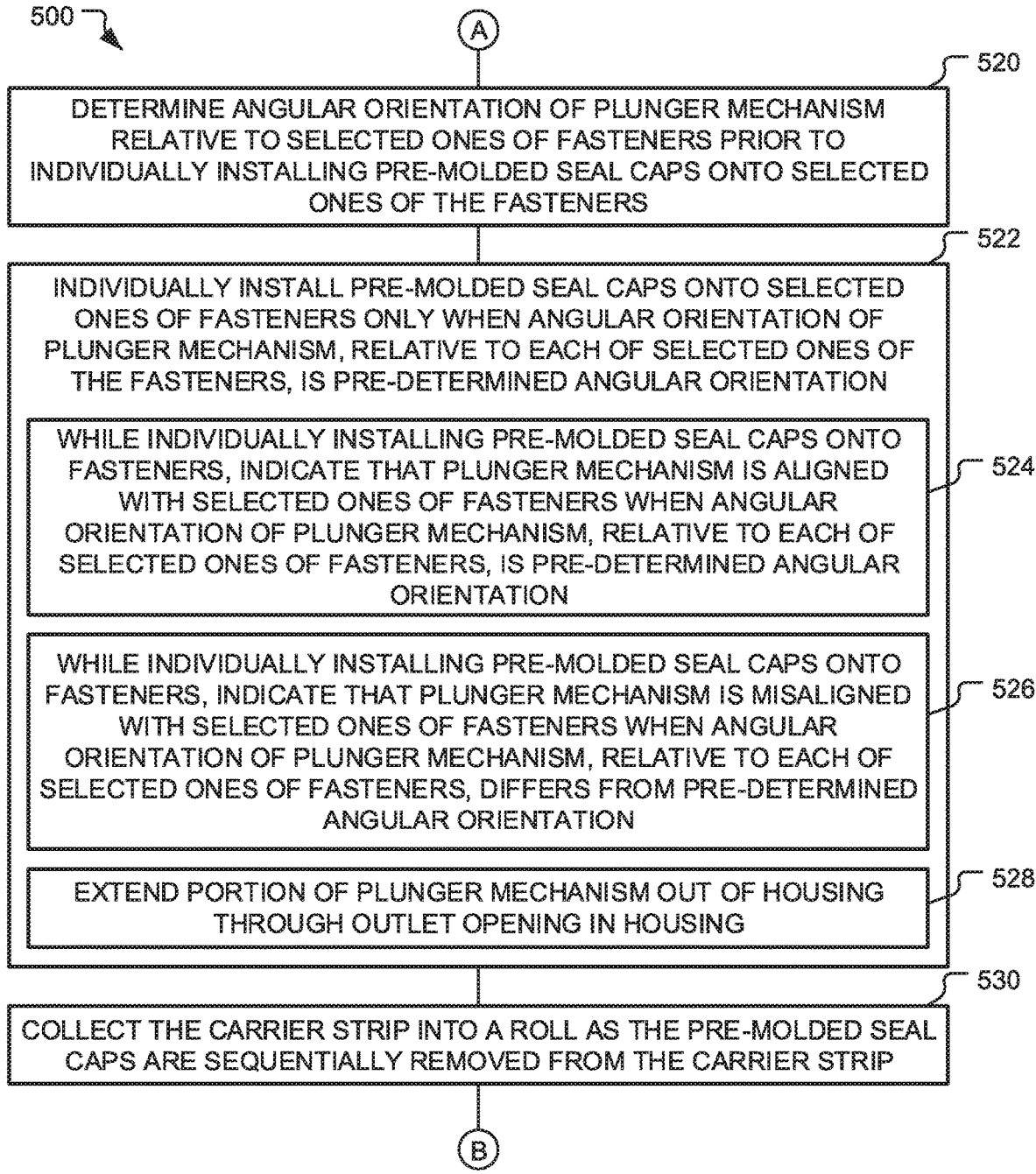
Figure 44C:
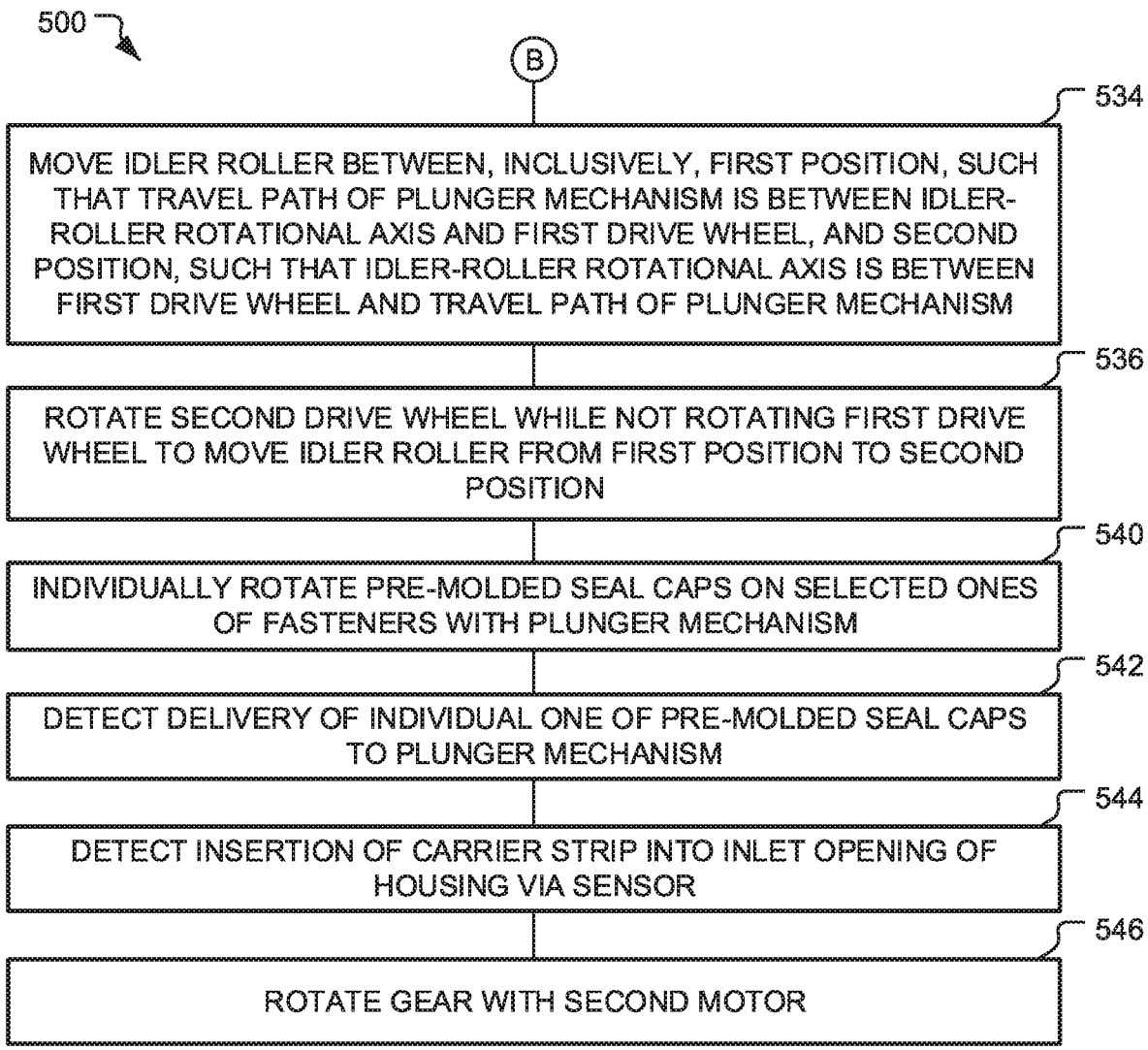

FIGS. 44A-44C, collectively, are a block diagram of a method of installing pre-molded seal caps onto fasteners that extend from a surface utilizing the apparatus of FIGS. 43A, 43B, 43C, and 43D, according to one or more examples of the present disclosure.

Figure 45:
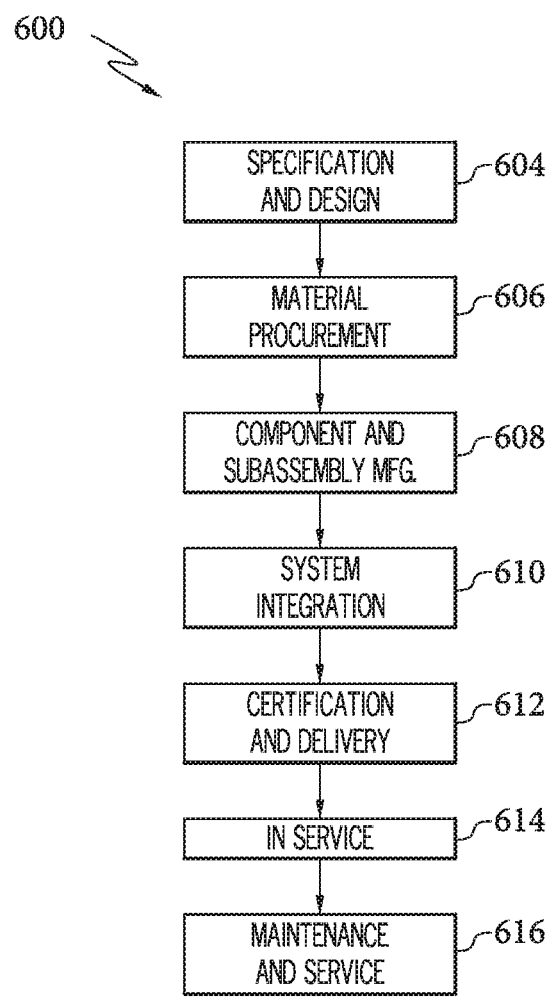

FIG. 45 is a block diagram of aircraft production and service methodology; and

Figure 46:
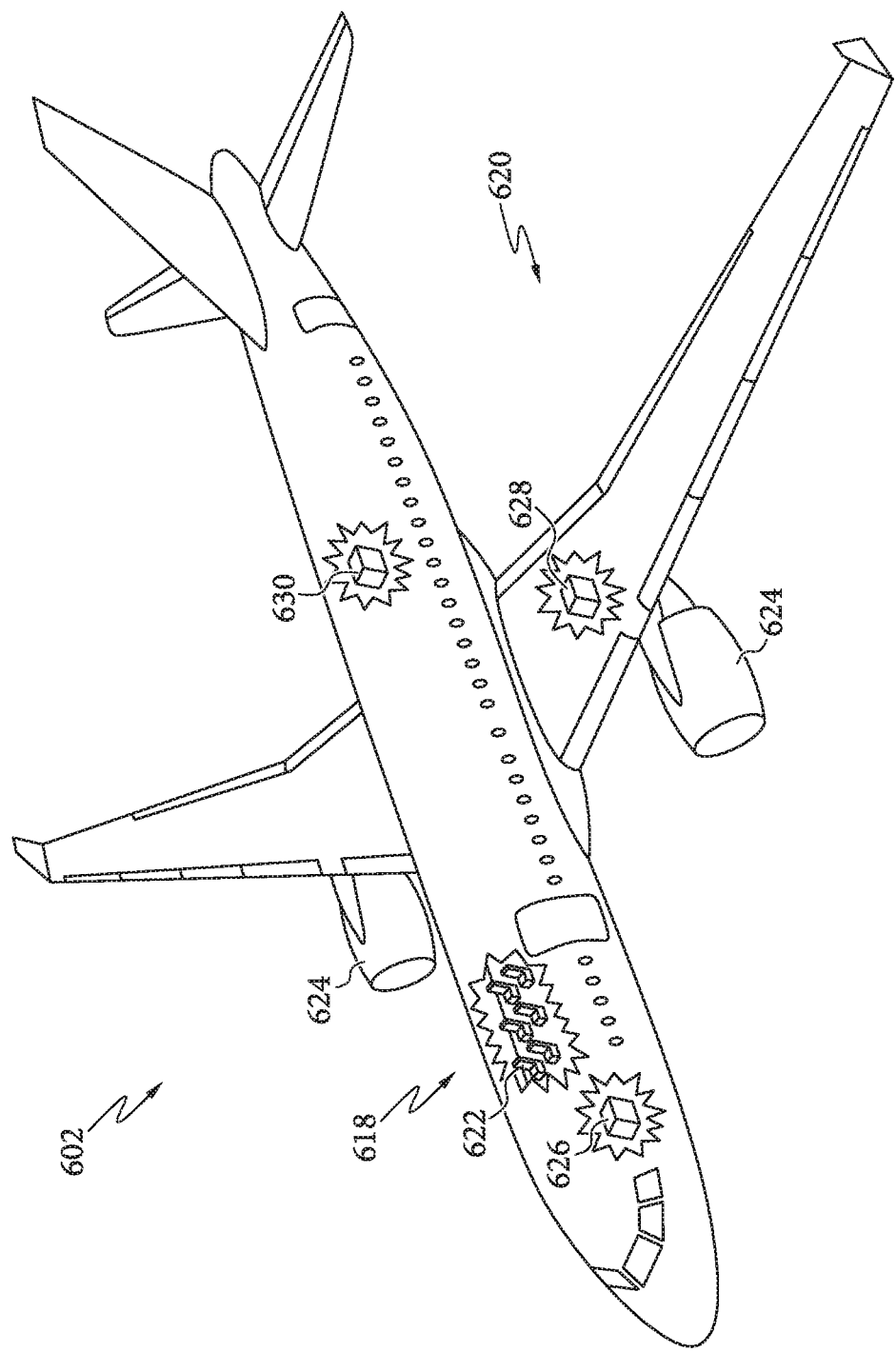

FIG. 46 is a schematic illustration of an aircraft.

DETAILED DESCRIPTION

In FIGS. 43A, 43B, 43C, and 43D, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 43A, 43B, 43C, and 43D may be combined in various ways without the need to include other features described in FIGS. 43A, 43B, 43C, and 43D, other drawing figures, and/or the accompanying disclosure, even though such combination or combinations are not explicitly illustrated herein. Similarly, additional features not limited to the examples presented, may be combined with some or all of the features shown and described herein.

In FIGS. 44A-44C, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 44A-44C and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 43A, 43B, 43C, and 43C and particularly to, e.g., FIGS. 1-4, 8-13, 21, 22, 24, 27, 28, 32-36, apparatus 100 for installing pre-molded seal caps 210 onto fasteners 301 that extend from a surface 300 is disclosed. Apparatus 100 comprises plunger mechanism 220, configured to individually install pre-molded seal caps 210 onto selected ones of fasteners 301. Apparatus 100 also comprises feed system 230, configured to sequentially deliver pre-molded seal caps 210, arranged on carrier strip 200, to plunger mechanism 220. Apparatus 100 additionally comprises take-up mechanism 240, configured to collect carrier strip 200 as pre-molded seal caps 210 are sequentially removed from carrier strip 200. Plunger mechanism 220 is also configured to operate in concert with feed system 230 to sequentially remove pre-molded seal caps 210 from carrier strip 200. The preceding subject matter of this paragraph characterizes example 1 of the present disclosure.

Apparatus 100 provides for installing pre-molded seal caps 210 that are arranged on carrier strip 200 on fasteners 301 that extend from surface 300. Apparatus 100 is configured to individually remove pre-molded seal caps 210 one at a time from carrier strip 200 and individually install pre-molded seal caps 210, removed from carrier strip 200, onto fasteners 301 that extend from surface 300. Feed system 230 transports carrier strip 200 within apparatus 100 and operates in concert with plunger mechanism 220 to sequentially remove pre-molded seal caps 210 from carrier strip 200. Plunger mechanism 220 installs removed pre-molded seal caps 210 onto fasteners 301. Apparatus 100 enables the automated sequential removal of pre-molded seal caps 210 from carrier strip 220 and installation of removed pre-molded seal caps 210 onto fasteners 301 that extend from surface 300. Take-up mechanism 240 prevents carrier strip 200 from becoming entangled by collecting carrier strip 200 as pre-molded seal caps 210 are sequentially removed from carrier strip 200.

Apparatus 100 is configured to facilitate a reduction in the labor, time, and inaccuracies associated with the installation of pre-molded seal caps 210 onto fasteners 301 that extend from surface 300. Generally, apparatus 100 is used for automated removal of pre-molded seal caps 210 from carrier strip 200 and automated installation of pre-molded seal caps 210 onto fasteners 301. Carrier strip 200, having pre-molded seal caps 210, attached along carrier strip 200, is fed into apparatus 100. Feed system 230 of apparatus 100 is configured to transport carrier strip 200 through apparatus 100 and to position pre-molded seal caps 210 to be individually removed from carrier strip 200 by plunger mechanism 220, operating in concert with feed system 230. As pre-molded seal caps 210 are removed from carrier strip 200, carrier strip 200 is wrapped or spooled onto take-up mechanism 240. In one example, take-up mechanism 240 is a spool, configured to collect carrier strip 200.

Referring generally to FIGS. 43A, 43B, 43C, and 43D and particularly to, e.g., FIGS. 23-26, apparatus 100 further comprises control system 123, configured to enable plunger mechanism 220 to individually install pre-molded seal caps 210 onto the selected ones of fasteners 301 after plunger mechanism 220 individually removes pre-molded seal caps 210 from carrier strip 200 only when plunger mechanism 220 has a predetermined angular orientation relative to each of the selected ones of fasteners 301. The preceding subject matter of this paragraph characterizes example 2 of the present disclosure, wherein example 2 also includes the subject matter according to example 1, above.

Plunger mechanism 220 removes an individual one of pre-molded seal caps 210 from carrier strip 200 and installs pre-molded seal caps 210 onto fasteners 301 that extend from surface 300. However, apparatus 100 will not permit the installation of pre-molded seal caps 210 onto fasteners 301 unless plunger mechanism 220 has a predetermined angular orientation with fasteners 301. Control system 123 ensures that plunger mechanism 220 of apparatus 100 has a predetermined angular orientation relative to each of selected ones of fasteners 301 prior to installing pre-molded seal caps 210 onto selected ones of fasteners 301. Controller prevents plunger mechanism 220 from installing pre-molded seal caps 210 onto fasteners 301 unless plunger mechanism 220 has the predetermined angular orientation with fasteners 301. The predetermined angular orientation ensures that an individual one of pre-molded seal caps 210 is properly installed onto one of fasteners 301.

As it is important that pre-molded seal caps 210 are installed onto fasteners 301 at an angle that is normal to surface 300, a control system 123 prevents movement of plunger mechanism 220 if plunger mechanism 220 does not have the proper orientation with respect to fastener 301. Control system 123 determines the orientation of plunger mechanism 220 with respect to fastener 301 and communicates the orientation to controller 195, which controls the operation of plunger mechanism 220, feed system 230, and take-up mechanism 240.

Referring generally to FIGS. 43A, 43B, 43C, and 43D and particularly to, e.g., FIGS. 3, 4, 8-13, 21, 22, 24, 27-29, 32-35, apparatus 100 further comprises housing 105 that comprises chamber 115, inlet opening 111, in communication with chamber 115, and outlet opening 121, in communication with chamber 115. Feed system 230 is positioned within housing 105 and plunger mechanism 220 is positioned within chamber 115. Feed system 230 is configured to transport carrier strip 200 to chamber 115. Plunger mechanism 220 is configured to transport pre-molded seal caps 210, removed from carrier strip 200, out of chamber 115 of housing 105 through outlet opening 121. The preceding subject matter of this paragraph characterizes example 3 of the present disclosure, wherein example 3 also includes the subject matter according to example 2, above.

Inlet opening 111 permits insertion of carrier strip 200 into housing 105. Plunger mechanism 220 is positioned within chamber 115 and is configured to move within chamber 115. Outlet opening 121 permits plunger mechanism 220 to move outside of housing 105 to install pre-molded seal caps 210 onto fasteners 301. Feed system 230 transports carrier strip 200 within housing 105 to chamber 115. Plunger mechanism 220 transports an individual one of pre-molded seal caps 210 removed from carrier strip 200 out outlet opening 121 to be installed onto selected ones of fasteners 301.

Housing 105 of apparatus 100 comprises inlet opening 111 positioned adjacent first end 106 of housing 105 and outlet opening 121 positioned adjacent second end 107 of housing 105. Upper guide 113 and lower guide 114 of housing 105 Outlet opening 121 is in cone 120 at second end 107 of housing 105. Guides 113, 114 are positioned adjacent to the travel path of carrier strip 200 through housing 105 of apparatus 100 to guide carrier strip 200 as it moves within housing 105. Carrier strip 200 passes through longitudinal passageway 112 of housing 105 as carrier strip 200 moves from inlet opening 111 to chamber 115 of housing 105. Cone 120 includes a plurality of feet 122, configured to ensure apparatus is positioned at a normal angle with respect to surface 300 as discussed herein. Housing 105 comprises handle 117 to enable an operator to handle apparatus 100. Handle 117 includes button 118 that operator pushes to cause the automated installation of pre-molded seal caps 210 into fasteners 301 extending from surface 300. Button 118 is connected to controller 195 that controls the operation of plunger mechanism 220, feed system 230, and take-up mechanism 240 of apparatus 100 as discussed herein. Apparatus 100 comprises battery 194 that provides electricity to the various components of apparatus 100.

Referring generally to FIGS. 43A, 43B, 43C, and 43D and particularly to, e.g., FIGS. 21-26 and 31, apparatus 100 further comprises at least three feet 122, positioned adjacent outlet opening 121 and configured to be positioned around one of fasteners 301. Each one of at least three feet 122 is configured to retract into housing 105 only when plunger mechanism 220 has the predetermined angular orientation relative to one of fasteners 301 and a downward force is applied to housing 105. The preceding subject matter of this paragraph characterizes example 4 of the present disclosure, wherein example 4 also includes the subject matter according to example 3, above.

At least three feet 122 are configured to be positioned around one of fasteners 301 that extends from surface 300 to properly position apparatus 100 with respect to one of fasteners 301. At least three feet 122 are also configured to retract into housing 105 when a downward force is applied to housing 105, but only when plunger mechanism 220 of apparatus 100 has a predetermined angular orientation relative to fasteners 301. At least three feet 122 ensure that plunger mechanism 220 has the predetermined angular orientation relative to a selected one of fasteners 301 as at least three feet 122 will not each retract into housing 105 unless plunger mechanism 220 has the predetermined angular orientation. The predetermined angular orientation ensures that plunger mechanism 220 is properly aligned with the selected one of fasteners 301 to assure proper installation of an individual one of pre-molded seal caps 210 onto the selected one of fasteners 301.

FIG. 22 shows apparatus 100 positioned on fastener 301 extending from surface 300. Fastener 301 is positioned within feet 122 of apparatus 100. In FIG. 22, feet 122 are not retracted into housing 105 of apparatus 100. FIG. 23 shows a close-up view of feet 122 positioned around fastener 301. FIG. 24 shows a close-up view with a portion of housing 105 removed after a downward force has been applied to apparatus 100. Each feet 122 has been retracted within housing 105, indicating apparatus 100 is positioned normal to surface 300. Thus, plunger 180 has the predetermined angular orientation with respect to fastener 301. FIG. 25 shows feet 122 in extended positions and FIG. 26 show feet 122 retracted within housing 105. FIG. 27 shows idler roller 150 moved to its second position to enable plunger 180 and a retained one of pre-molded seal caps 210 to move down chamber 115 and through outlet opening 121.

Referring generally to FIGS. 43A, 43B, 43C, and 43D and particularly to, e.g., FIGS. 25, 26, and 29, control system 123 comprises at least three sensors 123A and each one of at least three sensors 123A indicates when a corresponding one of at least three feet 122 is retracted within housing 105. The preceding subject matter of this paragraph characterizes example 5 of the present disclosure, wherein example 5 also includes the subject matter according to example 4, above.

At least three sensors 123A and corresponding ones of at least three feet 122 are part of control system 123 that ensures that plunger mechanism 220 of apparatus 100 has a predetermined angular orientation relative to the selected ones of fasteners 301 prior to installing pre-molded seal caps 210 onto the selected ones of fasteners 301. At least three sensors 123A indicate when each of at least three feet 122 is retracted within housing 105 to ensure that plunger mechanism 220 has the predetermined angular orientation with respect to fasteners 301. Control system 123 prevents installation of pre-molded seal caps 210 onto fasteners 301 unless plunger mechanism 220 has the predetermined angular orientation with respect to fasteners 301.

Referring generally to FIGS. 43A, 43B, 43C, and 43D and particularly to, e.g., FIGS. 25, 26, 28, 29, and 31, plunger mechanism 220 is configured to sequentially install pre-molded seal caps 210 onto the selected ones of fasteners 301 only when each one of at least three sensors 123A indicates that at least three feet 122 are retracted within housing 105. The preceding subject matter of this paragraph characterizes example 6 of the present disclosure, wherein example 6 also includes the subject matter according to example 5, above.

Apparatus 100 will not move plunger mechanism 220 out of outlet opening 121 unless each of at least three sensors 123A indicate that each of at least three feet 122 is retracted within housing 105, which indicates that plunger mechanism 220 has the predetermined angular orientation with respective ones of fasteners 301. Retraction of at least three feet 122 ensures that apparatus 100 has the predetermined angular orientation with respective ones of fasteners 301 prior to installing pre-molded seal caps 210 onto respective fasteners 301. The predetermined angular orientation ensures that pre-molded seal caps 210 are proper installed onto fasteners 301.

Apparatus 100 includes feet 122 that a positioned adjacent to outlet opening 121. Feet 122 retract into a portion of housing 105 of apparatus 100 when a downward force is applied to housing 105. If outlet opening 121 is positioned normal to surface 300, all feet 122 will retract into housing 105 indicating that plunger mechanism 220 has the predetermined angular orientation with respect to fastener 301. At least three sensors 123A of control system 123 detect whether each of feet 122 are properly retracted into housing 105 indicating that the plunger mechanism has the predetermined angular orientation with respect to fastener 301.

Referring generally to FIGS. 43A, 43B, 43C, and 43D and particularly to, e.g., FIGS. 3, 4, 8-13, 21, 22, 24, and 27-35, plunger mechanism 220 comprises plunger 180, positioned within chamber 115 of housing 105. Plunger 180 has travel path 101 within chamber 115. Plunger 180 is configured to individually remove pre-molded seal caps 210 from carrier strip 200. Plunger 180 is also configured to sequentially transport pre-molded seal caps 210, removed from carrier strip 200, from chamber 115, through outlet opening 121, and onto the selected ones of fasteners 301. The preceding subject matter of this paragraph characterizes example 7 of the present disclosure, wherein example 7 also includes the subject matter according to any one of examples 3 to 6, above.

Plunger 180 moves along travel path 101 to position respective pre-molded seal cap 210 within a portion of plunger 180. Plunger 180 in conjunction with feed system 230 removes pre-molded seal caps 210 from carrier strip 200. Plunger 180 retains an individual one of pre-molded seal caps 210 while feed system 230 moves carrier strip 200 to remove the retained one of pre-molded seal cap 210s from carrier strip 200. Plunger 180 is also configured to move along travel path 101 to sequentially transport pre-molded seal caps 210 out outlet opening 121 of housing 105 and install pre-molded seal caps 210 onto selected ones of fasteners 301 that extend from surface 300. Plunger 180 individually removes pre-molded seal caps 210 from carrier strip 200, individually transports pre-molded seal caps 210 out of housing 105 to selected ones of fasteners 301, and individually installs pre-molded seal caps 210 onto fasteners 301.

Referring generally to FIGS. 43A, 43B, 43C, and 43D and particularly to, e.g., FIGS. 18, 19, and 29-31, plunger mechanism 220 further comprises inner plunger 184, positioned within plunger 180. Inner plunger 184 is configured to rotate with respect to plunger 180. The preceding subject matter of this paragraph characterizes example 8 of the present disclosure, wherein example 8 also includes the subject matter according to example 7, above.

The rotation of inner plunger 184 with respect to plunger 180 enables plunger mechanism 220 to selectively individually retain pre-molded seal caps 210 with a portion of plunger mechanism 220.

Referring generally to FIGS. 43A, 43B, 43C, and 43D and particularly to, e.g., FIGS. 15-19, plunger 180 is elliptical and has plunger major-ellipse dimension 181A and plunger minor-ellipse dimension 181B. Inner plunger 184 is elliptical and has inner-plunger major-ellipse dimension 186A and inner-plunger minor-ellipse dimension 186B. Inner plunger 184 has an initial position that aligns inner-plunger major-ellipse dimension 186A with plunger major-ellipse dimension 181A. Inner plunger 184 is configured to retain pre-molded seal caps 210 as inner plunger 184 rotates with respect to plunger 180 to align inner-plunger minor-ellipse dimension 186B with plunger major-ellipse dimension 181A. The preceding subject matter of this paragraph characterizes example 9 of the present disclosure, wherein example 9 also includes the subject matter according to example 8, above.

Inner plunger 184 is configured to retain an individual one of pre-molded seal caps 210 as inner plunger 184 rotates with respect to plunger 180 to align inner-plunger minor-ellipse dimension 186B with plunger major-ellipse dimension 181A. Elliptical shape of inner plunger 184 having inner-plunger major-ellipse dimension 186A and inner-plunger minor-ellipse dimension 186B enables rotation of inner plunger 184 with respect to plunger 180 to selectively retain an individual one of pre-molded seal caps 210 within inner plunger 184. The elliptical shape of plunger 180 causes inner plunger 184 to squeeze and retain an individual one of pre-molded seal caps 210 as inner plunger 184 rotates aligning inner-plunger minor-ellipse dimension 186B with plunger major-ellipse dimension 181A.

Plunger 180 comprises horizontal slot 182 that enables spring clip 187 to selectively connect plunger 180 to inner plunger 184. Spring clip 187 positioned within horizontal slot 182 of plunger 180 engages slot 185 of inner plunger 184 to selectively connect inner plunger 184 to plunger 180. In an initial position shown in FIG. 18, inner-plunger major-ellipse dimension 186A is aligned with plunger major-ellipse dimension 181A. As inner plunger 184 is rotated with respect to plunger 180, plunger minor-ellipse dimension 181B causes inner-plunger major-ellipse dimension 186A of inner plunger 184 to move inwards. FIG. 19 shows inner-plunger major-ellipse dimension 186A of inner plunger 184 aligned with plunger minor-ellipse dimension 181B of plunger 180. The rotation from the initial position enables inner plunger 184 to selectively retain a selected individual one of pre-molded seal caps 210 within a portion of inner plunger 184.

Referring generally to FIGS. 43A, 43B, 43C, and 43D and particularly to, e.g., FIGS. 16 and 20-22, plunger mechanism 220 further comprises stem 188, connected to inner plunger 184, and first motor 190, configured to rotate stem 188 and inner plunger 184. The preceding subject matter of this paragraph characterizes example 10 of the present disclosure, wherein example 10 also includes the subject matter according to example 9, above.

The rotation of inner plunger 184 with respect to plunger 180 enables plunger mechanism 220 to selectively retain an individual one of pre-molded seal caps 210. Stem 188 enables plunger mechanism 220 to be moved up and down within chamber 115.

Referring generally to FIGS. 43A, 43B, 43C, and 43D and particularly to, e.g., FIGS. 20, 28, 30, 32, and 33, plunger mechanism 220 comprises sleeve 191, connected to first motor 190 and having opening 191A. Stem 188 of plunger mechanism 220 comprises portion 189B that engages opening 191A in sleeve 191. When sleeve 191 is rotated with respect to plunger 180, opening 191A engages portion 189B of stem 188, causing stem 188 and inner plunger 184 to rotate with respect to plunger 180. The preceding subject matter of this paragraph characterizes example 11 of the present disclosure, wherein example 11 also includes the subject matter according to example 10, above.

First motor 190 causes sleeve 191 to rotate with respect to plunger 180. As sleeve 191 rotates with respect to plunger 180, stem 188 and inner plunger 184 also rotate with respect to plunger 180 due to portion 189B of stem 188 positioned within opening 191A in sleeve 191.

Referring generally to FIGS. 43A, 43B, 43C, and 43D and particularly to, e.g., FIGS. 13, 16, 20, 28, 29, and 31, stem 188 of plunger mechanism 220 comprises plurality of teeth 189A. The preceding subject matter of this paragraph characterizes example 12 of the present disclosure, wherein example 12 also includes the subject matter according to example 10 or 11, above.

Teeth 189A enable a gear 192 to engage teeth 189A to move stem 188 up and down within chamber 115 of housing 105.

Referring generally to FIGS. 43A, 43B, 43C, and 43D and particularly to, e.g., FIGS. 1, 3, 8, 9, 11-13, 21, 22, 27, 28, 30, 32-35, plunger mechanism 220 further comprises gear 192 and second motor 193, configured to rotate gear 192. Gear 192 engages plurality of teeth 189A on stem 188 of plunger mechanism 220 to move plunger 180, inner plunger 184, and stem 188 within chamber 115. The preceding subject matter of this paragraph characterizes example 13 of the present disclosure, wherein example 13 also includes the subject matter according to example 12, above.

Slot 183 enables gear 192 to move along stem 188 as gear 192 rotates moving stem 188 up or down within chamber 115. Plunger mechanism 220 also comprises second motor 193 that is configured to rotate gear 192. The rotation of gear 192 moves plunger 180, inner plunger 184, and stem 188 up or down within chamber 115 depending on the rotation of gear 192 by second motor 193.

Referring generally to FIGS. 43A, 43B, 43C, and 43D and particularly to, e.g., FIGS. 3, 4, 8-13, 21, 22, 24, 27-29, and 32-36, feed system 230 comprises first drive wheel 130, having first-drive-wheel rotational axis 135. Feed system 230 also comprises second drive wheel 140, rotatably mounted within housing 105. Feed system 230 further comprises idler roller 150, having idler-roller rotational axis 153 and configured to support a portion of carrier strip 200. Idler roller 150 is selectively locatable at least in a first position relative to housing 105, such that travel path 101 of plunger 180 is between idler-roller rotational axis 153 and first drive wheel 130, or in a second position, such that idler-roller rotational axis 153 is between first drive wheel 130 and travel path 101 of plunger 180. First drive wheel 130 is rotatably mounted within housing 105. First drive wheel 130 is configured to rotate about first-drive-wheel rotational axis 135 to transport carrier strip 200 from inlet opening 111 to chamber 115. The preceding subject matter of this paragraph characterizes example 14 of the present disclosure, wherein example 14 also includes the subject matter according to any one of examples 7 to 13, above.

The rotation of first drive wheel 130 about first-drive-wheel rotational axis 135 moves carrier strip 200 from inlet opening 111 in housing 105 to chamber 115 within housing 105. First drive wheel 130 enables carrier strip 200 to move from inlet opening 111 into housing 105 and to position pre-molded seal caps 210 on carrier strip 200 to be positioned below plunger mechanism 220. Idler roller 150 rotates about idler-roller rotational axis 153 as carrier strip 200 moves from idler roller 150 to second drive wheel 140. Idler roller 150 is selectively locatable between a first position relative to housing 105 and a second position relative to housing 105. In the first position, travel path 101 of plunger 180 is between idler-roller rotational axis 153 and first drive wheel 130. In the second position, idler-roller rotational axis 153 is between first drive wheel 130 and travel path 101 of plunger 180. Idler roller 150 supports a portion of carrier strip 200 as it travels within housing 105. Idler roller 150 supports a portion of carrier strip 200 as idler roller 150 moves. Movement of idler roller 150 enables carrier strip 200 to be moved out of travel path 101 of plunger 180. Second drive wheel 140 transports carrier strip 200 to take-up mechanism 240 after pre-molded seal caps 210 are removed from carrier strip 200.

First drive wheel 130 rotates about first-drive-wheel rotational axis 135 to move carrier strip 200 from inlet opening 111 into housing 105 of apparatus. First drive wheel 130 comprises teeth 131 configured to engage openings 201 along edges of carrier strip 200. As first drive wheel 130 rotates about first-drive-wheel rotational axis 135, teeth 131 engage openings 201 of carrier strip 200 moving carrier strip 200 in the direction of rotation of first drive wheel 130. The rotation of first drive wheel 130 causes third drive wheel 160 to rotate. Third drive wheel 160 comprises teeth 161, configured to engage openings 201 along edges of carrier strip 200. As third drive wheel 160 rotates, teeth 161 engage openings 201 of carrier strip 200 moving carrier strip 200 in the direction of rotation of third drive wheel 160. Controller 195 is configured to control the rotation of first drive wheel 130, as discussed herein, to individually position pre-molded seal caps 210 along travel path 101 of plunger mechanism 220. Controller 195 is also configured to control the rotation of second drive wheel 140 and to prevent the rotation of first drive wheel 130, as discussed herein, to move idler roller 150 from the first position to the second position. Second drive wheel 140 comprises teeth 141 configured to engage openings 201 along edges of carrier strip 200. As second drive wheel 140 rotates about second-drive-wheel rotational axis 144, teeth 141 engage openings 201 of carrier strip 200 moving carrier strip 200 in the direction of rotation of second drive wheel 140.

Referring generally to FIGS. 43A, 43B, 43C, and 43D and particularly to, e.g., FIGS. 1-3, 8, 10, 11, 24, 27, 28, 32, 33, and 36, housing 105 further comprises slot 116. A portion of idler roller 150 extends through slot 116. Slot 116 is configured to enable idler roller 150 to move between, inclusively, the first position, such that travel path 101 of plunger 180 is between idler-roller rotational axis 153 and first drive wheel 130, and the second position, such that idler-roller rotational axis 153 is between first drive wheel 130 and travel path 101 of plunger 180. The preceding subject matter of this paragraph characterizes example 15 of the present disclosure, wherein example 15 also includes the subject matter according to example 14, above.

Slot 116 enables idler roller 150 to move within housing 105. Idler roller 150 moves between, inclusively, the first position, such that travel path 101 of plunger 180 is between idler-roller rotational axis 153 and first drive wheel 130, and the second position, such that idler-roller rotational axis 153 is between first drive wheel 130 and travel path 101 of plunger 180. Movement of idler roller 150 to the second position enables plunger 180 to move along travel path 101 past idler roller 150 and carrier strip 200.

Slot 116 in housing 105 guides idler roller 150 as it moves between its first position and its second position. A portion of idler roller 150 extends through slot 116 in housing 105. Idler roller 150 includes flange 151 positioned outside of housing 105 that acts in concert with slot 116 to guide idler roller 150 as it moves between its positions. Idler roller 150 moves to the second position so that idler roller 150 and carrier strip 200 are out of the way of travel path 101 of plunger 180 to permit plunger to move downward within chamber 115 of housing 105. FIG. 24 shows a selected one of pre-molded seal caps 210 positioned within a portion of plunger 180 with idler roller 150 positioned in its first position with travel path 101 of plunger 180 positioned between idler-roller rotational axis 153 and first drive wheel 130. FIG. 27 shows idler roller 150 positioned in its second position with idler-roller rotational axis 153 positioned between first drive wheel 130 and travel path 101 of plunger 180. FIG. 28 shows rotation of gear 192 moving plunger 180 downward in chamber 115 of housing 105. FIG. 29 shows a partial cross-section of an individual one of pre-molded seal cap 210s retained within plunger 180 positioned on fastener 301. FIG. 31 shows a partial cross-section of an individual one of pre-molded seal caps 210 installed on fastener 301 as plunger 180 moves upward within chamber 115 of housing 105. FIG. 32 shows plunger 180 moved above within chamber 115 above slot 116 in housing 105 with idler roller 150 still in its second position. FIG. 33 shows idler roller 150 moved back to its first position. FIG. 34 shows feed system 230 advancing carrier strip 200 to position the next one of pre-molded seal caps 210 below plunger 180 and FIG. 35 shows the next one of pre-molded seal caps 210 positioned below plunger 180.

Referring generally to FIGS. 43A, 43B, 43C, and 43D and particularly to, e.g., FIGS. 3-13, 21, 22, 24, 27, 28, and 32-36, feed system 230 further comprises first drive-wheel motor 132, configured to selectively rotate first drive wheel 130. Feed system 230 also comprises third drive wheel 160. Feed system 230 additionally comprises at least one belt 133 between first drive wheel 130 and third drive wheel 160. At least one belt 133 is configured to rotate third drive wheel 160 by rotating first drive wheel 130. The preceding subject matter of this paragraph characterizes example 16 of the present disclosure, wherein example 16 also includes the subject matter according to example 14 or 15, above.

First drive-wheel motor 132 rotates first drive wheel 130 about first-drive-wheel rotational axis 135. At least one belt 133 is configured to rotate third drive wheel 160 by rotation of first drive wheel 130. At least one belt 133 enables transportation of carrier strip 200 from third drive wheel 160 to first drive wheel 130. At least one belt 133 between first drive wheel 130 and third drive wheel 160, positioned adjacent to inlet opening 111, transport carrier strip 200 into housing 105 to chamber 115. First drive wheel 130 and third drive wheel 160 act in concert to transport carrier strip 200 from inlet opening 111 of housing 105 to chamber 115 within housing 105.

Referring generally to FIGS. 43A, 43B, 43C, and 43D and particularly to, e.g., FIGS. 4, 7, and 11-13, feed system 230 comprises feed-system sensor 125, configured to detect an individual one of pre-molded seal caps 210 entering chamber 115. First drive-wheel motor 132 is configured to selectively stop the rotation of first drive wheel 130 responsive to feed-system sensor 125 detecting the individual one of pre-molded seal caps 210 entering chamber 115. The preceding subject matter of this paragraph characterizes example 17 of the present disclosure, wherein example 17 also includes the subject matter according to example 16, above.

Feed-system sensor 125 detects an individual one of pre-molded seal caps 210 upon entering chamber 115. First drive-wheel motor 132 is configured to selectively stop the rotation of first drive wheel 130 based on feed-system sensor 125 detecting the individual one of pre-molded seal caps 210 upon entering chamber 115. Feed system 230 is configured to stop the rotation of first drive-wheel motor 132 so that the detected individual one of pre-molded seal caps 210 is positioned along travel path 101 of plunger 180.

Feed-system sensor 125 detects when an individual one of pre-molded seal caps 210 enters chamber 115 of housing 105. When feed-system sensor 125 detects entry of an individual one of pre-molded seal caps 210 into chamber 115 of housing 105, feed-system sensor 125 sends a communication to controller 195 to cause controller 195 to control feed system 230 to position the detected individual one of pre-molded seal caps 210 along travel path 101 of plunger 180 so that the detected individual one of pre-molded seal caps 210 is removed from carrier strip 200 by plunger 180, acting in concert with feed system 230, as discussed herein.

Referring generally to FIGS. 43A, 43B, 43C, and 43D and particularly to, e.g., FIGS. 4, 8-13, 21, 22, 24, 27-29, and 32-36, take-up mechanism 240 comprises take-up spindle 170, configured to wind up carrier strip 200 into a roll. Second drive wheel 140 of feed system 230 is configured to rotate about second-drive-wheel rotational axis 144 to transport carrier strip 200 from idler roller 150 to take-up spindle 170. Second drive wheel 140 is configured to move idler roller 150 between, inclusively, the first position, such that travel path 101 of plunger 180 is between idler-roller rotational axis 153 and first drive wheel 130, and the second position, such that idler-roller rotational axis 153 is between first drive wheel 130 and travel path 101 of plunger 180. The preceding subject matter of this paragraph characterizes example 18 of the present disclosure, wherein example 18 also includes the subject matter according to example 16 or 17, above.

Take-up mechanism 240 comprises take-up spindle 170 that is configured to wind up carrier strip 200 onto take-up spindle 170 as pre-molded seal caps 210 are individually removed from carrier strip 200 so that carrier strip 200 does not become entangled within apparatus 100. Take-up spindle 170 wraps carrier strip 200 around itself after pre-molded seal caps 210 are removed from carrier strip 200. Second drive wheel 140 of apparatus 100 is configured to rotate about second-drive-wheel rotational axis 144 to transport carrier strip 200 from idler roller 150 to take-up spindle 170. Second drive wheel 140 is also configured to move idler roller 150 between, inclusively, the first position and the second position. Rotation of second drive wheel 140 while first drive wheel 130 does not rotate causes tension in carrier strip 200 pulling idler roller 150 from the first position to the second position. In the first position, travel path 101 of plunger 180 is between idler-roller rotational axis 153 and first drive wheel 130. In the second position, idler-roller rotational axis 153 is between first drive wheel 130 and travel path 101 of plunger 180 to enable plunger 180 to be able to move along travel path 101 past carrier strip 200.

Take-up mechanism comprises take-up spindle 170 that is configured to wind up carrier strip 200 onto take-up spindle 170 as pre-molded seal caps 210 are removed from carrier strip 200. Controller 195 is configured to control take-up spindle 170. Take-up motor 172A is in communication with controller 195 via electrical conduit 126. Take-up spindle 170 is connected to take-up pulley 172C. Take-up motor 172A is configured to rotate take-up spindle 170 by rotating take-up pulley 172C via take-up belt 172B. Controller 195 is configured to control and coordination the rotation of take-up spindle 170 as well as the rotations of first drive wheel 130 and second drive wheel 140 of feed system 230 to ensure take-up spindle 170 properly spools carrier strip 200 onto take-up spindle.

Referring generally to FIGS. 43A, 43B, 43C, and 43D and particularly to, e.g., FIGS. 8-11, 24, 27, and 36, take-up mechanism 240 further comprises resilient guide 169, positioned between take-up spindle 170 and second drive wheel 140. Resilient guide 169 is configured to apply tension to carrier strip 200 between second drive wheel 140 and take-up spindle 170. The preceding subject matter of this paragraph characterizes example 19 of the present disclosure, wherein example 19 also includes the subject matter according to example 18, above.

Resilient guide 169 is configured to apply tension to the portion of carrier strip 200 as it travels between second drive wheel 140 and take-up spindle 170 to ensure that carrier strip 200 properly spools onto take-up spindle 170. Tension applied to carrier strip 200 while being spooled onto take-up spindle 170 ensures carrier strip 200 is tightly spooled onto take-up spindle 170.

Referring generally to FIGS. 43A, 43B, 43C, and 43D and particularly to, e.g., FIGS. 3, 4, 8-13, 21, 22, 24, 27, 28, and 32-36, feed system 230 further comprises at least one first elastic guide 134 between first drive wheel 130 and idler roller 150. Feed system 230 also comprises at least one second elastic guide 143 between idler roller 150 and second drive wheel 140. Feed system 230 additionally comprises at least one spring 152, having a spring force and positioned between idler roller 150 and housing 105. The spring force of at least one spring 152 biases idler roller 150 to the first position, such that travel path 101 of plunger 180 is between idler-roller rotational axis 153 and first drive wheel 130. Second drive wheel 140 is configured to move idler roller 150 from the first position to the second position. The second position of idler roller 150 is such that idler-roller rotational axis 153 is between first drive wheel 130 and travel path 101 of plunger 180 when an individual one of pre-molded seal caps 210 is positioned within plunger 180 and a movement of idler roller 150 slides the individual one of pre-molded seal caps 210 off carrier strip 200. The rotation of second drive wheel 140 about second-drive-wheel rotational axis 144, while preventing rotation of first drive wheel 130 about first-drive-wheel rotational axis 135, creates a tension in carrier strip 200 that exceeds the spring force of at least one spring 152. The preceding subject matter of this paragraph characterizes example 20 of the present disclosure, wherein example 20 also includes the subject matter according to example 19, above.

At least one first elastic guide 134 and at least one second elastic guide 143 provide guides for carrier strip 200 as it is transported within housing 105 even during movement of idler roller 150. At least one spring 152 having a spring force that biases idler roller 150 to the first position, such that travel path 101 of plunger 180 is between idler-roller rotational axis 153 and first drive wheel 130. At least one spring 152 keeps idler roller 150 in the first position until the tension in carrier strip 200 is large enough to overcome the spring force, causing idler roller 150 to move towards the second position. The tension in carrier strip 200 is caused by rotation of second drive wheel 140 while first drive wheel 130 does not rotate. Second drive wheel 140 is configured to move idler roller 150 from the first position to the second position, such that idler-roller rotational axis 153 is between first drive wheel 130 and travel path 101 of plunger 180 when an individual one of pre-molded seal caps 210 is positioned within plunger 180. Movement of idler roller 150 while the individual one of pre-molded seal caps 210 is positioned within plunger 180 slides the individual one of pre-molded seal caps 210 off carrier strip 200. The rotation of second drive wheel 140 about second-drive-wheel rotational axis 144 while preventing rotation of first drive wheel 130 about first-drive-wheel rotational axis 135 creates a tension in carrier strip 200 that exceeds the spring force of at least one spring 152 moving idler roller 150 from the first position to the second position. The movement of idler roller 150 to the second position enables plunger 180 to move along travel path 101 past carrier strip 200 and idler roller 150.

Referring generally to FIGS. 43A, 43B, 43C, and 43D and particularly to, e.g., FIGS. 27, 28, and 35-42, when carrier strip 200 is spooled onto take-up spindle 170, take-up spindle 170 is removable from housing 105. The preceding subject matter of this paragraph characterizes example 21 of the present disclosure, wherein example 21 also includes the subject matter according to example 20, above.

Pre-molded seal caps 210 have been removed from carrier strip 200 spooled on take-up spindle 170. Take-up spindle 170 prevents carrier strip 200 from being entangled within apparatus 100 and permits removal of carrier strip 200 from housing 105 after all pre-molded seal caps 210, previously attached to carrier strip 200, have been installed on fasteners 301.

Referring generally to FIGS. 43A, 43B, 43C, and 43D and particularly to, e.g., FIGS. 41 and 42, take-up spindle 170 comprises outer body 176. Outer body 176 comprises outer-body first end 179A, outer-body second end 179B, flange 173, positioned between outer-body first end 179A and outer-body second end 179B, and plurality of apertures 171C, penetrating outer body 176. Take-up spindle 170 further comprises plurality of pins 171A, each positioned within one of plurality of apertures 171C and inner body 175, positioned within outer body 176. Inner body 175 comprises inner-body first end 177A, inner-body second end 177B that is opposite to inner-body first end 177A, first portions 175C, each having a first diameter, second portions 175A, each having a second diameter that is larger than the first diameter, and sloped portions 175B, connecting first portions 175C to second portions 175A. Take-up spindle 170 also comprises plurality of springs 171B, each positioned between a portion of a single one of plurality of pins 171A and outer body 176 and biasing plurality of pins 171A toward inner body 175. Take-up spindle 170 additionally comprises end spring 178, positioned between inner-body second end 177B and outer-body second end 179B and biasing inner body 175 to an initial position. With inner body 175 in the initial position, second portions 175A of inner body 175 are positioned adjacent to plurality of pins 171A and are configured so that plurality of pins 171A extend from outer body 176. When a force is applied to inner-body first end 177A toward inner-body second end 177B, end spring 178 is depressed to move inner body 175 toward outer-body second end 179B until first portions 175C of inner body 175 are positioned adjacent plurality of pins 171A. First portions 175C are configured so that plurality of pins 171A does not extend from outer body 176. The preceding subject matter of this paragraph characterizes example 22 of the present disclosure, wherein example 22 also includes the subject matter according to example 21, above.

Plurality of pins 171A extend from outer body 176 and are used to engage openings 201 on the edges of carrier strip 200. Pins 171A selectively retain the carrier strip 200 on outer body 176 of take-up spindle 170. Inner body 175 is biased by end spring 178 such that pins 171A are positioned adjacent second portions 175A of inner body 175 having a larger diameter, configured to extend plurality of pins 171A outward from outer body 176. Second portions 175A of inner body 175 and end spring 178 are configured so that pins 171A extend from outer body 176 to retain carrier strip 200. A force is applied to inner body 175 to depress end spring 178 causing movement of inner body 175. The movement of inner body 175 causes pins 171A to travel along sloped portions 175B to first portions 175C of inner body 175, having a smaller diameter. Sloped portions 175B enable pins 171A to travel between second portions 175A and first portions 175C. Springs 171B bias plurality of pins 171A toward inner body 175 causing plurality of pins 171A to retract within outer body 176, permitting carrier strip 200 to be removed from outer-body second end 179B in spooled form. Flange 173 prevents carrier strip 200 that has been spooled from falling off outer-body first end 179A.

FIG. 36 shows a close-up view of take-up mechanism 240 with plurality of pins 171A on take-up spindle 170 engaging openings 201 (best shown in FIGS. 5-7) on carrier strip 200. Plurality of pins 171A extend from outer body 176 to engage openings 201 on carrier strip 200 retaining carrier strip 200 that has been spooled on take-up spindle 170.

Referring generally to FIGS. 43A, 43B, 43C, and 43D and particularly to, e.g., FIGS. 37 and 38, apparatus 100 further comprises retaining cover 103, comprising first end 103A and second end 103B that is located opposite first end 103A. Second end 103B comprises detent receptacle 104. Apparatus 100 also comprises pin 109, pivotably connecting first end 103A of retaining cover 103 to housing 105. Apparatus 100 additionally comprises spring-loaded detent 108, extending from housing 105 and configured to interlock with detent receptacle 104 of retaining cover 103 to demountably couple second end 103B of retaining cover 103 to housing 105. Retaining cover 103 is configured to engage flange 173 of take-up spindle 170 when second end 103B of retaining cover 103 is demountably coupled to housing 105 via spring-loaded detent 108. When spring-loaded detent 108 is pressed toward housing 105, second end 103B of retaining cover 103 is decoupled from housing 105 to enable retaining cover 103 to be pivoted about pin 109, away from take-up spindle 170, and to enable take-up spindle 170 to be removed from housing 105. The preceding subject matter of this paragraph characterizes example 23 of the present disclosure, wherein example 23 also includes the subject matter according to example 22, above.

Retaining cover 103 engages flange 173 of take-up spindle 170 to prevent removal of take-up spindle 170 from housing 105 when retaining cover 103 is selectively connected to housing 105 via spring-loaded detent 108, positioned within detent receptacle 104 on second end 103B of retaining cover 103. Spring-loaded detent 108 is pressed toward housing 105 to move away from detent receptacle 104 and release second end 103B of retaining cover 103 from housing 105. Retaining cover 103 is pivoted away from take-up spindle 170 about pin 109 to enable take-up spindle 170 to be removed from housing 105.

Referring generally to FIGS. 43A, 43B, 43C, and 43D and particularly to, e.g., FIGS. 39 and 40, apparatus 100 further comprises at least one retaining key 110, extending from housing 105 and configured to engage flange 173 of take-up spindle 170 to prevent removal of take-up spindle 170 from housing 105. Flange 173 of take-up spindle 170 comprises at least one keyway 174. When flange 173 is rotated to align at least one keyway 174 with at least one retaining key 110, at least one retaining key 110 no longer engages flange 173 of take-up spindle 170, enabling removal of take-up spindle 170 from housing 105. The preceding subject matter of this paragraph characterizes example 24 of the present disclosure, wherein example 24 also includes the subject matter according to example 22 or 23, above.

Housing 105 includes at least one retaining key 110, configured to engage flange 173 of take-up spindle 170 to selectively prevent removal of take-up spindle 170 from housing 105. Take-up spindle 170 is rotated to align at least one keyway 174 in flange 173 of take-up spindle 170 to enable the removal of take-up spindle 170 from housing 105. At least one retaining key 110 and at least one keyway 174 prevent the removal of take-up spindle 170 until flange 173 of take-up spindle 170 is rotated to align at least one keyway 174 with at least one retaining key 110. At least one retaining key 110 and at least one keyway 174 provide a mechanism that retains take-up spindle 170 within housing 105 until it is desired to remove take-up spindle 170.

Referring generally to FIGS. 43A, 43B, 43C, and 43D and particularly to, e.g., FIGS. 12 and 13, apparatus 100 further comprises controller 195, configured to control operation of plunger mechanism 220 and feed system 230, such that feed system 230 positions one of pre-molded seal caps 210 below plunger mechanism 220. Controller 195 causes plunger mechanism 220 to engage the one of pre-molded seal caps 210. The preceding subject matter of this paragraph characterizes example 25 of the present disclosure, wherein example 25 also includes the subject matter according to any one of examples 20 to 24, above.

Controller 195 controls feed system 230 to position one of pre-molded seal caps 210 below plunger mechanism 220 and controller 195 controls plunger mechanism 220 to move to position one of pre-molded seal caps 210 within plunger mechanism 220. Controller 195 controlling feed system 230 and plunger mechanism 220 permits changes in operation based on carrier strip 200.

Controller 195 is connected to various components of apparatus 100 by electrical conduits 126. Controller 195 controls feed system 230 by controlling the operation of first drive-wheel motor 132 that rotates first drive wheel 130 and second drive-wheel motor 142 that rotates second drive wheel 140. The control also controls the movement of idler roller 150 between its first and second positions by controlling the rotation of first drive wheel 130 and second drive wheel 140 as discussed herein.

Referring generally to FIGS. 43A, 43B, 43C, and 43D and particularly to, e.g., FIGS. 21, 22, 24, and 27, controller 195 is configured to control feed system 230 and plunger mechanism 220 to enable plunger mechanism 220 to retain an individual one of pre-molded seal caps 210 and to slide the individual one of pre-molded seal caps 210, retained by plunger mechanism 220, off carrier strip 200. Controller 195 is also configured to control plunger mechanism 220 to individually install pre-molded seal caps 210, retained by plunger mechanism 220, onto fasteners 301. The preceding subject matter of this paragraph characterizes example 26 of the present disclosure, wherein example 26 also includes the subject matter according to example 25, above.

Controller enables plunger mechanism 220, while retaining the individual one of pre-molded seal caps 210, to slide the individual one of pre-molded seal caps 210 off carrier strip 200. Controller 195 controls plunger mechanism 220 to retain an individual one of pre-molded seal caps 210 while controlling feed system 230 to move carrier strip 200 to remove the retained one of pre-molded seal caps 210 from carrier strip 200. Controller 195 controls plunger mechanism 220 to install the individual one of pre-molded seal caps 210, which is retained by plunger mechanism 220, onto the selected ones of fasteners 301.

Referring generally to FIGS. 43A, 43B, 43C, and 43D and particularly to, e.g., FIG. 27, controller 195 causes second drive wheel 140 of feed system 230 to rotate, while preventing first drive wheel 130 of feed system 230 from rotating, to enable plunger mechanism 220, retaining the individual one of pre-molded seal caps 210, to slide the individual one of pre-molded seal caps 210 off carrier strip 200. The preceding subject matter of this paragraph characterizes example 27 of the present disclosure, wherein example 27 also includes the subject matter according to example 26, above.

Controller 195 controls plunger mechanism 220 to retain an individual one of pre-molded seal caps 210 while controlling feed system 230 to move carrier strip 200 to remove the retained one of pre-molded seal caps 210 from carrier strip 200. Controller 195 causes second drive wheel 140 to rotate while preventing the rotation of first drive wheel 130. The rotation of second drive wheel 140 causes movement of carrier strip 200. The movement of carrier strip 200 enables plunger mechanism 220, which retains the individual one of pre-molded seal caps 210, to slide the retained one of pre-molded seal caps 210 off carrier strip 200.

Referring generally to FIGS. 43A, 43B, 43C, and 43D and particularly to, e.g., FIG. 31, controller 195 is configured to cause plunger mechanism 220 to individually rotate pre-molded seal caps 210, installed onto the selected ones of fasteners 301, relative to the selected ones of fasteners 301. The preceding subject matter of this paragraph characterizes example 28 of the present disclosure, wherein example 28 also includes the subject matter according to example 27, above.

Controller 195 causes plunger mechanism 220 to rotate the individual one of pre-molded seal caps 210, which is installed onto a selected one of fasteners 301, relative to the selected one of fasteners 301. Rotation of the individual one of pre-molded seal caps 210 spreads sealant within the individual one of pre-molded seal caps 210 around the selected one of fasteners 301.

Referring generally to FIGS. 43A, 43B, 43C, and 43D and particularly to, e.g., FIG. 31, controller 195 is configured to cause plunger mechanism 220 to individually rotate, relative to the selected ones of fasteners 301, pre-molded seal caps 210, installed onto the selected ones of fasteners 301, to evenly circumferentially distribute a portion of sealant 211, contained in pre-molded seal caps 210, around the selected ones of fasteners 301. The preceding subject matter of this paragraph characterizes example 29 of the present disclosure, wherein example 29 also includes the subject matter according to example 28, above.

Controller 195 causes plunger mechanism 220 to rotate the individual one of pre-molded seal caps 210, which is installed onto the selected one of fasteners 301, relative to the selected one of fasteners 301, to evenly circumferentially distribute a portion of the sealant, contained in the individual one of pre-molded seal caps 210, around the individual one of pre-molded seal caps 210.

Pre-molded seal caps 210 contain sealant 211 within pre-molded seal caps 210. Sealant 211 temporarily attaches pre-molded seal caps 210 to carrier strip 200. Sealant 211 remains within pre-molded seal caps 210 after pre-molded seal caps 210 are removed from carrier strip 200. Pre-molded seal caps 210 are individually rotated once installed onto selected one of fasteners 301 to evenly distribute sealant 211 around the circumference of each of fasteners 301.

Referring generally to FIGS. 43A, 43B, 43C, and 43D and particularly to, e.g., FIGS. 31-33, controller 195 is configured to cause plunger mechanism 220 to release pre-molded seal caps 210, individually installed on the selected ones of fasteners 301. Controller 195 is also configured to cause plunger mechanism 220 to move away from the selected ones of fasteners 301 once pre-molded seal caps 210 are individually installed on the selected ones of fasteners 301. The preceding subject matter of this paragraph characterizes example 30 of the present disclosure, wherein example 30 also includes the subject matter according to example 29, above.

Controller 195 causes plunger mechanism 220 to release the individual one of pre-molded seal caps 210 after installing the same onto a selected one of fasteners 301 and rotating the installed individual one of pre-molded seal caps 210 with respect to the selected one of fasteners 301. Rotation of the installed individual one of pre-molded seal caps 210 spreads sealant within the installed individual one of pre-molded seal caps 210 around the selected one of fasteners 301. Controller 195 also causes plunger mechanism 220 to move away from the selected one of fasteners 301 with the individual one of pre-molded seal caps 210, remaining installed on the selected one of fasteners 301. After installing an individual one of pre-molded seal caps 210 onto the selected one of fasteners 301, controller 195 causes plunger mechanism 220 to move back into housing 105.

Referring generally to FIGS. 43A, 43B, 43C, and 43D and particularly to, e.g., FIGS. 1-4, 21, 22, 30, and 32-35, apparatus 100 further comprises first indicator 197, configured to indicate when plunger mechanism 220 has the predetermined angular orientation relative to the selected ones of fasteners 301. Apparatus 100 also comprises second indicator 198, configured to indicate when plunger mechanism 220 does not have the predetermined angular orientation relative to the selected ones of fasteners 301. The preceding subject matter of this paragraph characterizes example 31 of the present disclosure, wherein example 31 also includes the subject matter according to any one of examples 25 to 30, above.

First indicator 197 is configured to indicate when plunger mechanism 220 is oriented such that plunger mechanism 220 has the predetermined angular orientation relative to the selected ones of fasteners 301. Second indicator 198 is configured to indicate when plunger mechanism 220 is oriented such that plunger mechanism 220 does not have the predetermined angular orientation relative to the selected ones of fasteners 301. First indicators 197 and second indicator 198 indicate to an operator whether or not plunger mechanism 220 is properly aligned with the selected ones of fasteners 301. Proper alignment with the selected ones of fasteners 301 ensures that pre-molded seal caps 210 are properly installed.

Referring generally to FIGS. 43A, 43B, 43C, and 43D and particularly to, e.g., FIGS. 1-4, 21, 22, 30, and 32-35, first indicator 197 and second indicator 198 are visual indicators. The preceding subject matter of this paragraph characterizes example 32 of the present disclosure, wherein example 32 also includes the subject matter according to example 31, above.

In one example, visual indicators enable the operator to determine the orientation of apparatus 100 with respect to the selected ones of fasteners 301 even when apparatus 100 is operated in a noisy environment.

First indicator 197 and second indicator 198 provide visual indication to an operator whether apparatus 100 has the proper orientation with respect to a selected one of fasteners 301. In one example, first indicator 197 is a green indicator that indicates the proper orientation and second indicator 198 is a red indicator that indicates an improper orientation. In one example, apparatus 100 also includes display 196 that provides visual indications and/or instructions to an operator.

Referring generally to FIGS. 43A, 43B, 43C, and 43D and particularly to, e.g., FIGS. 1-4, 21, 22, 30, and 32-35, first indicator 197 and second indicator 198 are audio indicators. The preceding subject matter of this paragraph characterizes example 33 of the present disclosure, wherein example 33 also includes the subject matter according to example 31, above.

In one example, audio indicators enable the operator to determine the orientation of apparatus 100 with respect to the selected ones of fasteners 301 even when the operator is unable to visually observe first indicator 197 and second indicator 198. For example, when operating apparatus 100 in a confined space, the operator may not be able to easily see first indicator 197 and second indicator 198. An audio indication will inform the operator of the angular orientation of apparatus 100 with respect to the selected ones of fasteners 301.

First indicator 197 and second indicator 198 provide audio indication to an operator whether apparatus 100 has the proper orientation with respect to a selected one of fasteners 301. In one example, first indicator 197 generates a first sound that indicates apparatus 100 has the proper orientation and second indicator 198 generates a second sound that indicates apparatus 100 does not have the proper orientation. In one example, apparatus 100 also includes speaker 199 that provides audio indications and/or instructions to an operator.

Referring generally to FIGS. 43A, 43B, 43C, and 43D and particularly to, e.g., FIGS. 4, 21, 22, and 32-35, system 400 for sealing fasteners 301 that extend from surface 300 is disclosed. System 400 comprises pre-molded seal caps 210, spaced along carrier strip 200 at regular intervals and removably attached to carrier strip 200. System 400 also comprises plunger mechanism 220, configured to individually install pre-molded seal caps 210 onto selected ones of fasteners 301. System 400 additionally comprises feed system 230, configured to sequentially deliver pre-molded seal caps 210, arranged on carrier strip 200, to plunger mechanism 220 and take-up mechanism 240, configured to collect carrier strip 200 as pre-molded seal caps 210 are sequentially removed from carrier strip 200. Plunger mechanism 220 is also configured to operate in concert with feed system 230 to sequentially remove pre-molded seal caps 210 from carrier strip 200. The preceding subject matter of this paragraph characterizes example 34 of the present disclosure.

Pre-molded seal caps 210 are spaced along carrier strip 200 at regular intervals and are removably attached to carrier strip 200. Plunger mechanism 220 is configured to sequentially install pre-molded seal caps 210 onto selected ones of fasteners 301. Feed system 320 is configured to sequentially deliver pre-molded seal caps 210 that are arranged on carrier strip 200 to plunger mechanism 220. Feed system 320 moves carrier strip 200 to position an individual one of pre-molded seal caps 210 to be removed from carrier strip 200 and installed on a selected one of fasteners 301. Plunger mechanism 220 is configured to operate in concert with feed system 230 to sequentially remove each of pre-molded seal caps 210 from carrier strip 200. Feed system 230 moves carrier strip 200 while an individual one of pre-molded seal caps 210 is retained by plunger mechanism 220 to remove the individual one of pre-molded seal caps 210 from carrier strip 200. Take-up mechanism 240 is configured to collect carrier strip 200 as pre-molded seal caps 210 are sequentially removed from carrier strip 200 by plunger mechanism 220 acting in concert with feed system 230.

Referring generally to FIGS. 44A-44C and particularly to, e.g., FIGS. 21-24 and 27-35, method 500 of installing pre-molded seal caps 210 onto fasteners 301 that extend from surface 300 is disclosed. Method 500 comprises (block 502) sequentially delivering pre-molded seal caps 210, arranged on carrier strip 200, to plunger mechanism 220 via feed system 230. Method 500 also comprises (block 506) sequentially removing pre-molded seal caps 210 from carrier strip 200 using plunger mechanism 220, operating in concert with feed system 230. Method 500 further comprises (block 518) individually installing pre-molded seal caps 210 onto selected ones of fasteners 301 using plunger mechanism 220. The preceding subject matter of this paragraph characterizes example 35 of the present disclosure.

Method 500 facilitates removing pre-molded seal caps 210 from carrier strip 210 and individually installing removed pre-molded seal caps 210 onto selected ones of fasteners 301 that extend form surface 300. Feed system 230 enables sequential delivery of pre-molded seal caps 210 to plunger mechanism 220. Plunger mechanism 220, which operates in concert with feed system 230, enables sequential removal of pre-molded seal caps 210 from carrier strip 200. After pre-molded seal caps 210 are sequentially removed from carrier strip, plunger mechanism 220 facilitates installing pre-molded seal caps 210 onto selected ones of fasteners 301. The method eliminates the manual removal of pre-molded seal caps 210 from carrier strip 200 and the manual installation of pre-molded seal caps 210 onto selected ones of fasteners 301.

Referring generally to FIGS. 44A-44C and particularly to, e.g., FIGS. 23-26, method 500 further comprises (block 520) determining an angular orientation of plunger mechanism 220 relative to the selected ones of fasteners 301 prior to individually installing pre-molded seal caps 210 onto the selected ones of fasteners 301. Method 500 also comprises (block 522) individually installing pre-molded seal caps 210 onto the selected ones of fasteners 301 only when the angular orientation of plunger mechanism 220, relative to each of the selected ones of fasteners 301, is a pre-determined angular orientation. The preceding subject matter of this paragraph characterizes example 36 of the present disclosure, wherein example 36 also includes the subject matter according to example 35, above.

Determining the angular orientation of plunger mechanism 220 ensures that plunger mechanism 220 is properly aligned with selected ones of fasteners 301. Pre-molded seal caps 210 are installed onto the selected ones of fasteners 301 only when the angular orientation is a pre-determined angular orientation to ensure an individual one of pre-molded seal caps 210 is properly installed onto a selected one of fasteners 301.

Referring generally to FIGS. 44A-44C and particularly to, e.g., FIG. 32, method 500 further comprises (block 524), while individually installing pre-molded seal caps 210 onto fasteners 301, indicating that plunger mechanism 220 is aligned with the selected ones of fasteners 301 when the angular orientation of plunger mechanism 220, relative to each of the selected ones of fasteners 301, is the pre-determined angular orientation. The preceding subject matter of this paragraph characterizes example 37 of the present disclosure, wherein example 37 also includes the subject matter according to example 36, above.

Indicating that plunger mechanism 220 is aligned indicates to the operator that plunger mechanism 220 is properly positioned to ensure pre-molded seal caps 210 are properly installed. Otherwise, the operator can adjust plunger mechanism 220 until properly aligned.

Referring generally to FIGS. 44A-44C and particularly to, e.g., FIG. 32, method 500 further comprises (block 526), while individually installing pre-molded seal caps 210 onto fasteners 301, indicating that plunger mechanism 220 is misaligned with the selected ones of fasteners 301 when the angular orientation of plunger mechanism 220, relative to each of the selected ones of fasteners 301, differs from the pre-determined angular orientation. The preceding subject matter of this paragraph characterizes example 38 of the present disclosure, wherein example 38 also includes the subject matter according to example 36 or 37, above.

Indicating that plunger mechanism 220 is not properly aligned prompts the operator to adjust alignment of the plunger mechanism to ensure that pre-molded seal caps 210 are properly installed on respective ones of fasteners 301.

Referring generally to FIGS. 44A-44C and particularly to, e.g., FIGS. 4, 27, 28, 32, and 34-36, method 500 further comprises (block 530) collecting carrier strip 200 into a roll as pre-molded seal caps 210 are sequentially removed from carrier strip 200. The preceding subject matter of this paragraph characterizes example 39 of the present disclosure, wherein example 39 also includes the subject matter according to any one of examples 35 to 38, above.

Collecting carrier strip 200 into a roll permits all pre-molded seal caps 210 to be removed from carrier strip 200 without carrier strip 200 becoming entangled. Additionally, collecting carrier strip 200 into a roll enables apparatus 100 to be more compact.

Referring generally to FIGS. 44A-44C and particularly to, e.g., FIGS. 4, 27, 28, 32, and 36, according to method 500, plunger mechanism 220 is located within housing 105 and carrier strip 200 is collected onto take-up mechanism 240, located within housing 105. The preceding subject matter of this paragraph characterizes example 40 of the present disclosure, wherein example 40 also includes the subject matter according to example 39, above.

Collecting carrier strip 200 with take-up mechanism 240, which is positioned within housing 105, as pre-molded seal caps 210 are sequentially removed from carrier strip 200 prevents carrier strip 200 from being entangled as pre-molded seal caps 210 are removed. Referring generally to FIGS. 44A-44C and particularly to, e.g., FIGS. 24 and 27, method 500 further comprises (block 534) moving idler roller 150, rotatably mounted within housing 105, between, inclusively, a first position, such that travel path 101 of plunger 180 of plunger mechanism 220 is between idler-roller rotational axis 153 and first drive wheel 130, rotatably mounted within housing 105, and a second position, such that idler-roller rotational axis 153 is between first drive wheel 130 and travel path 101 of plunger 180. The preceding subject matter of this paragraph characterizes example 41 of the present disclosure, wherein example 41 also includes the subject matter according to example 40, above.

Moving idler roller 150 to the second position enables carrier strip 200 to be moved out of travel path 101 of plunger 180. Movement of idler roller 150 in conjunction with plunger 180 of plunger mechanism 220 enables an individual one of pre-molded seal caps 210 to be removed from carrier strip 200. Moving idler roller 150 to the second position also enables plunger 180 to be moved along travel path 101 past carrier strip 200.

Referring generally to FIGS. 44A-44C and particularly to, e.g., FIGS. 3, 4, 8-13, 21, 22, 24, 27, 28, and 36, according to method 500, at least one first elastic guide 134 is connected between first drive wheel 130 and idler roller 150. At least one second elastic guide 143 is connected between second drive wheel 140 and idler roller 150. Rotating second drive wheel 140, rotatably mounted within housing 105, about second-drive-wheel rotational axis 144, causes carrier strip 200 to sequentially contact first drive wheel 130, idler roller 150, and second drive wheel 140. The preceding subject matter of this paragraph characterizes example 42 of the present disclosure, wherein example 42 also includes the subject matter according to example 41, above.

At least one first elastic guide 134 and at least one second elastic guide 143 stretch and contract as idler roller 150 moves between first and second positions. At least one first elastic guide 134 provides support for carrier strip 200 between first drive wheel 130 and idler roller 150 even when idler roller 150 is moving between first and second positions. At least one second elastic guide 143 provides support for carrier strip 200 between second drive wheel 140 and idler roller 150 even when idler roller 150 is moving between first and second positions.

Referring generally to FIGS. 44A-44C and particularly to, e.g., FIGS. 24 and 27, method 500 further comprises (block 536) rotating second drive wheel 140, rotatably mounted within housing 105, about second-drive-wheel rotational axis 144 while not rotating first drive wheel 130 to move idler roller 150 from the first position to the second position. The preceding subject matter of this paragraph characterizes example 43 of the present disclosure, wherein example 43 also includes the subject matter according to example 42, above.

Rotating second drive wheel 140 about second-drive-wheel rotation axis 144 while not rotating first drive wheel 130 creates tension in carrier strip 200. Tension in carrier strip 200 moves idler roller 150 from the first position to the second position.

Referring generally to FIGS. 44A-44C and particularly to, e.g., FIG. 31, method 500 further comprises (block 540) individually rotating pre-molded seal caps 210 on the selected ones of fasteners 301 with plunger mechanism 220. The preceding subject matter of this paragraph characterizes example 44 of the present disclosure, wherein example 44 also includes the subject matter according to any one of examples 35 to 43, above.

Rotating pre-molded seal caps 210 while on selected ones of fasteners 301 spreads sealant within pre-molded seal caps 210 around selected ones of fasteners 301.

Referring generally to FIGS. 44A-44C and particularly to, e.g., FIGS. 24 and 27, according to method 500, sequentially removing pre-molded seal caps 210 from carrier strip 200 comprises (block 508) sequentially sliding pre-molded seal caps 210 off carrier strip 200. The preceding subject matter of this paragraph characterizes example 45 of the present disclosure, wherein example 45 also includes the subject matter according to any one of examples 35 to 44, above.

Sliding pre-molded seal caps 210 off carrier strip 200 causes sealant within pre-molded seal caps 210 to remain within pre-molded seal caps 210. Moving carrier strip 200 while an individual one of pre-molded seal caps 210 is retained by plunger mechanism 220 slides the individual one of pre-molded seal caps 210 off carrier strip 200.

Referring generally to FIGS. 44A-44C and particularly to, e.g., FIGS. 24 and 27, according to method 500, sequentially sliding pre-molded seal caps 210 off carrier strip 200 comprises (block 510) sequentially retaining pre-molded seal caps 210 with plunger mechanism 220 while moving carrier strip 200 with feed system 230. The preceding subject matter of this paragraph characterizes example 46 of the present disclosure, wherein example 46 also includes the subject matter according to example 45, above.

Moving carrier strip 200 while an individual one of pre-molded seal caps 210 is retained by plunger mechanism 220 slides the individual one of pre-molded seal caps 210 off carrier strip 200. Sliding pre-molded seal caps 210 off carrier strip 200 enables sealant within pre-molded seal caps 210 to remain within pre-molded seal caps 210.

Referring generally to FIGS. 44A-44C and particularly to, e.g., FIGS. 18 and 19, according to method 500, plunger mechanism 220 comprises inner plunger 184, positioned within plunger 180. Sequentially retaining pre-molded seal caps 210 with plunger mechanism 220 comprises (block 512) rotating inner plunger 184 relative to plunger 180 while at least a portion of an individual one of pre-molded seal caps 210 is positioned within inner plunger 184. The preceding subject matter of this paragraph characterizes example 47 of the present disclosure, wherein example 47 also includes the subject matter according to example 46, above.

Rotation of inner plunger 184 with respect to plunger 180 causes inner plunger 184 to compress and retain an individual one of pre-molded seal caps 210.

Referring generally to FIGS. 44A-44C and particularly to, e.g., FIGS. 18 and 19, according to method 500, rotating inner plunger 184 with respect to plunger 180 aligns inner-plunger minor-ellipse dimension 186B of inner plunger 184 with plunger major-ellipse dimension 181A of plunger 180. The preceding subject matter of this paragraph characterizes example 48 of the present disclosure, wherein example 48 also includes the subject matter according to example 47, above.

Rotating inner plunger 184 with respect to plunger 180 aligns inner-plunger minor-ellipse dimension 186B with plunger major-ellipse dimension 181A to sequentially retain pre-molded seal caps 210 with plunger mechanism 220. Aligning inner-plunger minor-ellipse dimension 186B with plunger major-ellipse dimension 181A causes inner plunger 184 to compress, retaining an individual one of pre-molded seal caps 210.

Referring generally to FIGS. 44A-44C and particularly to, e.g., FIG. 11, method 500 further comprises (block 542) detecting delivery of an individual one of pre-molded seal caps 210 to plunger mechanism 220 to determine when the individual one of pre-molded seal caps 210 is positioned below plunger mechanism 220. The preceding subject matter of this paragraph characterizes example 49 of the present disclosure, wherein example 49 also includes the subject matter according to any one of examples 35 to 48, above.

Detecting delivery of an individual one of pre-molded seal caps 210 to plunger mechanism 220 causes feed system 230 to stop such that the individual one of pre-molded seal caps 210 is aligned with plunger mechanism 220.

Referring generally to FIGS. 44A-44C and particularly to, e.g., FIGS. 12 and 13, according to method 500, plunger mechanism 220 comprises plunger 180 and inner plunger 184, positioned within plunger 180. Sequentially removing pre-molded seal caps 210 from carrier strip 200 comprises (block 516) moving plunger mechanism 220 to position at least a portion of an individual one of pre-molded seal caps 210 within inner plunger 184. The preceding subject matter of this paragraph characterizes example 50 of the present disclosure, wherein example 50 also includes the subject matter according to any one of examples 35 to 49, above.

Plunger mechanism 220 is moved so an individual one of pre-molded seal caps 210 is positioned within a portion of plunger mechanism 220. Plunger mechanism 220 retains the individual one of pre-molded seal caps 210 to remove the individual one of pre-molded seal caps 210 from carrier strip 200.

Referring generally to FIGS. 44A-44C and particularly to, e.g., FIGS. 4, 5, 7, 21, 22, and 32-35, according to method 500, feed system 230 is positioned within housing 105. Sequentially delivering pre-molded seal caps 210, arranged on carrier strip 200, to plunger mechanism 220 via feed system 230 comprises (block 504) advancing carrier strip 200 into housing 105 from inlet opening 111 via feed system 230. The preceding subject matter of this paragraph characterizes example 51 of the present disclosure, wherein example 51 also includes the subject matter according to any one of examples 35 to 50, above.

Carrier strip 200 with pre-molded seal caps 210 is inserted into inlet opening 111 in housing 105. Feed system 230 transports carrier strip 200 within housing 105 to sequentially deliver pre-molded seal caps 210 to plunger mechanism 220.

Referring generally to FIGS. 44A-44C and particularly to, e.g., FIG. 7, method 500 further comprises (block 544) detecting insertion of carrier strip 200 into inlet opening 111 of housing 105 via sensor 124, adjacent to inlet opening 111, to determine when carrier strip 200 is inserted into inlet opening 111 of housing 105. The preceding subject matter of this paragraph characterizes example 52 of the present disclosure, wherein example 52 also includes the subject matter according to example to 51, above.

Insertion of carrier strip 200 into inlet opening 111 is detected by sensor 124, which causes feed system 230 to transport carrier strip 200 into housing 105.

Controller 195 causes feed system 230 to transport carrier strip 200 upon detection of carrier strip 200 being inserted into inlet opening 111 by sensor 124. Sensor 124 communicate the detection of carrier strip 200 to controller 195 via electrical conduit 126.

Referring generally to FIGS. 44A-44C and particularly to, e.g., FIGS. 10, 28, and 29, according to method 500, plunger mechanism 220 is located within housing 105. Individually installing pre-molded seal caps 210 onto the selected ones of fasteners 301 using plunger mechanism 220 comprises (block 528) extending a portion of plunger 180 out of housing 105 through outlet opening 121 in housing 105. The preceding subject matter of this paragraph characterizes example 53 of the present disclosure, wherein example 53 also includes the subject matter according to any one of examples 35 to 52, above.

Plunger 180 transports pre-molded seal caps 210 out of housing 105 through outlet opening 121 and installs pre-molded seal caps 210 onto fasteners 301.

Referring generally to FIGS. 44A-44C and particularly to, e.g., FIG. 28, method 500 further comprises (block 546) rotating gear 192 with second motor 193. Gear 192 and second motor 193 are located within housing 105. Gear 192 is rotated in a first direction to move the portion of plunger 180 out of housing 105 through outlet opening 121. Gear 192 engages plurality of teeth 189A on stem 188 of plunger mechanism 220. The preceding subject matter of this paragraph characterizes example 54 of the present disclosure, wherein example 54 also includes the subject matter according to example 53, above.

Rotating gear 192 with second motor 193 in a first direction moves the portion of plunger 180 out of housing 105 through outlet opening 121. The rotation of gear 192 moves plunger 180 because gear 192 engages teeth 189A on stem 188 that is connected to plunger 180.

Referring generally to FIGS. 44A-44C and particularly to, e.g., FIGS. 28 and 32, according to method 500, rotating gear 192 with second motor 193 in a second direction, opposite the first direction, moves the portion of plunger mechanism 220 into housing 105 through outlet opening 121 after installing pre-molded seal caps 210 onto the selected ones of fasteners 301 using plunger mechanism 220. The preceding subject matter of this paragraph characterizes example 55 of the present disclosure, wherein example 55 also includes the subject matter according to example 54, above.

Rotating gear 192 with second motor 193 in a second direction moves the portion of plunger 180 back into housing 105 through outlet opening 121 after installing pre-molded seal caps 210 onto the selected ones of fasteners 301. The rotation of gear 192 moves plunger 180 because gear 192 engages teeth 189A on stem 188 that is connected to plunger 180.

Examples of the present disclosure may be described in the context of aircraft manufacturing and service method 600 as shown in FIG. 45 and aircraft 602 as shown in FIG. 46. During pre-production, illustrative method 600 may include specification and design (block 604) of aircraft 602 and material procurement (block 606). During production, component and subassembly manufacturing (block 608) and system integration (block 610) of aircraft 602 may take place. Thereafter, aircraft 602 may go through certification and delivery (block 612) to be placed in service (block 614). While in service, aircraft 602 may be scheduled for routine maintenance and service (block 616). Routine maintenance and service may include modification, reconfiguration, refurbishment, etc. of one or more systems of aircraft 602.

Each of the processes of illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 46, aircraft 602 produced by illustrative method 600 may include airframe 618 with a plurality of high-level systems 620 and interior 622. Examples of high-level systems 620 include one or more of propulsion system 624, electrical system 626, hydraulic system 628, and environmental system 630. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 600. For example, components or subassemblies corresponding to component and subassembly manufacturing (block 608) may be fabricated or manufactured in a manner similar to components or subassemblies produced while aircraft 602 is in service (block 614). Also, one or more examples of the apparatus(es), method(s), or combination thereof may be utilized during production stages 608 and 610, for example, by substantially expediting assembly of or reducing the cost of aircraft 602. Similarly, one or more examples of the apparatus or method realizations, or a combination thereof, may be utilized, for example and without limitation, while aircraft 602 is in service (block 614) and/or during maintenance and service (block 616).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for installing pre-molded seal caps onto fasteners that extend from a surface, the apparatus comprising:
   a plunger mechanism, configured to individually install the pre-molded seal caps onto selected ones of the fasteners;
   a feed system, configured to sequentially deliver the pre-molded seal caps, arranged on a carrier strip, to the plunger mechanism; and
   a take-up mechanism, configured to collect the carrier strip into a roll after the pre-molded seal caps are sequentially removed from the carrier strip; and
   wherein the plunger mechanism is also configured to operate in concert with the feed system to sequentially remove the pre-molded seal caps from the carrier strip.

2. The apparatus according to claim 1, further comprising a control system, configured to enable the plunger mechanism to individually install pre-molded seal caps onto the selected ones of the fasteners after the plunger mechanism individually removes the pre-molded seal caps from the carrier strip only when the plunger mechanism has a predetermined angular orientation relative to each of the selected ones of the fasteners.

3. The apparatus according to claim 2, further comprising a housing that comprises:
   a chamber;
   an inlet opening, in communication with the chamber; and
   an outlet opening, in communication with the chamber; and
   wherein:
      the feed system is positioned within the housing and the plunger mechanism is positioned within the chamber;
      the feed system is configured to transport the carrier strip to the chamber; and
      the plunger mechanism is configured to transport pre-molded seal caps, removed from the carrier strip, out of the chamber of the housing through the outlet opening.

4. The apparatus according to claim 3, further comprising at least three feet, positioned adjacent the outlet opening and configured to be positioned around one of the fasteners, and wherein each one of at least the three feet is configured to retract into the housing only when the plunger mechanism has the predetermined angular orientation relative to the one of the fasteners and a downward force is applied to the housing.

5. The apparatus according to claim 4, wherein:
   the control system comprises at least three sensors; and
   each one of at least the three sensors indicates when a corresponding one of at least the three feet is retracted within the housing.

6. The apparatus according to claim 5, wherein the plunger mechanism is configured to sequentially install the pre-molded seal caps onto the selected ones of the fasteners only when each one of at least the three sensors indicates that at least the three feet are retracted within the housing.

7. The apparatus according to claim 3, wherein:
   the plunger mechanism comprises a plunger, positioned within the chamber of the housing;
   the plunger has a travel path within the chamber;
   the plunger is configured to individually remove the pre-molded seal caps from the carrier strip; and
   the plunger is also configured to sequentially transport the pre-molded seal caps, removed from the carrier strip, from the chamber, through the outlet opening and onto the selected ones of the fasteners.

8. The apparatus according to claim 7, wherein:
   the plunger mechanism further comprises an inner plunger, positioned within the plunger; and
   the inner plunger is configured to rotate with respect to the plunger.

9. The apparatus according to claim 8, wherein:
   the plunger is elliptical and has a plunger major-ellipse dimension and a plunger minor-ellipse dimension;
   the inner plunger is elliptical and has an inner-plunger major-ellipse dimension and an inner-plunger minor-ellipse dimension;
   the inner plunger has an initial position that aligns the inner-plunger major-ellipse dimension with the plunger major-ellipse dimension; and the inner plunger is configured to retain the pre-molded seal caps as the inner plunger rotates with respect to the plunger to align the inner-plunger minor-ellipse dimension with the plunger major-ellipse dimension.

10. The apparatus according to claim 9, wherein the plunger mechanism further comprises a stem, connected to the inner plunger, and a first motor, configured to rotate the stem and the inner plunger.

11. The apparatus according to claim 10, wherein:
the plunger mechanism comprises a sleeve, connected to the first motor and having an opening;
the stem of the plunger mechanism comprises a portion that engages the opening in the sleeve; and
when the sleeve is rotated with respect to the plunger, the opening engages the portion of the stem, causing the stem and the inner plunger to rotate with respect to plunger.

12. The apparatus according to claim 10, wherein the stem of the plunger mechanism comprises a plurality of teeth.

13. The apparatus according to claim 12, wherein:
the plunger mechanism further comprises a gear and a second motor, configured to rotate the gear; and
the gear engages the plurality of teeth on the stem of the plunger mechanism to move the plunger, inner plunger, and the stem within the chamber.

14. The apparatus according to claim 7, wherein:
the feed system comprises:
  a first drive wheel, having a first-drive-wheel rotational axis;
  a second drive wheel, rotatably mounted within the housing; and
  an idler roller, having an idler-roller rotational axis and configured to support a portion of the carrier strip;
the idler roller is selectively locatable at least in a first position relative to the housing, such that the travel path of the plunger is between the idler-roller rotational axis and the first drive wheel, or in a second position, such that the idler-roller rotational axis is between the first drive wheel and the travel path of the plunger;
the first drive wheel is rotatably mounted within the housing; and
the first drive wheel is configured to rotate about the first-drive-wheel rotational axis to transport the carrier strip from the inlet opening to the chamber.

15. The apparatus according to claim 14, wherein:
the feed system further comprises:
  a first drive-wheel motor, configured to selectively rotate the first drive wheel;
  a third drive wheel; and
  at least one belt between the first drive wheel and the third drive wheel; and
at least the one belt is configured to rotate the third drive wheel by rotating the first drive wheel.

16. The apparatus according to claim 15, wherein:
the feed system comprises a feed-system sensor, configured to detect an individual one of the pre-molded seal caps entering the chamber; and
the first drive-wheel motor is configured to selectively prevent the first drive wheel from rotating responsive to the feed-system sensor detecting the individual one of the pre-molded seal caps entering the chamber.

17. The apparatus according to claim 15, wherein:
the take-up mechanism comprises a take-up spindle, configured to wind up the carrier strip into the roll;
the second drive wheel of the feed system is configured to rotate about a second-drive-wheel rotational axis to transport the carrier strip from the idler roller to the take-up spindle; and
the second drive wheel is configured to move the idler roller between,
inclusively,
the first position,
such that the travel path of the plunger is between the idler-roller rotational axis and the first drive wheel, and
the second position,
such that the idler-roller rotational axis is between the first drive wheel and the travel path of the plunger.

18. The apparatus according to claim 17, wherein:
the take-up mechanism further comprises a resilient guide, positioned between the take-up spindle and the second drive wheel; and
the resilient guide is configured to apply tension to the carrier strip between the second drive wheel and the take-up spindle.

19. The apparatus according to claim 18, wherein:
the feed system further comprises:
  at least one first elastic guide between the first drive wheel and the idler roller;
  at least one second elastic guide between the idler roller and the second drive wheel; and
  at least one spring, having a spring force and positioned between the idler roller and the housing;
the spring force of at least the one spring biases the idler roller to the first position, such that the travel path of the plunger is between the idler-roller rotational axis and the first drive wheel;
the second drive wheel is configured to move the idler roller from the first position to the second position;
the second position of the idler roller is such that the idler-roller rotational axis is between the first drive wheel and the travel path of the plunger when an individual one of the pre-molded seal caps is positioned within the plunger and a movement of the idler roller slides the individual one of the pre-molded seal caps off the carrier strip; and
rotation of the second drive wheel about the second-drive-wheel rotational axis, while preventing rotation of the first drive wheel about the first-drive-wheel rotational axis, creates a tension in the carrier strip that exceeds the spring force of at least the one spring.

20. The apparatus according to claim 19, wherein, when the carrier strip is spooled onto the take-up spindle, the take-up spindle is removable from the housing.

21. The apparatus according to claim 20, wherein:
the take-up spindle comprises:
  an outer body, comprising an outer-body first end, an outer-body second end, a flange, positioned between the outer-body first end and the outer-body second end, and a plurality of apertures, penetrating the outer body;
  a plurality of pins, each positioned within a single one of the plurality of apertures;
  an inner body, positioned within the outer body and comprising:
    an inner-body first end;
    an inner-body second end that is opposite to the inner-body first end;
    first portions, each having a first diameter;
    second portions, each having a second diameter that is larger than the first diameter; and sloped portions, connecting the first portions to the second portions;

a plurality of springs, each positioned between a portion of a single one of the plurality of pins and the outer body and biasing the plurality of pins toward the inner body; and an end spring, positioned between the inner-body second end and the outer-body second end and biasing the inner body to an initial position;

with the inner body in the initial position, the second portions of the inner body are positioned adjacent to the plurality of pins and are configured so that the plurality of pins extend from the outer body;

when a force is applied to the inner-body first end toward the inner-body second end, the end spring is depressed to move the inner body toward the outer-body second end until the first portions of the inner body are positioned adjacent the plurality of pins; and the first portions are configured so that the plurality of pins does not extend from the outer body.

22. The apparatus according to claim 21, further comprising:

a retaining cover, comprising a first end and a second end that is located opposite the first end, and wherein the second end comprises a detent receptacle;

a pin, pivotably connecting the first end of the retaining cover to the housing; and a spring-loaded detent, extending from the housing and configured to interlock with the detent receptacle of the retaining cover to demountably couple the second end of the retaining cover to the housing; and wherein:

the retaining cover is configured to engage the flange of the take-up spindle when the second end of the retaining cover is demountably coupled to the housing via the spring-loaded detent; and when the spring-loaded detent is pressed toward the housing, the second end of the retaining cover is decoupled from the housing to enable the retaining cover to be pivoted about the pin, away from the take-up spindle, and to enable the take-up spindle to be removed from the housing.

23. The apparatus according to claim 21, further comprising at least one retaining key, extending from the housing and configured to engage the flange of the take-up spindle to prevent removal of the take-up spindle from the housing; and wherein:

the flange of the take-up spindle comprises at least one keyway; and when the flange is rotated to align at least the one keyway with at least the one retaining key, at least the one retaining key no longer engages the flange of the take-up spindle, enabling removal of the take-up spindle from the housing.

24. The apparatus according to claim 19, further comprising a controller, configured to control operation of the plunger mechanism and the feed system, such that the feed system positions one of the pre-molded seal caps below the plunger mechanism, and wherein the controller causes the plunger mechanism to engage the one of the pre-molded seal caps.

25. The apparatus according to claim 24, wherein the controller is configured to:

control the feed system and the plunger mechanism to enable the plunger mechanism to retain an individual one of the pre-molded seal caps and to slide the individual one of the pre-molded seal caps, retained by the plunger mechanism, off the carrier strip; and control the plunger mechanism to individually install the pre-molded seal caps, retained by the plunger mechanism, onto the fasteners.

26. The apparatus according to claim 25, wherein the controller causes the second drive wheel of the feed system to rotate, while preventing the first drive wheel of the feed system from rotating, to enable the plunger mechanism, retaining the individual one of the pre-molded seal caps, to slide the individual one of the pre-molded seal caps off the carrier strip.

27. The apparatus according to claim 26, wherein the controller is configured to cause the plunger mechanism to individually rotate the pre-molded seal caps, installed onto the selected ones of the fasteners, relative to the selected ones of the fasteners.

28. The apparatus according to claim 27, wherein the controller is configured to cause the plunger mechanism to individually rotate, relative to the selected ones of the fasteners, the pre-molded seal caps, installed onto the selected ones of the fasteners, to evenly circumferentially distribute a portion of sealant, contained in the pre-molded seal caps, around the selected ones of the fasteners.

29. The apparatus according to claim 28, wherein the controller is configured to:

cause the plunger mechanism to release the pre-molded seal caps, individually installed on the selected ones of the fasteners; and cause the plunger mechanism to move away from the selected ones of the fasteners once the pre-molded seal caps are individually installed on the selected ones of the fasteners.

30. The apparatus according to claim 24, further comprising:

a first indicator, configured to indicate when the plunger mechanism has the predetermined angular orientation relative to the selected ones of the fasteners; and a second indicator, configured to indicate when the plunger mechanism does not have the predetermined angular orientation relative to the selected ones of the fasteners.

31. The apparatus according to claim 30, wherein the first indicator and the second indicator are visual indicators.

32. The apparatus according to claim 30, wherein the first indicator and the second indicator are audio indicators.

33. A system for sealing fasteners that extend from a surface, the system comprising:

pre-molded seal caps, spaced along a carrier strip at regular intervals and removably attached to the carrier strip;

a plunger mechanism, configured to individually install the pre-molded seal caps onto selected ones of the fasteners;

a feed system, configured to sequentially deliver the pre-molded seal caps, arranged on the carrier strip, to the plunger mechanism; and a take-up mechanism, configured to collect the carrier strip into a roll after the pre-molded seal caps are sequentially removed from the carrier strip; and wherein the plunger mechanism is also configured to operate in concert with the feed system to sequentially remove the pre-molded seal caps from the carrier strip.

34. The apparatus according to claim 14, wherein:

the housing further comprises a slot;

a portion of the idler roller extends through the slot; and the slot is configured to enable the idler roller to move between, inclusively, the first position, such that the travel path of the plunger is between the idler-roller rotational axis and the first drive wheel, and the second position, such that the idler-roller rotational axis is between the first drive wheel and the travel path of the plunger.

* * * * *